US012187852B1

(12) United States Patent
He et al.

(10) Patent No.: US 12,187,852 B1
(45) Date of Patent: Jan. 7, 2025

(54) ETHYLENICALLY UNSATURATED OLIGOMERS, METHODS FOR THEIR PREPARATION, AND THE USE THEREOF IN COATING COMPOSITIONS

(71) Applicant: Covestro LLC, Pittsburgh, PA (US)

(72) Inventors: Meng He, South Elgin, IL (US); Grant S. Sheridan, Lake in the Hills, IL (US); Eric Urruti, Elgin, IL (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 18/596,114

(22) Filed: Mar. 5, 2024

Related U.S. Application Data

(63) Continuation-in-part of application No. 18/402,290, filed on Jan. 2, 2024.

(51) Int. Cl.
*C08G 77/26* (2006.01)
*C03C 25/1065* (2018.01)
*C09D 183/08* (2006.01)

(52) U.S. Cl.
CPC .......... *C08G 77/26* (2013.01); *C03C 25/1065* (2013.01); *C09D 183/08* (2013.01)

(58) Field of Classification Search
None
See application file for complete search history.

(56) References Cited

U.S. PATENT DOCUMENTS

| | | | | |
|---|---|---|---|---|
| 3,793,253 | A * | 2/1974 | Quiring et al. | C07F 7/10 556/407 |
| 4,150,234 | A | 4/1979 | Seltzer et al. | |
| 4,861,853 | A | 8/1989 | Petrie et al. | |
| 4,962,992 | A | 10/1990 | Chapin et al. | |
| 5,104,433 | A | 4/1992 | Chapin et al. | |
| 5,364,955 | A | 11/1994 | Zwiener et al. | |
| 6,020,528 | A | 2/2000 | Leppard et al. | |
| 6,046,270 | A * | 4/2000 | Roesler | C08G 18/4063 524/588 |
| 6,048,660 | A | 4/2000 | Leppard et al. | |
| 6,107,436 | A | 8/2000 | Goeb et al. | |
| 6,111,010 | A * | 8/2000 | Yu | C08G 18/833 524/588 |
| 6,169,140 | B1 * | 1/2001 | Roesler | C08G 18/307 524/588 |
| 6,596,445 | B1 | 7/2003 | Matsumoto et al. | |
| 6,689,463 | B2 | 2/2004 | Chou et al. | |
| 6,775,451 | B1 | 8/2004 | Botelho et al. | |
| 7,169,826 | B2 | 1/2007 | Sitzmann et al. | |
| 10,894,858 | B2 | 1/2021 | Jansen | |
| 11,964,906 | B2 * | 4/2024 | Ren | C09D 133/14 |
| 2001/0031848 | A1 * | 10/2001 | Windmueller | C07F 7/1804 528/10 |
| 2002/0013383 | A1 | 1/2002 | Chawla et al. | |
| 2002/0119330 | A1 * | 8/2002 | Roesler | C08G 18/0885 428/447 |
| 2006/0122338 | A1 | 6/2006 | Roesler et al. | |
| 2007/0100039 | A1 | 5/2007 | Hancock et al. | |
| 2009/0075096 | A1 * | 3/2009 | Butikofer | C07F 7/1804 556/419 |
| 2009/0214879 | A1 * | 8/2009 | Jucker | C08G 18/10 524/588 |
| 2014/0249273 | A1 * | 9/2014 | Webb | C08G 18/792 548/951 |
| 2016/0230042 | A1 * | 8/2016 | Webb | C08G 18/792 |
| 2017/0183534 | A1 * | 6/2017 | Lezzi | C08G 18/6685 |
| 2021/0088720 | A1 | 3/2021 | Steeman et al. | |
| 2021/0179903 | A1 | 6/2021 | Zeliznik et al. | |
| 2021/0317253 | A1 * | 10/2021 | Thiebes | C08G 18/755 |
| 2022/0259097 | A1 | 8/2022 | He et al. | |
| 2023/0116356 | A1 | 4/2023 | He et al. | |
| 2023/0117457 | A1 | 4/2023 | He et al. | |
| 2023/0120588 | A1 | 4/2023 | He et al. | |
| 2023/0312834 | A1 * | 10/2023 | Chernyshov | C08G 77/26 525/479 |

FOREIGN PATENT DOCUMENTS

| | | |
|---|---|---|
| CN | 105566607 A | 5/2016 |
| CN | 109400816 A | 3/2019 |
| CN | 111875749 A | 11/2020 |
| CN | 111960969 A | 11/2020 |
| CN | 112279992 A | 1/2021 |
| CN | 112724822 A | 4/2021 |
| CN | 112778496 A | 5/2021 |
| EP | 0913402 A1 | 5/1999 |
| EP | 1514903 A1 | 3/2005 |
| WO | 2023205221 A2 | 10/2023 |
| WO | 2023205223 A1 | 10/2023 |
| WO | 2023205224 A2 | 10/2023 |

OTHER PUBLICATIONS

U.S. Appl. No. 63/616,890, filed Jan. 2, 2024.
U.S. Appl. No. 63/616,868, filed Jan. 2, 2024.
Sections 4.6 to the end of chapter 4 in the textbook "Specialty Optical Fibers Handbook" by A. Mendez and T.F. Morse, (c) Elsevier Inc. 2007, published by Elsevier.
Dalton Trans. 2021, 50, 12392-12398.

* cited by examiner

*Primary Examiner* — Robert S Loewe
(74) *Attorney, Agent, or Firm* — Donald R. Palladino

(57) ABSTRACT

Oligomers that contain an ethylenically unsaturated group, a silane group, and an aspartate group and/or hydantoin group are described. Also disclosed are methods for producing and using such compounds, such as their use in coating compositions, such as coating compositions suitable for application to optical glass fiber substrates.

21 Claims, No Drawings

ETHYLENICALLY UNSATURATED OLIGOMERS, METHODS FOR THEIR PREPARATION, AND THE USE THEREOF IN COATING COMPOSITIONS

CROSS-REFERENCE TO RELATED APPLICATIONS

This application is a continuation-in-part of U.S. patent application Ser. No. 18/402,290, filed Jan. 2, 2024, which is incorporated herein by reference.

FIELD

This specification relates to oligomers that contain an ethylenically unsaturated group and a silane group. This specification also relates to methods for producing such oligomers, as well as to the use of such oligomers in, for example, coating compositions, such as coating compositions suitable for application to optical glass fiber substrates.

BACKGROUND

Radiation-curable, such as ultraviolet ("UV") radiation-curable, coating compositions are used in many applications due to, for example, their ability to cure especially rapidly to produce cured coatings exhibiting many desirable properties. "Radiation-curable" coating compositions, as used herein, refers to coating compositions that require radiation to initiate crosslinking to transform a liquid (uncured) composition to a solid (cured) coating. One specific use of radiation-curable coating compositions is in the production of coated optical fibers.

Optical fibers are composed of glass fibers obtained by hot melt spinning of glass, in which one or more coating layers is disposed over the glass fibers for protective reinforcement. Typically, radiation curable optical fiber coatings are the cured product of a composition containing a mixture of one or more components possessing one or more ethylenically unsaturated bonds which, under the influence of irradiation, undergo crosslinking by free-radical polymerization.

In many cases, optical fibers are coated with a multi-layer coating system that includes an inner "primary coating" that directly contacts the optical fiber and a "secondary coating" that overlays the primary coating. The inner primary coatings are typically formulated to possess a significantly lower modulus than secondary coatings.

The relatively soft inner primary coating provides resistance to microbending, which can be induced by thermal stresses and/or mechanical lateral forces. Microbends are microscopic curvatures in the optical fiber involving local axial displacements of a few micrometers and spatial wavelengths of a few millimeters. They result in added attenuation of the signal transmission (i.e. signal loss) of the coated optical fiber and are therefore undesirable. The harder secondary coating typically provides resistance to handling forces such as those encountered when the coated optical fiber is ribboned and/or cabled.

Often, at least the inner "primary coating" is formulated with one or more urethane-based reactive oligomers, often referred to as a "reactive urethane oligomer", that includes a backbone, a urethane group, and a polymerizable group. In many cases, the reactive urethane oligomer comprises a urethane acrylate oligomer that is a reaction product of a polyol, a diisocyanate, and a hydroxyl-group containing acrylate.

In addition, radiation-curable coating compositions, such as those used to coat optical fibers, often include a silane adhesion promoter. This can be particularly common when the radiation-curable coating composition is intended to be applied to a glass substrate, such as is the case with optical fiber coatings, especially the inner primary coating. In the primary coating, for example, the adhesion promoter provides a link between the polymer primary coating and the surface of the optical glass fiber.

In some cases, the adhesion promoter compound is simply an additive in the coating composition. Alternatively, the adhesion promoter may contain reactive groups that allow it to be covalently bonded to the polymer matrix of the coating. In an optical fiber primary coating formulation, for example, the reactive urethane oligomer may itself contain hydrolysable silane groups. Typically, such a reactive urethane oligomer is produced by including an active-hydrogen containing silane, such as a mercapto or amino functional silane, in the reactants used to produce the reactive urethane oligomer.

Ethylenically unsaturated compounds containing silane groups, such as the commercially available 3-(trimethoxysilyl)propyl acrylate, would also react with a reactive urethane oligomer typically used in optical fiber coating formulations, thereby resulting in covalent bonding of the adhesion promoter to the polymer matrix. Such compounds could also theoretically be produced by reacting an ethylenically unsaturated isocyanate-functional compound, such as isocyanatoethylacrylate, with an amino-functional silane, such as gamma-aminopropyltriethoxysilane, or a thiol-functional silane, such as gamma-mercaptopropyltriethoxysilane. The synthesis of these compounds is not without significant drawbacks. In the case of the amino-functional silane, the reaction with isocyanate will be extremely fast and difficult to control, whereas in the case of the thiol functional silane, the reaction would be sluggish and require sufficient catalyzation. Such catalyzation has typically been provided through the use of tin catalysts, which are undesirable from a regulatory and environmental standpoint. Organobismuth catalysts, such as the commercially available bismuth trineodecanoate, are more regulatory and environmental friendly, but their use for thiol functional silane reaction with isocyanate can result in not only slow reaction, but also significant color change.

In view of the foregoing, it would be highly desirable to provide adhesion promoting compounds that can be readily and efficiently synthesized and that exhibit significantly improved adhesion performance relative to other adhesion promoters. It would also be desirable to provide such adhesion promoting compounds that can be especially suitable for use in optical fiber coating applications, particularly in primary coating applications.

SUMMARY

In some respects, this specification relates to ethylenically unsaturated oligomers. The ethylenically unsaturated oligomers comprise: (a) a moiety of the structure (1):

$$-Y^1-Si(X)_3 \qquad (1);$$

(b1) a moiety of the structure (2):

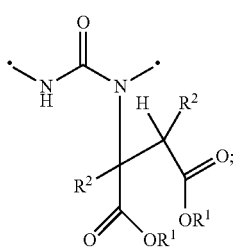

(2)

(b2) a moiety of the structure (3):

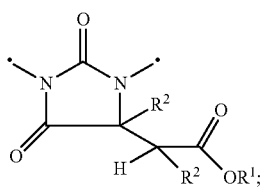

(3)

(b3) a combination of a moiety of the structure (2) and a moiety of the structure (3); and (c) a moiety of the structure (3a):

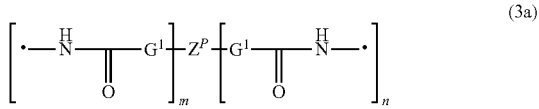

(3a)

in which (i) $Y^1$ represents a linear or branched linking group comprising 1 or more carbon atoms, (ii) each X, which may be the same or different, represents an alkoxy group or an organic group that is inert towards isocyanate groups at temperatures of 100° C. or less, with the proviso that at least one X represents an alkoxy group, (iii) each $R^1$, which may be the same or different, represents an organic group that is inert to isocyanate groups at temperatures of 100° C. or less; (iv) each $R^2$, which may be the same or different, represents hydrogen or an organic group that is inert to isocyanate groups at temperatures of 100° C. or less; (v) each "———●" represents a linkage to another portion of the ethylenically unsaturated oligomer; (vi) each $G^1$ is O or S, (vii) m has a value of 1 to 5, such as 1 to 3, or 1, (viii) n has a value of 1 to 5, 1 to 3, or 1, and (ix) $Z^P$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group.

This specification also relates to methods for producing such ethylenically unsaturated oligomers, compositions, such as a coating composition, that include such ethylenically unsaturated oligomers, and substrates, such as glass substrates, including optical fibers, which are at least partially coated with a coating, such as a primary coating, deposited from such coating compositions.

DETAILED DESCRIPTION

Various implementations are described and illustrated in this specification to provide an overall understanding of the structure, function, properties, and use of the disclosed inventions. It is understood that the various implementations described and illustrated in this specification are non-limiting and non-exhaustive. Thus, the invention is not limited by the description of the various non-limiting and non-exhaustive implementations disclosed in this specification. The features and characteristics described in connection with various implementations may be combined with the features and characteristics of other implementations. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various implementations disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise expressly indicated. Thus, the articles are used in this specification to refer to one or more than one (i.e., to "at least one") of the grammatical objects of the article.

Throughout this specification "Si" refers to silicon, "H" refers to hydrogen, "N" refers to nitrogen, "O" refers to oxygen, and "S" refers to sulfur.

As indicated, certain implementations of the present specification relate to ethylenically unsaturated oligomers. In some implementations, the ethylenically unsaturated oligomers of this specification have a number average molecular weight (Mn) of at least 800 g/mol. More specifically, in some cases, these oligomers have a Mn of 800 to 35,000 g/mol, 1000 g/mol to 35,000 g/mol, 2000 g/mol to 30,000 g/mol, 2000 g/mol to 25,000 g/mol, 2000 g/mol to 20,000 g/mol, 2,200 to 10,000 g/mol, or 2,200 to 5,500 g/mol. The molecular weight (including Mn, Mw, and Mz) values of oligomers and polymers referenced herein (unless otherwise indicated) are as measured by size exclusion chromatography (SEC) using a Waters GPC (Gel Permeation Chromatography) system with refractive index (RI) detector, a photodiode array detector, in which: (a) for chromatographic separation, chromatographic Size Exclusion columns: 3×7.8 mm×300 mm TSK-GEL MULTIPORE HXL-M, 5 μm, TosoHaas or equivalent, are used; (b) detectors and columns are operated at 40° C.; (c) polystyrene molecular weight standards are used to establish a calibration curve; (d) prior to conducting SEC, each respective oligomer and polystyrene molecular weight standard is dissolved at a concentration ranging from 0.5 to 10 mg/ml in high purity grade tetrahydrofuran (THF) containing BHT stabilizer, in which this THF solution is also used as an eluent in SEC analysis at a flow rate of 1.0 ml/min; (e) after completion of the dissolution, the relative molar mass and molar mass distribution are then determined with the above-referenced detection method using the refractive index and absorbance; (f) a calibration curve is generated with a series of polystyrene standards assigning each data slice a molecular weight and from which the relative molar mass and distribution can be obtained; and (g) the calibration curve, molecular mass averages, and the molar mass distributions are determined by integration of the whole refractive index chromatogram. As will be appreciated, polydispersity index (PDI) values reported herein refer to Mw/Mn.

As used herein, the term "oligomer" means a molecule of intermediate relative molecular mass, the structure of which comprises a plurality of units derived, actually or conceptually, from molecules of lower relative molecular mass. As used herein, the term "ethylenically unsaturated oligomer" means a compound that comprises a polymerizable carbon-carbon double bond, i.e., a carbon-carbon double bond that can react with another carbon-carbon double bond in a polymerization reaction. As will be appreciated, a polymerizable carbon-carbon double bond is generally comprised in an acryloyl (—C(=O)—CH=CH$_2$), methacryloyl (—C(=O)—C(CH$_3$)=CH$_2$) or vinyl (—CH=CH$_2$) group. In some implementations, the ethylenically unsaturated oligomer comprises at least one acrylate group, methacrylate group, acrylamide group, methacrylamide group, vinyloxy group, N-vinyl amide group, or any combination thereof. In some embodiments, the ethylenically unsaturated oligomer comprises only one of the aforementioned ethylenically unsaturated groups. In some implementations, the ethylenically unsaturated oligomer comprises 1 to 4, such as 1 to 2, or, in some cases, 1 ethylenically unsaturated group.

More specifically, the ethylenically unsaturated oligomers of this specification comprise:

(a) a moiety of the structure (1):

(b1) a moiety of the structure (2):

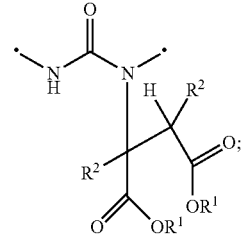

(b2) a moiety of the structure (3):

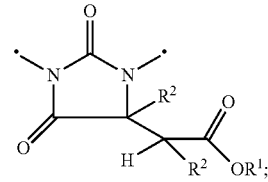

(b3) a combination of a moiety of the structure (2) and a moiety of the structure (3); and (c) a moiety of the structure (3a):

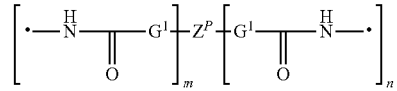

in which (i) $Y^1$ represents a linear or branched linking group comprising 1 or more carbon atoms, (ii) each X, which may be the same or different, represents an alkoxy group or an organic group that is inert towards isocyanate groups at temperatures of 100° C. or less, with the proviso that at least one X represents an alkoxy group, (iii) each $R^1$, which may be the same or different, each represent an organic group that is inert to isocyanate groups at temperatures of 100° C. or less; (iv) each $R^2$, which may be the same or different, each represent hydrogen or an organic group that is inert to isocyanate groups at temperatures of 100° C. or less; (v) each "———●" represents a linkage to another portion of the ethylenically unsaturated oligomer; (vi) each $G^1$ is O or S, (vii) m has a value of 1 to 5, such as 1 to 3, or 1, (viii) n has a value of 1 to 5, 1 to 3, or 1, and (ix) $Z^P$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group.

As indicated, each X, which may be the same or different, represents an alkoxy group or an organic group that is inert towards isocyanate groups at temperatures of 100° C. or less, with the proviso that at least one X represents an alkoxy group. As used herein, the phrase that a group is "inert towards isocyanate groups at temperatures of 100° C. or less" means that the group is inert towards isocyanate groups at such temperatures when, as is depicted in the various structures illustrated herein. the group is covalently attached to another atom in the structure being discussed. As will be appreciated, Zerevitinov-active hydrogens are not inert towards isocyanate groups at such temperatures and, as such, any organic group described in this specification as being inert towards isocyanate groups at such temperatures does not include a Zerevitinov-active hydrogen (Zerevitinov-active hydrogen is defined in *Rompp's Chemical Dictionary* (Rommp Chemie Lexikon), 10th ed., Georg Thieme Verlag Stuttgart, 1996). Generally, groups with Zerevitinov-active hydrogen are understood in the art to mean hydroxyl (OH), amino ($NH_x$), and thiol (SH) groups.

In some implementations, each $R^1$ and $R^2$ in structures (2) and (3), which may be the same or different, represents an alkyl group, such as an alkyl group having 1 to 9 or 1 to 4 carbon atoms, such as where each $R^1$ and $R^2$ in structures (2) and (3), which may be the same or different, represents a methyl group, an ethyl group, a propyl group or a butyl group. Moreover, in some implementations, each X in structure (1) represents an identical or different alkyl, acyloxy, or alkoxy group, such as an identical or different alkyl, acyloxy, or alkoxyl group having 1 to 9 or 1 to 4 carbon atoms, with the proviso that at least one X represents an alkoxy group, such as where at least two X's represent an alkoxy, such as methoxy, ethoxy, or propyloxy, group, or where each X represents an alkoxy, such as methoxy, ethoxy, or propyloxy group. In addition, in some implementations, $Y^1$ in structure (1) comprises a linear or branched alkylene radical having 1 to 8 carbon atoms, such as a linear alkylene radical having 2 to 4 or, in some cases 3, carbon atoms, or a branched alkylene radical having 5 to 6 carbon atoms.

In some implementations, the ethylenically unsaturated oligomer of this specification comprises the structure (4):

each $R^2$, which may be the same or different, represents hydrogen or an organic group that is inert to isocyanate groups at temperatures of 100° C. or less; (v) each $R^3$, which may be the same or different, represents H or $CH_3$, (vi) each X, which may be the same or different, represents an alkoxy group or an organic group that is inert towards isocyanate groups at temperatures of 100° C. or less, with the proviso that at least one X represents an alkoxy group, (vii) $Z^1$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group, (viii) m has a value of 1 to 5, such as 1 to 3, or 1, (ix) n has a value of 1 to 5, 1 to 3, or 1, (x) q has a value of at least 1, such as 1 to 20, 1 to 5, or 1 to 3, (xi) r is 1, 2 or 3; (xii) $L^N$ is represented by the structure:

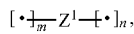

in which $Z^1$, m, and n are each as described above and "———●" represents a linkage to another portion of the ethylenically unsaturated oligomer, and (xiii) $L^1$ is represented by the structure (4a):

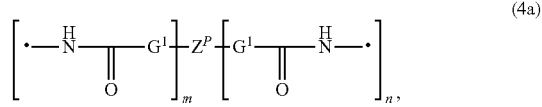

in which $Z^P$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group, and $G^1$, m, n and "———●" are each as described above.

As will be appreciated, in some implementations of the ethylenically unsaturated oligomer represented by structure

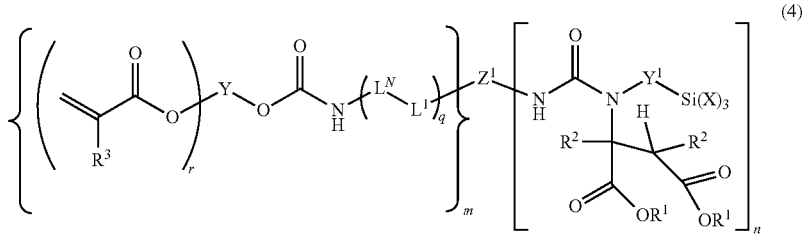

in which (i) each Y, which may be the same or different, represents a group comprising a branched or straight chain alkylene radical, such as where the branched or straight chain alkylene radical has at least 2, 2 to 8, or 2 to 4 carbon atoms; (ii) each $Y^1$, which may be the same or different, represents a linear or branched linking group comprising 1 or more carbon atoms, (iii) each $R^1$, which may be the same or different, represents an organic group that is inert to isocyanate groups at temperatures of 100° C. or less; (iv)

(4), the value of m and/or n in $L^N$ or $L^1$ can be more than 1, in which case more than one bond linkage from $L^N$ to NH will be present and/or more than one bond linkage from $L^1$ to $L^N$ will be present resulting in a further branched structure within the substructure encompassed within the "{ }".

In some implementations of the ethylenically unsaturated oligomer represented by structure (4), Y in structure (4) comprises a linear or branched alkylene radical having 1 to 8 carbon atoms, such as a linear alkylene radical having 2 to 4 or, in some cases 3, carbon atoms (such as a propylene radical), or a branched alkylene radical having 5 to 6 carbon atoms.

In some implementations of the ethylenically unsaturated oligomer represented by structure (4), at least one Y is:

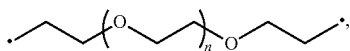

in which n has a value of 0 to 100, 0 to 50, or, in some cases, 0 to 10;

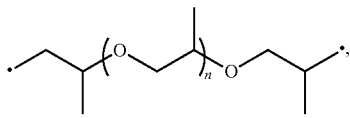

in which n has a value of 0 to 100, 0 to 50, or 0 to 10;

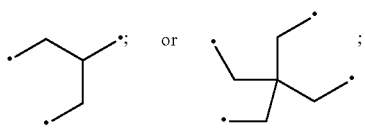

or a combination of any two or more thereof, in which each "———●" represents a linkage to another portion of the ethylenically unsaturated oligomer.

In some implementations of the ethylenically unsaturated oligomer represented by structure (4), $Z^1$ is:

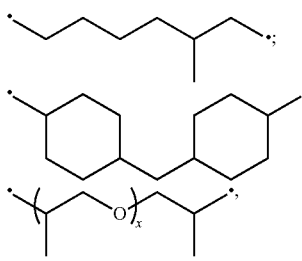

in which x has a value of 3 to 19;

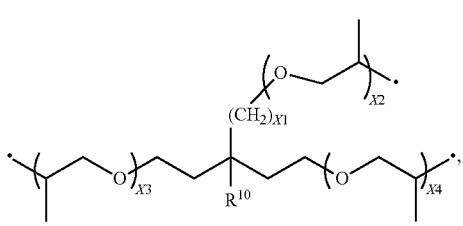

in which $R^{10}$ is $C_2H_5$ or H and each of X1, X2, X3 and X4, which may be the same or different, has a value of 1 to 10, provided that the structure has a molecular weight of 200 to 1500;

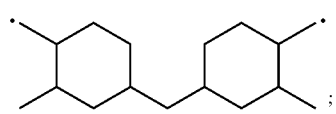

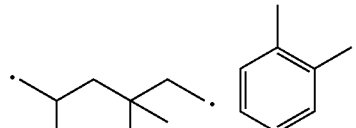

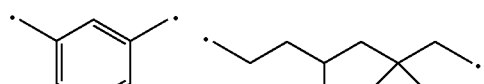

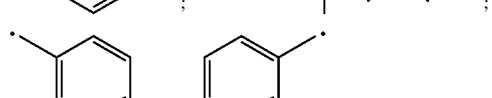

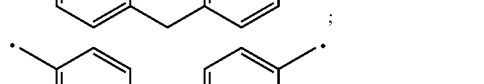

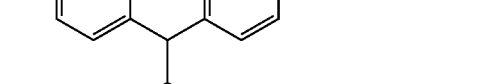

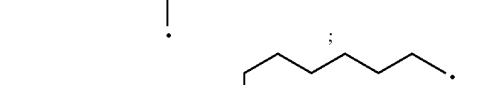

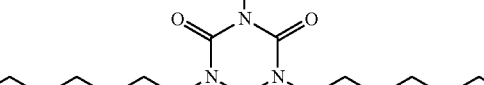

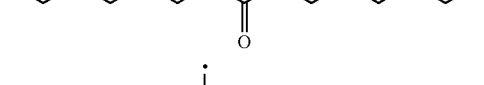

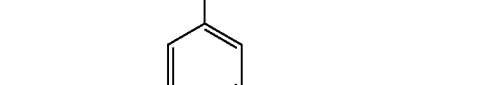

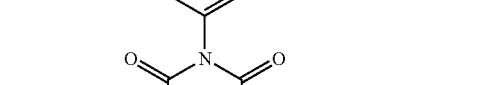

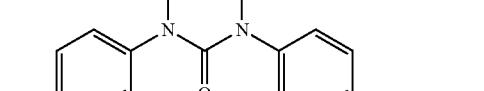

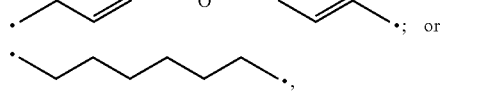

in which each "———●" represents a linkage to another portion of the ethylenically oligomer compound.

In addition, in some implementations of the ethylenically unsaturated oligomer represented by structure (4), each $R^1$ in structure (4), which may be the same or different, represents an alkyl group, such as an alkyl group having 1 to 9 or 1 to 4 carbon atoms, such as where $R^1$, which may be the same or different, represents a methyl group, an ethyl group, a propyl group or a butyl group and each $R^2$ in structure (4) represents a hydrogen. Moreover, in some implementations, each X in structure (4) represents an identical or different alkyl, acyloxy, or alkoxy group, such as an identical or different alkyl, acyloxy, or alkoxyl group having 1 to 9 or 1 to 4 carbon atoms, with the proviso that at least one X represents an alkoxy group, such as where at least two Xs represent an alkoxy, such as methoxy, ethoxy, or propyloxy, group, or where each X represents an alkoxy, such as methoxy, ethoxy, or propyloxy group. In addition, in some implementations, $Y^1$ in structure (4) comprises a linear or branched alkylene radical having 1 to 8 carbon atoms, such as a linear alkylene radical having 2 to 4 or, in some cases 3, carbon atoms (such as a propylene radical), or a branched alkylene radical having 5 to 6 carbon atoms.

Further, as indicated, $Z^P$ in structure (4a) represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group. In some implementations, $Z^P$ in structure (4a) is a portion of the residue of a polyol, such as a diol, a triol, or a higher functionality polyol, such as a polyether polyol, polyester polyol, polycarbonate polyol, polycaprolactone polyol, acrylic polyol, among others, including combinations of any two or more thereof.

In some implementations, $Z^P$ in structure (4a) is a portion of a residue of a polyether polyol, such as, for example, a polyethylene glycol, a polypropylene glycol, a polypropylene glycol-ethylene glycol copolymer, a polytetramethylene glycol, a polyhexamethylene glycol, a polyheptamethylene glycol, a polydecamethylene glycol, and polyether diols obtained by ring-opening copolymerization of two or more ion-polymerizable cyclic compounds, such as cyclic ethers, including, for example, ethylene oxide, propylene oxide, isobutene oxide, tetrahydrofuran, 2-methyltetrahydrofuran, 3-methyltetrahydrofuran, dioxane, trioxane, tetraoxane, cyclohexene oxide, styrene oxide, epichlorohydrin, isoprene monoxide, vinyl oxetane, vinyl tetrahydrofuran, vinyl cyclohexene oxide, phenyl glycidyl ether, butyl glycidyl ether, and glycidyl benzoate. Specific examples of combinations of two or more ion-polymerizable cyclic compounds include combinations for producing a binary copolymer such as tetrahydrofuran and 2-methyltetrahydrofuran, tetrahydrofuran and 3-methyltetrahydrofuran, and tetrahydrofuran and ethylene oxide; and combinations for producing a ternary copolymer such as a combination of tetrahydrofuran, 2-methyltetrahydrofuran, and ethylene oxide, a combination of tetrahydrofuran, butene-1-oxide, and ethylene oxide, and the like. The ring-opening copolymers of these ion-polymerizable cyclic compounds may be either random copolymers or block copolymers.

In some implementations, $Z^P$ in structure (4a) is a portion of a residue of a polyester polyol, such as may be obtained by reacting a polyhydric alcohol and a polybasic acid. As examples of the polyhydric alcohol, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like can be given. As examples of the polybasic acid, phthalic acid, dimer acid, isophthalic acid, terephthalic acid, maleic acid, fumaric acid, adipic acid, sebasic acid, and the like can be given.

$Z^P$, in some implementations, in structure (4a) is a portion of a residue of a polycarbonate polyol, such as, for example, a polycarbonate of polytetrahydrofuran, a poly(hexanediol carbonate), a poly(nonanediol carbonate), and a poly(3-methyl-1,5-pentamethylene carbonate).

Further, in some implementations, $Z^P$ in structure (4a) is a portion of a residue of a polycaprolactone diol, such as may be obtained by reacting ε-caprolactone and a diol to provide a polycaprolactone polyol having a melting point of 0° C. or higher. Suitable diols for producing such polycaprolactone diols include, without limitation, ethylene glycol, polyethylene glycol, polypropylene glycol, polypropylene glycol, tetramethylene glycol, polytetramethylene glycol, 1,2-polybutylene glycol, 1,6-hexanediol, neopentyl glycol, 1,4-cyclohexanedimethanol, and 1,4-butanediol, among others, including combinations of any two or more thereof.

Still other suitable polyols from which $Z^P$ in structure (4a) may be derived include, without limitation, ethylene glycol, 1,4-butanediol, 1,5-pentanediol, 1,6-hexanediol, polyoxyethylene bisphenol A ether, polyoxypropylene bisphenol A ether, polyoxyethylene bisphenol F ether, and polyoxypropylene bisphenol F ether, including combinations thereof.

In some implementations, $Z^P$ in structure (4a) is a portion of a residue of a polyol that has a number average molecular weight, derived from the hydroxyl number of the polyol, of 50 to 15,000 g/mol, such as 1,000 to 8,000 g/mol, or, in some cases, 2,000 to 6,000 g/mol or 3,000 to 5,000 g/mol.

In other implementations, the ethylenically unsaturated oligomer of this specification comprises the structure (5):

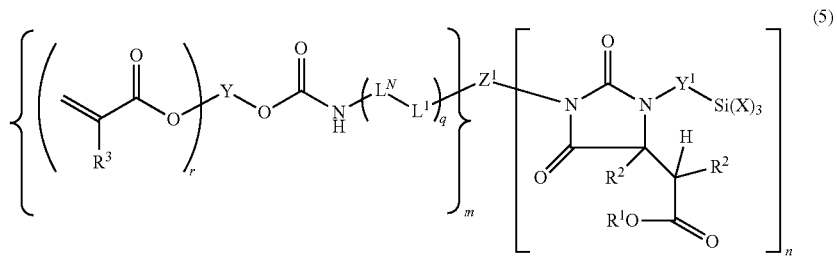

(5)

wherein Y, $Y^1$, $R^1$, $R^2$, $R^3$, X, $Z^1$, $L^N$, $L^1$, m, n, q and r are each as described above with reference to structure (4).

As will be appreciated, in some implementations of the ethylenically unsaturated oligomer represented by structure (5), the value of m and/or n in $L^N$ and/or $L^1$ can be more than 1, in which case more than one bond linkage from $L^N$ to NH will be present and/or more than one bond linkage from $L^1$ to $L^N$ will be present, resulting in a further branched structure within the substructure encompassed within the "{ }".

In yet other implementations, the ethylenically unsaturated oligomer of this specification comprises the structure (6):

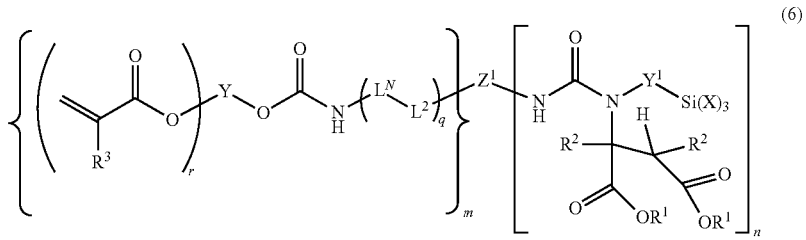

(6)

wherein Y, $Y^1$, $R^1$, $R^2$, $R^3$, $Z^1$, X, $L^N$, m, n, q, and r are each as described above with reference to structure (4), and $L^2$ is a mixture of $L^1$ and $L^B$, in which $L^1$ is represented by structure (4a), and $L^B$ is represented by structure (6b):

wherein Y, $Y^1$, $R^1$, $R^2$, $R^3$, $Z^1$, X, $L^N$, m, n, q, and r are each as described above with reference to structure (4), and $L^3$ is a mixture of $L^1$ and $L^C$, in which $L^1$ is represented by structure (4a) and $L^C$ is represented by the structure (7b):

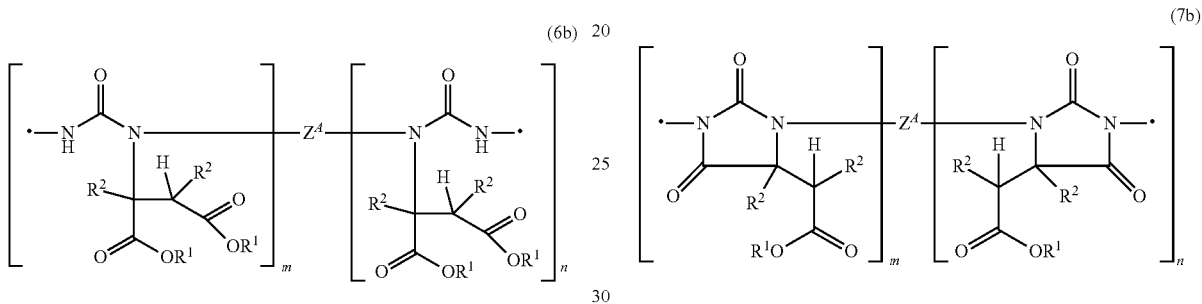

(6b)

(7b)

in which: (i) $Z^A$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group; (ii) $R^1$, $R^2$, m, and n are each as described above with reference to structure (4), and (iii) each "———●" represents a linkage to another portion of the ethylenically unsaturated oligomer.

As will be appreciated, in some implementations of the ethylenically unsaturated oligomer represented by structure (6), the value of m and/or n in $L^N$ and/or $L^2$ can be more than 1, in which case more than one bond linkage from $L^N$ to NH will be present and/or more than one bond linkage from $L^2$ to $L^N$ will be present, resulting in a further branched structure within the substructure encompassed within the "{ }".

In still other implementations, the ethylenically unsaturated oligomer of this specification comprises the structure (7):

in which: (i) $Z_A$ is as described above with reference to structure (6b); $R^1$, $R^2$, m, and n are each as described above with reference to structure (4); and (iii) each "———●" represents a linkage to another portion of the ethylenically unsaturated oligomer.

As will be appreciated, in some implementations of the ethylenically unsaturated oligomer represented by structure (7), the value of m and/or n in $L^N$ and/or $L^3$ can be more than 1, in which case more than one bond linkage from $L^N$ to NH will be present and/or more than one bond linkage from $L^3$ to $L^N$ will be present, resulting in a further branched structure within the substructure encompassed within the "{ }".

In further implementations, the ethylenically unsaturated oligomer of this specification comprises the structure (8):

(8)

in which: (1) $Z^A$ is as described above with reference to structure (6b); (2) $A^1$ is:

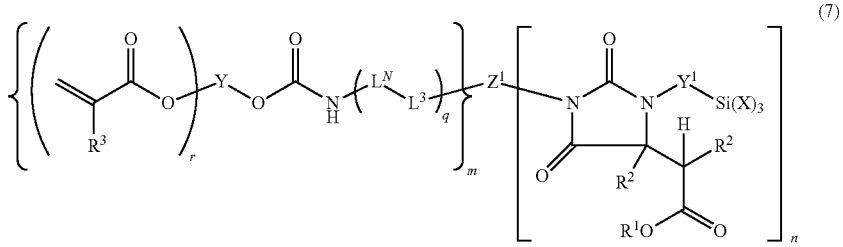

(7)

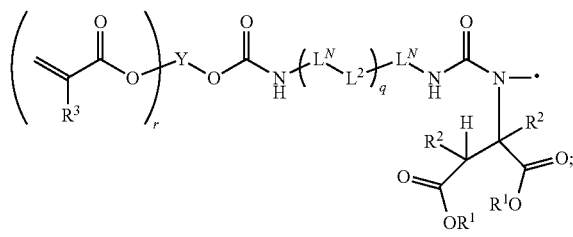

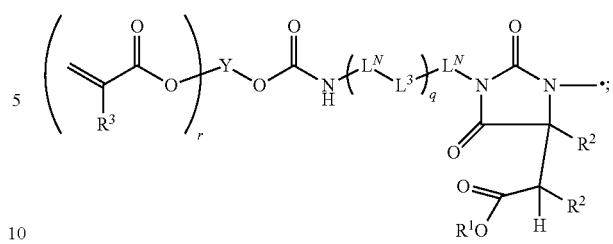

and (3) B¹ is:

and (3) B² is:

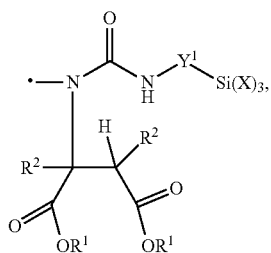

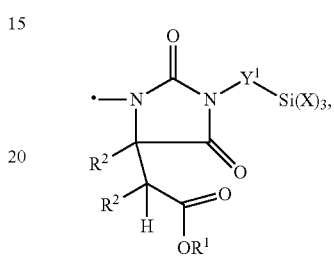

wherein Y, Y¹, R¹, R², R³, X, $L^N$, m, n, q, and r are each as described above with reference to structure (4), each "———●" represents a linkage to $Z^A$, and $L^2$ is $L^1$ or a mixture of $L^1$ and $L^B$, which $L^1$ is represented by structure (4a) and $L^B$ is represented by structure (8b):

wherein Y, Y¹, R¹, R², R³, X, $L^N$, m, n, q and r are each as described above with reference to structure (4), each "———●" represents a linkage to $Z^A$, and $L^3$ is $L^1$, or a mixture of $L^1$ and $L^C$, in which $L^1$ is represented by structure (4a) and $L^C$ is represented by structure (9a):

(8b)

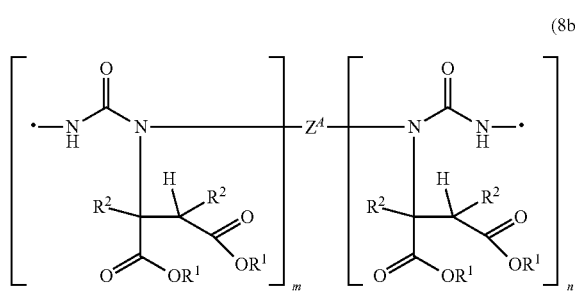

(9a)

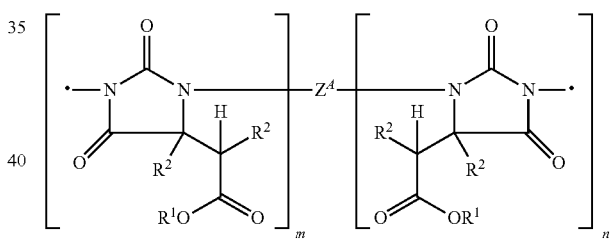

in which: (i) $Z^A$ is as described above with reference to structure (6b); (ii) R¹, R², m, and n are each as described above with reference to structure (4); and (iii) each "———●" represents a linkage to $L^N$.

As will be appreciated, in some implementations of the ethylenically unsaturated oligomer represented by structure (8), the value of m and/or n in $L^N$ and/or $L^2$ can be more than 1, in which case more than one bond linkage from $L^N$ to NH will be present and/or more than one bond linkage from $L^2$ to $L^N$ will be present, resulting in a further branched structure within the substructure encompassed within the "{ }".

In other further implementations, the ethylenically unsaturated oligomer of this specification comprises the structure (9):

in which: (i) $Z^A$ is as described above with reference to structure (6b); (ii) R¹, R², m, and n are each as described above with reference to structure (4); and (iii) each "———●" represents a linkage to $L^N$.

As will be appreciated, in some implementations of the ethylenically unsaturated oligomer represented by structure (9), the value of m and/or n in $L^N$ and/or $L^3$ can be more than 1, in which case more than one bond linkage from $L^N$ to NH will be present and/or more than one bond linkage from $L^3$ to $L^N$ will be present, resulting in a further branched structure within the substructure encompassed within the "{ }".

In still further implementations, the ethylenically unsaturated oligomer of this specification has the structure (10):

(9)

(10)

in which: (1) $Z^A$ is as described above with reference to structure (6b); (2) A² is:

in which: (1) $Z^A$ is as described above with reference to structure (6b); (2) A³ is:

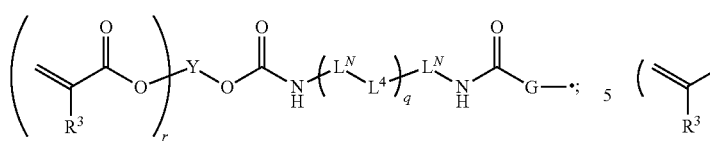

and (3) $B^3$ is:

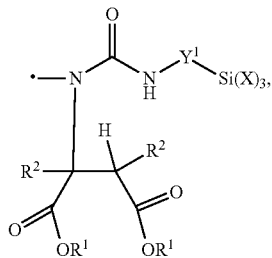

wherein (i) Y, $Y^1$, $R^1$, $R^2$, $R^3$, X, $L^N$, m, n, q, and r are each as described above with reference to structure (4), (ii) G is O, S, or NH, (iii) each "———●" represents a linkage to $Z^A$, and (iv) $L^4$ is $L^1$ or a mixture of $L^1$ and $L^D$ in which $L^1$ is represented by the structure (4a) and $L^D$ is represented by the structure (10b):

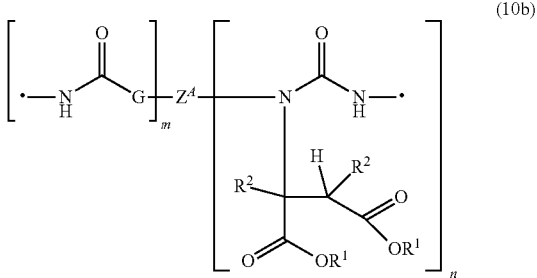

(10b)

in which: (i) $Z^A$ is as described above with reference to structure (6b); (ii) G is O, S, or NH; (iii) $R^1$, $R^2$, m, and n are each as described above with reference to structure (4); and (iv) each "———●" represents a linkage to $L^N$.

As will be appreciated, in some implementations of the ethylenically unsaturated oligomer represented by structure (9), the value of m and/or n in $L^N$ and/or $L^4$ can be more than 1, in which case more than one bond linkage from $L^N$ to NH will be present and/or more than one bond linkage from $L^4$ to $L^N$ will be present, resulting in a further branched structure within the substructure encompassed within the "{ }".

In yet other further implementations, the ethylenically unsaturated oligomer of this specification comprises the structure (11):

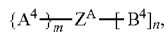

(11)

in which: (1) $Z^A$ is as described above with reference to structure (6b); (2) $A^4$ is:

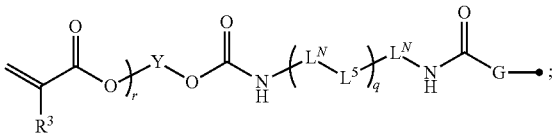

and (3) $B^4$ is:

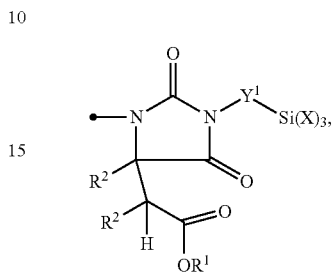

wherein (i) Y, $Y^1$, $R^1$, $R^2$, $R^3$, X, $L^N$, m, n, q and r are each as described above with reference to structure (4), (ii) G is O, S or NH, (iii) each "———●" represents a linkage to $Z^A$, and (iv) $L^1$ is $L^1$, or a mixture of $L^1$ and $L^E$, in which $L^1$ is represented by structure (a, and $L^E$ is represented by structure (11b):

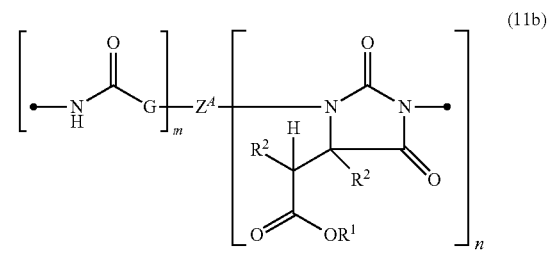

(11b)

in which: (i) $Z^A$ is as described above with reference to structure (6b); (ii) G is O, S, or NH; (iii) $R^1$, $R^2$, m, and n are each as described above with reference to structure (4); and (iv) each "———●" represents a linkage to $L^N$.

As will be appreciated, in some implementations of the ethylenically unsaturated oligomer represented by structure (11), the value of m and/or n in $L^N$ and/or $L^1$ can be more than 1, in which case more than one bond linkage from $L^N$ to NH will be present and/or more than one bond linkage from $L^5$ to $L^N$ will be present, resulting in a further branched structure within the substructure encompassed within the "{ }".

In further implementations, the ethylenically unsaturated oligomer of this specification comprises the structure (12):

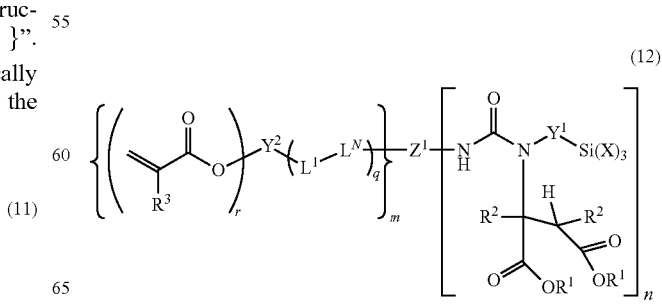

(12)

in which: (i) $R^1$, $R^2$, $R^3$, X, $Z^1$, $L^1$, $L^N$, m, n, q and r are each as described above with reference to structure (4); and (ii) $Y^2$ represents a group comprising a branched or straight chain alkylene radical, such as where the branched or straight chain alkylene radical has at least 2, 2 to 8, or 2 to 4 carbon atoms.

In some implementations, $Y^2$ in structure (12) comprises a linear or branched alkylene radical having 1 to 8 carbon atoms, such as a linear alkylene radical having 2 to 4 or, in some cases 3, carbon atoms (such as a propylene radical), or a branched alkylene radical having 5 to 6 carbon atoms.

In some implementations of the ethylenically unsaturated oligomer represented by structure (12), at least one $Y^2$ is:

—$C_2H_4$—;

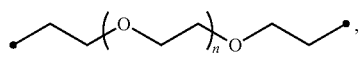

in which n has a value of 0 to 100, 0 to 50, or, in some cases, 0 to 10;

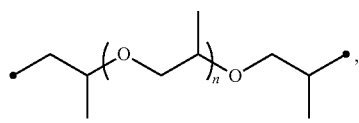

in which n has a value of 0 to 100, 0 to 50, or 0 to 10;

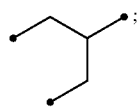

or

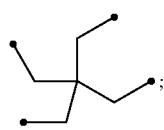

or a combination of any two or more thereof, in which each "———●" represents a linkage to another portion of the ethylenically unsaturated oligomer.

As will be appreciated, in some implementations of the ethylenically unsaturated oligomer represented by structure (12), the value of m and/or n in $L^N$ and/or $L^1$ can be more than 1, in which case more than one bond linkage from $L^N$ to $L^1$ will be present and/or more than one bond linkage from $L^1$ to $Y^2$ will be present, resulting in a further branched structure within the substructure encompassed within the "{ }".

In still further implementations, the ethylenically unsaturated oligomer of this specification comprises the structure (13):

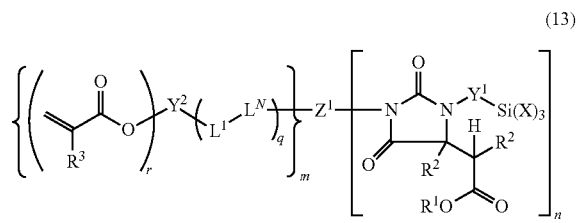

(13)

in which: (i) $R^1$, $R^2$, $R^3$, X, $Z^1$, $L^1$, $L^N$, m, n, q and r are each as described above with reference to structure (4); and (ii) $Y^2$ is as described above with reference to structure (12).

As will be appreciated, in some implementations of the ethylenically unsaturated oligomer represented by structure (13), the value of m and/or n in $L^N$ and/or $L^1$ can be more than 1, in which case more than one bond linkage from $L^N$ to $L^1$ will be present and/or more than one bond linkage from $L^1$ to $Y^2$ will be present, resulting in a further branched structure within the substructure encompassed within the "{ }".

In other further implementations, the ethylenically unsaturated oligomer of this specification has the structure (14):

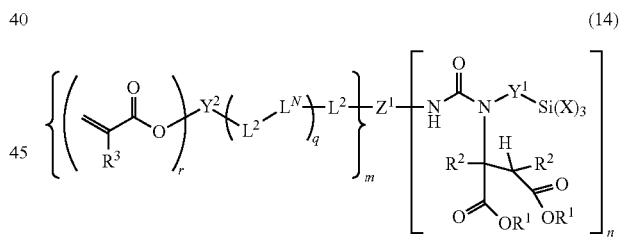

(14)

in which: (i) $R^1$, $R^2$, $R^3$, X, $Z^1$, $L^N$, m, n, q and r are each as described above with reference to structure (4); (ii) $L^2$ is as described above with reference to structure (6); and (iii) $Y^2$ is as described above with reference to structure (12).

As will be appreciated, in some implementations of the ethylenically unsaturated oligomer represented by structure (14), the value of m and/or n in $L^N$ and/or $L^2$ can be more than 1, in which case more than one bond linkage from $L^N$ to $L^2$ will be present and/or more than one bond linkage from $L^2$ to $Y^2$ will be present, resulting in a further branched structure within the substructure encompassed within the "{ }".

In some other implementations, the ethylenically unsaturated oligomer of this specification comprises the structure (15):

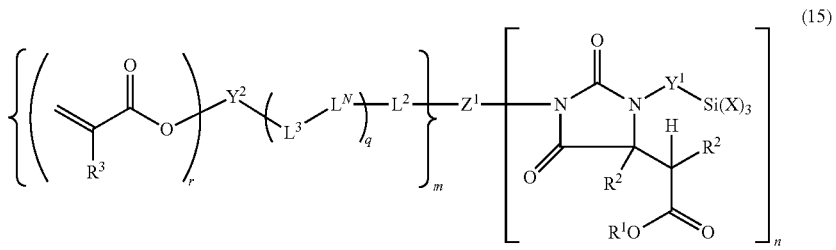

(15)

in which: (i) $R^1$, $R^2$, $R^3$, X, $Z^1$, $L^N$, m, n, q and r are each as described above with reference to structure (4); (ii) $L^3$ is as described above with reference to structure (7); and (iii) $Y^2$ is as described above with reference to structure (12).

As will be appreciated, in some implementations of the ethylenically unsaturated oligomer represented by structure (15), the value of m and/or n in $L^N$ and/or $L^3$ can be more than 1, in which case more than one bond linkage from $L^N$ to $L^3$ will be present and/or more than one bond linkage from $L^3$ to $Y^2$ will be present, resulting in a further branched structure within the substructure encompassed within the "{ }".

In some implementations, the ethylenically unsaturated oligomer of this specification comprises the structure (16):

(16)

in which: (1) $Z^A$ is as described above with reference to structure (6b); (2) $A^5$ is:

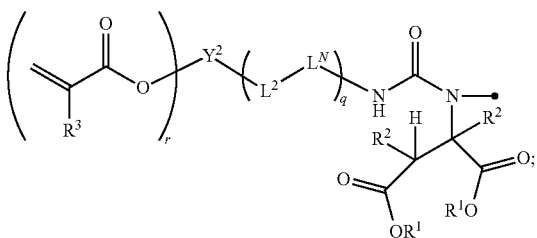

and (3) $B^5$ is:

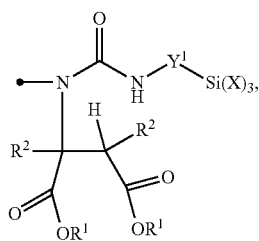

wherein: (i) $Y^1$, $R^1$, $R^2$, $R^3$, X, $L^N$, m, n, q, and r are each as described above with reference to structure (4); (ii) $L^2$ is as described above with respect to structure (6), and (iii) each "———●" represents a linkage to $Z^A$.

As will be appreciated, in some implementations of the ethylenically unsaturated oligomer represented by structure (16), the value of m and/or n in $L^N$ and/or $L^2$ can be more than 1, in which case more than one bond linkage from $L^N$ to $L^2$ will be present and/or more than one bond linkage from $L^2$ to $Y^2$ will be present, resulting in a further branched structure within the substructure encompassed within the "{ }".

In other implementations, the ethylenically unsaturated oligomer of this specification comprises the structure (17):

(17)

in which: (1) $Z^A$ is as described above with reference to structure (6b); (2) $A^6$ is:

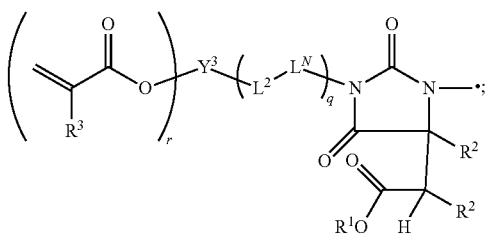

and (3) $B^6$ is:

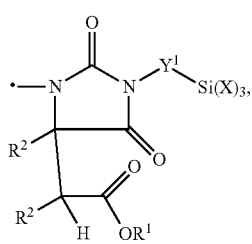

wherein: (i) $Y^1$, $R^1$, $R^2$, $R^3$, X, $L^N$, m, n, q, and r are each as described above with reference to structure (4); (ii) $L^2$ is as described above with respect to structure (6), and (iii) each "———●" represents a linkage to $Z^A$.

As will be appreciated, in some implementations of the ethylenically unsaturated oligomer represented by structure (17), the value of m and/or n in $L^N$ and/or $L^2$ can be more than 1, in which case more than one bond linkage from $L^N$ to $L^2$ will be present and/or more than one bond linkage from $L^2$ to $Y^2$ will be present, resulting in a further branched structure within the substructure encompassed within the "{ }".

In other cases, the ethylenically unsaturated oligomer of this specification comprises the structure (18):

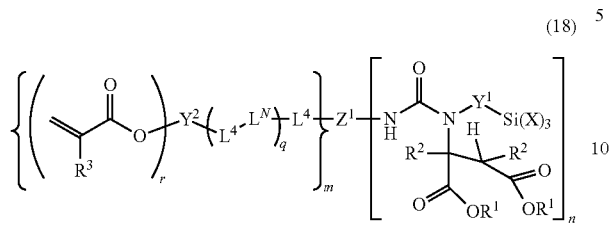
(18)

in which: (i) $R^1$, $R^2$, $R^3$, X, $Z^1$, $L^N$, m, n, q and r are each as described above with reference to structure (4); (ii) $L^4$ is as described above with reference to structure (10); and (iii) $Y^2$ is as described above with reference to structure (12).

As will be appreciated, in some implementations of the ethylenically unsaturated oligomer represented by structure (18), the value of m and/or n in $L^N$ and/or $L^4$ can be more than 1, in which case more than one bond linkage from $L^N$ to $L^4$ will be present and/or more than one bond linkage from $L^4$ to $Y^2$ will be present, resulting in a further branched structure within the substructure encompassed within the "{ }".

In some other implementations, the ethylenically unsaturated oligomer of this specification comprises the structure (19):

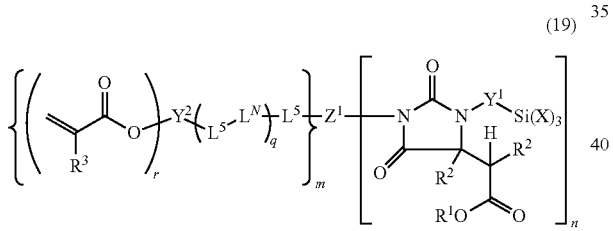
(19)

in which: (i) $R^1$, $R^2$, $R^3$, X, $Z^1$, $L^N$, m, n, q and r are each as described above with reference to structure (4); (ii) $L^5$ is as described above with reference to structure (11); and (iii) $Y^2$ is as described above with reference to structure (12).

As will be appreciated, in some implementations of the ethylenically unsaturated oligomer represented by structure (19), the value of m and/or n in $L^N$ and/or $L^5$ can be more than 1, in which case more than one bond linkage from $L^N$ to $L^5$ will be present and/or more than one bond linkage from $L^5$ to $Y^2$ will be present, resulting in a further branched structure within the substructure encompassed within the "{ }".

In still other cases, the ethylenically unsaturated oligomer of this specification has the structure (20):

(20)

in which: (1) $Z^A$ is as described above with reference to structure (6b); (2) $A^7$ is:

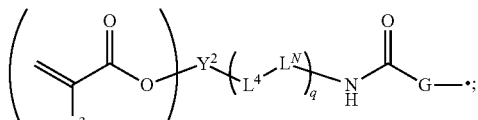

and (3) $B^7$ is:

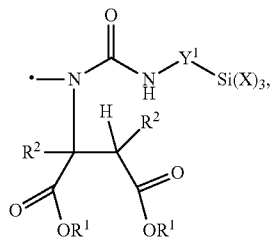

wherein (i) $Y^1$, $R^1$, $R^2$, $R^3$, X, $L^N$, m, n, q, and r are each as described above with reference to structure (4), (ii) G is O, S, or NH, (iii) L4 is as described above with reference to structure (10); (iv) $Y^2$ is as described above with reference to structure (12); and (v) each "———●" represents a linkage to $Z^A$.

As will be appreciated, in some implementations of the ethylenically unsaturated oligomer represented by structure (20), the value of m and/or n in $L^N$ and/or $L^4$ can be more than 1, in which case more than one bond linkage from $L^N$ to $L^4$ will be present and/or more than one bond linkage from $L^4$ to $Y^2$ will be present, resulting in a further branched structure within the substructure encompassed within the "{ }".

In yet other cases, the ethylenically unsaturated oligomer of this specification has the structure (21):

(21)

in which: (1) $Z^A$ is as described above with reference to structure (6b); (2) $A^1$ is:

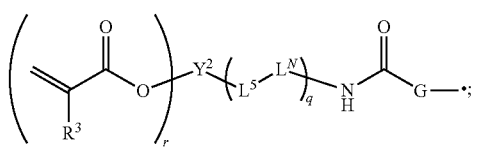

and (3) $B^8$ is:

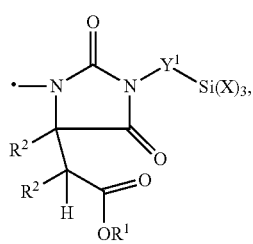

wherein (i) $Y^1$, $R^1$, $R^2$, $R^3$, X, $L^N$, m, n, and q are each as described above with reference to structure (4), (ii) G is O, S or NH, (iii) $L^5$ is as described above with reference to structure (11); (iv) $Y^2$ is as described above with reference to structure (12); and (v) each "———●" represents a linkage to $Z^A$.

As will be appreciated, in some implementations of the ethylenically unsaturated oligomer represented by structure (21), the value of m and/or n in $L^N$ and/or $L^5$ can be more than 1, in which case more than one bond linkage from $L^N$ to $L^5$ will be present and/or more than one bond linkage from $L^5$ to $Y^2$ will be present, resulting in a further branched structure within the substructure encompassed within the "{ }".

Some implementations of the ethylenically unsaturated oligomers of this specification comprise a reaction product of reactants comprising: (a) a polyisocyanate; (b) an active hydrogen-containing ethylenically unsaturated compound; (c) a compound comprising more than one active hydrogen atoms; and (d) an aspartate silane.

Examples of suitable polyisocyanates (a) include 2,4-tolylene diisocyanate, 2,6-tolylene diisocyanate, (hydrogenated) xylylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, 2,4,4 trimethyl hexamethylene diisocyanate, hexamethylene diisocyanate, 2,4- and/or 4,4'-methylenedicyclohexyl diisocyanate, methylene diphenyl diisocyanate, tetramethyl xylene diisocyanate, 1,5-pentane diisocyanate, bis(2-isocyanatoethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, hexamethylene diisocyanate trimers (such as is commercially available as Desmodur® N3300A from Covestro), triphenylmethane-4,4',4"-triisocyanate (such as is commercially available as Desmodur® RE from Covestro), hexamethylene diisocyanate trimers (such as is commercially available as Desmodur® N3200 from Covestro), aromatic polyisocyanates based on toluene diisocyanate (such as is commercially available as Desmodur® IL BA from Covestro), polyisocyanurates of toluene diisocyanate (such as is commercially available as Desmodur® RC from Covestro), or a combination of any two or more thereof.

In some implementations, the polyisocyanate (a) has the structure:

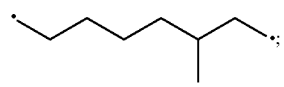

in which (i) m has a value of 1 to 5, such as 1 to 3, or 1, (ii) n has a value of 1 to 5, 1 to 3, or 1, and (iii) $Z^1$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group. In some cases, $Z^1$ is:

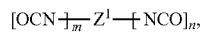

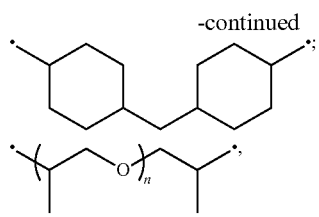

in which x has a value of 3 to 19;

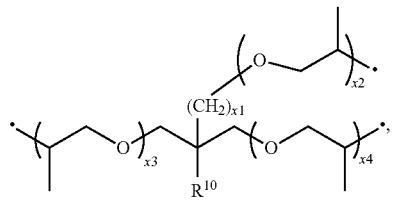

in which each X1, X2, X3 and X4, which may be the same or different, has a value of 1 to 10, provided that the structure has a molecular weight of 200 to 1500, and $R^{10}$ is $C_2H_5$ or H;

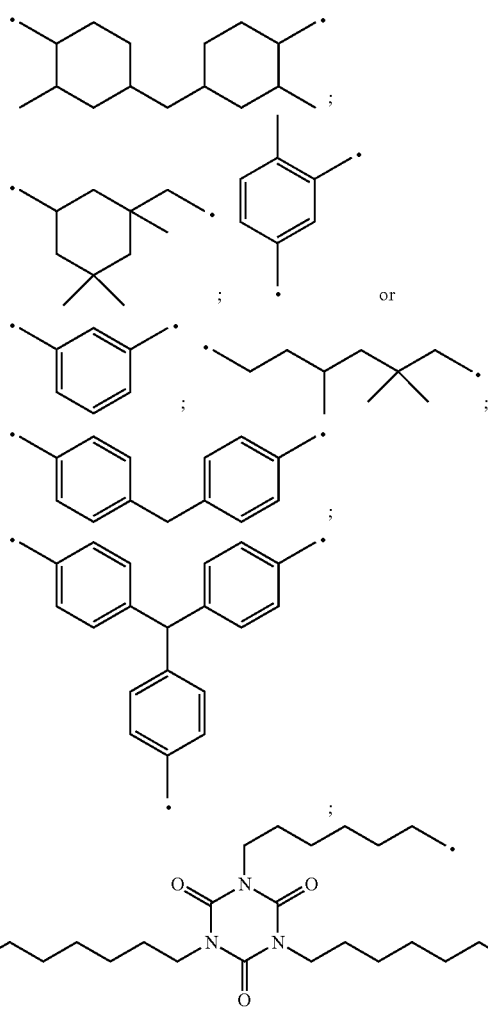

-continued

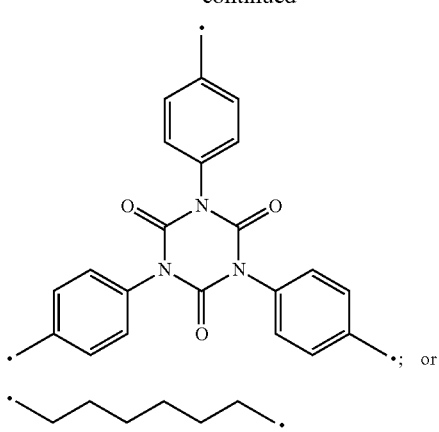

in which each "———●" represents a linkage to an NCO group. In some of these implementations, the active hydrogen-containing ethylenically unsaturated compound (b) comprises an active hydrogen-containing (meth)acrylate of the structure:

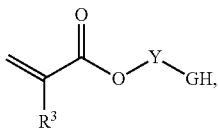

in which $R^3$ is H or $CH_3$, G is O, S, or NH, and Y represents a linear or branched linking group comprising 1 or more carbon atoms, such as where Y comprises a linear or branched alkylene radical having 1 to 8 carbon atoms, such as a linear alkylene radical having 2 to 4 or, in some cases 3, carbon atoms (such as a propylene radical), or a branched alkylene radical having 5 to 6 carbon atoms.

Examples of suitable compounds comprising more than one active hydrogen atoms (c) include compounds of the structure:

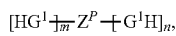

in which (i) m has a value of 1 to 5, such as 1 to 3, or 1, (ii) n has a value of 1 to 5, 1 to 3, or 1, (iii) each $G^1$, which may be the same or different, is O or S, and (iv) $Z^P$ is a linking group, which may be monomeric, oligomeric, or polymeric, that has a chain length sufficient to provide the compound comprising more than one active hydrogen atoms (c) with a molecular weight (or a number average molecular weight in the case where $Z^P$ is oligomeric or polymeric) of 50 to 15,000 g/mol, such as 1,000 to 8,000 g/mol, or, in some cases, 2,000 to 6,000 g/mol or 3,000 to 5,000 g/mol. For example, in some implementations, such a compound comprising more than one active hydrogen atoms (c) comprises a polyol, such as a polyether polyol, polyester polyol, polycarbonate polyol, polycaprolactone polyol, acrylic polyol, among others, including combinations of any two or more thereof, including any such polyols described earlier in this specification.

In some implementations, the aspartate silane (d) has the structure:

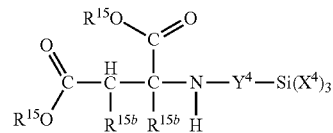

in which each $R^{15}$ and each $X^4$, which may be the same or different, represents an organic group that is inert with respect to isocyanate groups at temperatures of 100° C. or less, with the proviso that at least one $X^4$ represents an alkoxy group, $Y^4$ represents a linear or branched linking group comprising 1 or more carbon atoms, and each $R^{15b}$, which may be the same or different, represents hydrogen or an organic group which is inert towards isocyanate groups at temperatures of 100° C. or less.

The foregoing aspartate silane may comprise a reaction product of reactants comprising: (i) an aminoalkyl alkoxysilane of the formula $H_2N-(CH_2)_n-Si(X^5)_3$ and (ii) a maleic or fumaric acid ester of the formula $R^{16}OOC-CR^{18}=CR^{18}-COOR^{17}$, in which $R^{16}$ and $R^{17}$ represent identical or different organic groups which are isocyanate-inert below 100° C., such as where $R^{16}$ and $R^{17}$ represent identical or different alkyl groups having 1 to 4 carbon atoms, each $R^{18}$, which may be the same or different, represents hydrogen or an organic group which is isocyanate-inert below 100° C. each $X^5$ represents identical or different organic groups which are isocyanate-inert below 100° C., with the proviso that at least one $X^5$ is an alkoxy group, such as where each $X^5$ represents an identical or different alkyl or alkoxy group having 1 to 4 carbon atoms, with the proviso that at least one $X^5$ is an alkoxy group, and n is an integer having a value of 2 to 4, such as 3.

Specific examples of suitable aminoalkyl alkoxysilanes include, without limitation, 2-aminoethyl-dimethylmethoxysilane, 3-aminopropyl-trimethoxysilane, 3-aminopropyl-triethoxysilane, 3-aminopropyl-methyl-diethoxysilane, or a mixture of any two or more thereof. Specific examples of suitable maleic or fumaric acid esters include, without limitation, maleic acid dimethyl ester, maleic acid diethyl ester, maleic acid di-n-butyl ester, fumaric acid dimethyl ester, fumaric acid diethyl ester, fumaric acid di-n-butyl ester, or a mixture of any two or more thereof.

The reaction of the maleic or fumaric acid ester with the aminoalkyl alkoxysilane may be carried out within a temperature range of, for example, 0° C. to 100° C. The quantity of acid ester and aminoalkyl alkoxysilane may be chosen so that the starting compounds are used in a molar ratio of acid ester to aminoalkyl alkoxysilane of 0.8 to 1.2:1, such as 1.0 to 1.2:1 or, in some cases, 1.01 to 1.2:1. The reaction may be carried out with or without a solvent, such as dioxane. The reaction may, of course, be carried out with mixtures of different 3-aminoalkyl alkoxysilanes and mixtures of fumaric and/or maleic acid esters.

The reaction of the polyisocyanate with (i) the active hydrogen-containing ethylenically unsaturated compound, (ii) the compound comprising more than one active hydrogen atoms, and (iii) the aspartate silane to produce the ethylenically unsaturated oligomer of certain embodiments of this specification may, if desired, be carried out in the presence of a catalyst. Suitable catalysts include, without limitation, an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing. In some implementations, the reaction takes place at a temperature of 10 to 120° C. or 25 to 100° C. In addition, in some implementations, the reactants are employed in relative amounts to provide a molar ratio of isocyanate-reactive groups to isocyanate groups of at least 1:1, such as more than 1 to less than 1.5. The resulting ethylenically unsaturated oligomer comprises an aspartate group from the aspartate silane, as is depicted, for example, by structure (4) described earlier.

In some implementations, the resulting aspartate group-containing ethylenically unsaturated oligomer is subjected to further processing to convert the aspartate group to a hydantoin group, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., or 80 to 100° C. The resulting ethylenically unsaturated oligomer comprises a hydantoin group, as is depicted, for example, by structure (5) described earlier.

As a result, this specification also relates to methods for making an ethylenically unsaturated oligomer. The method comprises reacting a polyisocyanate with an active hydrogen-containing ethylenically unsaturated compound, a compound comprising more than one active hydrogen atoms, and an aspartate silane, optionally in the presence of a catalyst, to produce an ethylenically unsaturated oligomer comprising an aspartate group. In these methods, the aspartate silane has the structure:

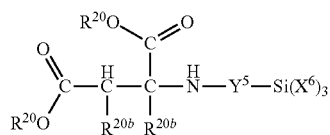

in which each $R^{20}$, which may be the same or different, represents an organic group that is inert with respect to isocyanate groups at temperatures of 100° C. or less, each $R^{20b}$, which may be the same or different, represents hydrogen or an organic group which is inert towards isocyanate groups at temperatures of 100° C. or less, each $X^6$ represents an alkoxy group or an organic group that is inert with respect to isocyanate groups at temperatures of 100° C. or less, with the proviso that at least one $X^6$ represents an alkoxy group, and $Y^5$ represents an organic group that is inert with respect to isocyanate groups at temperatures of 100° C. or less. In some implementations, the method further comprises converting the aspartate group to a hydantoin group, wherein such conversion is carried out optionally in the presence of a catalyst, to produce an ethylenically unsaturated oligomer comprising a hydantoin group.

In other implementations, the ethylenically unsaturated oligomers of this specification comprise a reaction product of reactants comprising: (a) a polyisocyanate; (b) an active hydrogen-containing ethylenically unsaturated compound; (c) a compound comprising more than one active hydrogen atoms; (d) an aspartate silane; and (e) a polyaspartate amine. In these implementations, suitable polyisocyanates, active hydrogen-containing ethylenically unsaturated compounds, compounds comprising more than one active hydrogen atoms, and aspartate silanes include any of those mentioned earlier.

Suitable polyaspartate amines for use in preparing such ethylenically unsaturated oligomers include, without limitation, those having the structure (22):

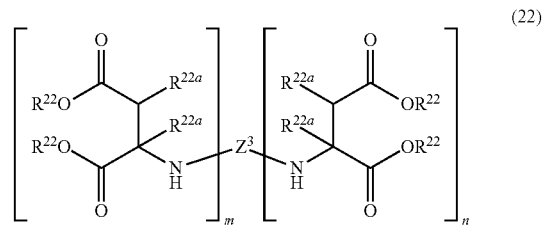

in which $Z^3$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group; each $R^{22a}$, which may be the same or different, represents a hydrogen or an organic group that is inert towards isocyanate groups at temperatures of 100° C. or less; each $R^{22}$, which may be the same or different, represents an organic group that is inert towards isocyanate groups at temperatures of 100° C. or less, such as where each $R^{22}$ represents the same or different alkyl group, such as an alkyl group having 1 to 9 or 1 to 4 carbon atoms, such as where each $R^{22}$ is a methyl group, an ethyl group, a propyl group or a butyl group; and m and n, which may be the same or different, are each an integer having a value of 1 to 4, such as where m+n is no more than 4, such as where m is 1 or 2, such as 1, and n is 1 or 2, such as 1.

Such polyaspartate amines can be produced by reacting a primary polyamine corresponding to the formula: $(NH_2)_m Z^3 (NH_2)_n$, in which $Z^3$ is the organic group mentioned immediately above and m+n is an integer having a value of at least 2, such as 2 to 4, with a maleic or fumaric acid ester of the formula (with both isomers as represented by wavy bonds):

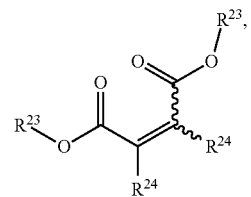

in which each $R^{23}$, which may be the same or different, represents an organic groups that is inert towards isocyanate groups at temperatures of 100° C. or less and each $R^{24}$, which may be the same or different, represents hydrogen or an organic groups that is inert towards isocyanate groups at temperatures of 100° C. or less.

Specific examples of suitable primary polyamines include, without limitation, ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, 2,5-diamino-2,5-dimethylhexane, 2,2,4- and/or 2,4,4-trimethyl-1,6-diaminohexane, 1,11-diaminoundecane, 1,12-diaminododecane, bis-(3-aminopropyl) ether, 1,2-bis-(3-aminopropyloxy)ethane, 1,3-bis-(3-aminopropyloxy)-2,2'-dimethylpropane, 1,2-bisaminocyclohexane, 1,3-bisaminocyclohexane, 1,4-bisaminocyclohexane, 1,3-bisaminomethylcyclohexane, 1,4-bisaminomethylcyclohexane, 1,3-bisaminoethylcyclohexane, 1,4-bisaminoethylcyclohexane, 1,3-bisaminopropylcyclohexane, 1,4-bisaminopropylcyclohexane, hydrogenated 4,4'-diaminodiphenylmethane, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane, 3,3'-dimethyl-4,4'-diaminodicyclohexyl methane, propane-1,2,3-triamine, pentane-1,3,5-triamine, benzene-1,3,5-triamine, isophoronediamine, menthanediamine, 1,4-bisaminopropylpiperazine, o-phenylenediamine, m-phenylenediamine, p-phenylenediamine, 2,4-tolylenediamine, 2,6-tolylenediamine, 2,4-toluenediamine, 2,4'- and/or 4,4'-diaminodiphenyl methane, m-aminobenzylamine, 4-chloro-o-phenylenediamine, tetrachloro-p-xylylenediamine, 4-methoxy-6-methyl-m-phenylenediamine, m-xylylenediamine, p-xylylenediamine, 1,5-naphthalenediamine, 2,6-naphthalenediamine, benzidine, 4,4'-bis(o-toluidine), dianisidine, 4,4'-diaminodiphenylmethane, 2,2-(4,4'-diaminodiphenyl)propane, 4,4'-diaminodiphenyl ether, 4,4'-thiodianiline, 4,4'-diaminodiphenylsulfone, 4,4'-diaminoditolylsulfone, methylenebis(o-chloroaniline), 3,9-bis(3-aminopropyl) 2,4,8,10-tetraoxaspiro[5,5]undecane, diethylenetriamine, iminobispropylamine, methyliminobispropylamine, bis(hexamethylene)triamine, triethylenetetramine, tetraethylenepentamine, pentaethylenehexamine, 1,4-bis(aminoethylpiperazine), 1,4-bis(aminopropylpiperazine), 2,6-diaminopyridine, and bis(3,4-diaminophenyl)sulfone, relatively high molecular weight polyether polyamines containing aliphatically bound primary amino groups (such as the JEFFAMINE® products commercially available from Huntsman Corp.), and combinations of any two or more of any of the foregoing.

Specific examples of suitable maleic or fumaric acid esters include, without limitation, dimethyl, diethyl and di-n-butyl esters of maleic acid and fumaric acid and the corresponding maleic or fumaric acid esters substituted by methyl in the 2- and/or 3-position.

The preparation of the polyaspartate amine from the above mentioned starting materials may be carried out, for example, at a temperature of −20° C. to 100° C. using the starting materials in proportions such that 0.8 to 1.2, such as 1, olefinic double bond is present for each primary amino group. The reaction may be carried out solvent-free or in the presence of suitable solvents such as methanol, ethanol, propanol, dioxane and mixtures of such solvents. The reaction may optionally be carried out in the presence of a catalyst such as an organic metal catalyst where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate or a combination of any two or more of the foregoing.

The reaction of the polyisocyanate with (i) the active hydrogen-containing ethylenically unsaturated compound, (ii) the compound comprising more than one active hydrogen atoms, (iii) the aspartate silane, and (iv) the polyaspartate amine to produce the ethylenically unsaturated oligomer of certain embodiments of this specification may, if desired, be carried out in the presence of a catalyst. Suitable catalysts include, without limitation, an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing. In some implementations, the reaction takes place at a temperature of 10 to 120° C. or 25 to 100° C. In addition, in some implementations, the reactants are employed in relative amounts to provide a molar ratio of isocyanate-reactive groups to isocyanate groups of at least 1:1, such as more than 1 to less than 1.5. The resulting ethylenically unsaturated oligomer comprises an aspartate group, as is depicted, for example, by structure (6) described earlier.

In some implementations, the resulting aspartate group-containing ethylenically unsaturated oligomer is subjected to further processing to convert at least some of the aspartate groups to a hydantoin group, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., 80 to 100° C., 90 to 120° C., or 100 to 120° C. The resulting ethylenically unsaturated oligomer comprises a hydantoin group, as is depicted, for example, by structure (7) described earlier.

As a result, this specification also relates to methods for making an ethylenically unsaturated oligomer that comprise reacting (i) a polyisocyanate with (ii) an active hydrogen-containing ethylenically unsaturated compound, (iii) a compound comprising more than one active hydrogen atoms, (iv) an aspartate silane, and (v) a polyaspartate amine, optionally in the presence of a catalyst, to produce an ethylenically unsaturated oligomer comprising an aspartate group. In some implementations, the method further comprises converting at least some aspartate groups to a hydantoin group, wherein such conversion is carried out optionally in the presence of a catalyst, to produce an ethylenically unsaturated oligomer comprising a hydantoin group.

In still other implementations, the ethylenically unsaturated oligomers of this specification comprise a reaction product of reactants comprising: (a) a polyisocyanate; (b) an isocyanate-functional silane; (c) an active hydrogen-containing ethylenically unsaturated compound; (d) a compound comprising more than one active hydrogen atoms; (e) a polyaspartate amine. In these implementations, suitable polyisocyanates, active hydrogen-containing ethylenically unsaturated compounds, compounds comprising more than one active hydrogen atoms, and polyaspartate amines include any of those mentioned earlier.

In these implementations, suitable isocyanate-functional silanes include, without limitation, those of the structure: OCN—$Y^6$—$Si(X^8)_3$, in which $Y^6$ represents a linear or branched linking group comprising 1 or more carbon atoms, such as where $Y^6$ comprises a linear or branched alkylene radical having 1 to 8 carbon atoms, such as a linear alkylene radical having 2 to 4 or, in some cases, 3 carbon atoms, or a branched alkylene radical having 5 to 6 carbon atoms, and each $X^8$, represents an alkoxy group or an organic group that is inert towards isocyanate groups at temperatures of 100° C. or less, with the proviso that at least one $X^8$ represents an alkoxy group, such as where each $X^8$ represents an identical or different alkyl, acyloxy, or alkoxy group, such as an identical or different alkyl, acyloxy, or alkoxyl group having 1 to 9 or 1 to 4 carbon atoms, with the proviso that at least one $X^8$ represents an alkoxy group, such as where at least two $X^8$'s represent an alkoxy, such as methoxy, ethoxy, or propyloxy, group, or where each $X^8$ represents an alkoxy, such as methoxy, ethoxy, or propyloxy group. Specific examples of suitable isocyanate-functional silanes include, without limitation, 3-isocyanatopropyl-methyldimethoxysilane, 3-isocyanatopropyl-trimethoxysilane, 3-isocyanatopropyl-triethoxysilane, as well as mixtures of any two or more thereof.

The reaction of the polyisocyanate and the isocyanate-functional silane with (i) the active hydrogen-containing ethylenically unsaturated compound, (ii) the compound comprising more than one active hydrogen atoms, and (iii) the polyaspartate amine to produce the ethylenically unsaturated oligomer of certain embodiments of this specification may, if desired, be carried out in the presence of a catalyst. Suitable catalysts include, without limitation, an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing. In some implementations, the reaction takes place at a temperature of 10 to 120° C. or 25 to 100° C. In addition, in some implementations, the reactants are employed in relative amounts to provide a molar ratio of isocyanate-reactive groups to isocyanate groups of at least 1:1, such as more than 1 to less than 1.5. The resulting ethylenically unsaturated oligomer comprises an aspartate group, as is depicted, for example, by structure (8) described earlier.

In some implementations, the resulting aspartate group-containing ethylenically unsaturated oligomer is subjected to further processing to convert at least some of the aspartate groups to a hydantoin group, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., 80 to 100° C., 90 to 120° C., or 100 to 120° C. The resulting ethylenically unsaturated oligomer comprises a hydantoin group, as is depicted, for example, by structure (9) described earlier.

As a result, this specification also relates to methods for making an ethylenically unsaturated oligomer that comprise reacting (i) a polyisocyanate and (ii) an isocyanate-functional silane with (iii) an active hydrogen-containing ethylenically unsaturated compound, (iv) a compound comprising more than one active hydrogen atoms, and (v) a polyaspartate amine, optionally in the presence of a catalyst, to produce an ethylenically unsaturated oligomer comprising an aspartate group. In some implementations, the method further comprises converting at least some aspartate groups to a hydantoin group, wherein such conversion is carried out optionally in the presence of a catalyst, to produce an ethylenically unsaturated oligomer comprising a hydantoin group.

In yet other implementations, the ethylenically unsaturated oligomers of this specification comprise a reaction product of reactants comprising: (a) a polyisocyanate; (b) an isocyanate-functional silane; (c) an active hydrogen-containing ethylenically unsaturated compound; (d) a compound comprising more than one active hydrogen atoms; (e) an active hydrogen-containing aspartate having the structure:

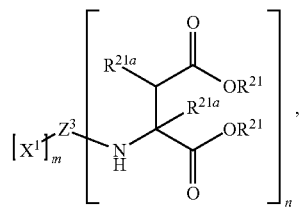

in which $X^1$ is OH, SH, or $NH_2$, $Z^3$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group, and each $R^{21}$, which may be the same or different, represents an organic group that is inert towards isocyanate groups at temperatures of 100° C. or less, such as where each $R^{21}$ represents the same or different alkyl group, such as an alkyl group having 1 to 9 or 1 to 4 carbon atoms, such as where each $R^{21}$, methyl group, an ethyl group, a propyl group or a butyl group, and each $R^{21a}$, which may be the same or different, represents hydrogen or an organic group that is inert to isocyanate groups at temperatures of 100° C. or less, and m and n, which may be the same or different, are each an integer having a value of 1 to 4, such as where m+n is no more than 4, such as where m is 1 or 2, such as 1, and n is 1 or 2, such as 1. In these implementations, suitable polyisocyanates, isocyanate-functional silanes, active hydrogen-containing ethylenically unsaturated compounds, and compounds comprising more than one active hydrogen atoms, include any of those mentioned earlier.

For example, in some implementations, the active hydrogen-containing aspartate comprises a primary amine-containing aspartate (where X is $NH_2$). Such primary amine-containing aspartates can be produced by reacting a primary polyamine corresponding to the formula: $(NH_2)_m Z^3 (NH_2)_n$, in which $Z^3$ is a hydrocarbon group that optionally contains isocyanate-inert oxygen, nitrogen, sulfur, or a combination thereof, and m+n is an integer with a value of at least 2, such as 2 to 4, with a maleic or fumaric acid ester of the formula (with both isomers as represented by wavy bonds):

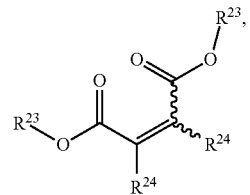

in which each $R^{23}$, which may be the same or different, represents an organic groups that is inert towards isocyanate groups at temperatures of 100° C. or less and each $R^{24}$, which may be the same or different, represents hydrogen or an organic groups that is inert towards isocyanate groups at temperatures of 100° C. or less.

Specific examples of suitable primary polyamines include, without limitation, ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, 2,5-diamino-2,5-dimethylhexane, 2,2,4- and/or 2,4,4-trimethyl-1,6-diaminohexane, 1,11-diaminoundecane, 1,12-diaminododecane, bis-(3-aminopropyl) ether, 1,2-bis-(3-aminopropyloxy)ethane, 1,3-bis-(3-aminopropyloxy)-2,2'-dimethylpropane, 1,2-bisaminocyclohexane, 1,3-bisaminocyclohexane, 1,4-bisaminocyclohexane, 1,3-bisaminomethylcyclohexane, 1,4-bisaminomethylcyclohexane, 1,3-bisaminoethylcyclohexane, 1,4-bisaminoethylcyclohexane, 1,3-bisaminopropylcyclohexane, 1,4-bisaminopropylcyclohexane, hydrogenated 4,4'-diaminodiphenylmethane, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane, 3,3'-dimethyl-4,4'-diaminodicyclohexyl methane, propane-1,2,3-triamine, pentane-1,3,5-triamine, benzene-1,3,5-triamine, isophoronediamine, menthanediamine, 1,4-bisaminopropylpiperazine, o-phenylenediamine, m-phenylenediamine, p-phenylenediamine, 2,4-tolylenediamine, 2,6-tolylenediamine, 2,4-toluenediamine, 2,4'- and/or 4,4'-diaminodiphenyl methane, m-aminobenzylamine, 4-chloro-o-phenylenediamine, tetrachloro-p-xylylenediamine, 4-methoxy-6-methyl-m-phenylenediamine, m-xylylenediamine, p-xylylenediamine, 1,5-naphthalenediamine, 2,6-naphthalenediamine, benzidine, 4,4'-bis(o-toluidine), dianisidine, 4,4'-diaminodiphenylmethane, 2,2-(4,4'-diaminodiphenyl)propane, 4,4'-diaminodiphenyl ether, 4,4'-thiodianiline, 4,4'-diaminodiphenylsulfone, 4,4'-diaminoditolylsulfone, methylenebis(o-chloroaniline), 3,9-bis(3-aminopropyl) 2,4,8,10-tetraoxaspiro[5,5]undecane, diethylenetriamine, iminobispropylamine, methyliminobispropylamine, bis(hexamethylene)triamine, triethylenetetramine, tetraethylenepentamine, pentaethylenehexamine, 1,4-bis(aminoethylpiperazine), 1,4-bis(aminopropylpiperazine), 2,6-diaminopyridine, and bis(3,4-diaminophenyl) sulfone, relatively high molecular weight polyether polyamines containing aliphatically bound primary amino groups (such as the JEFFAMINE® products commercially available from Huntsman Corp.), and combinations of any two or more of any of the foregoing.

Specific examples of suitable maleic or fumaric acid esters include, without limitation, dimethyl, diethyl and di-n-butyl esters of maleic acid and fumaric acid and the corresponding maleic or fumaric acid esters substituted by methyl in the 2- and/or 3-position.

The preparation of the primary amine-containing aspartate from the above mentioned starting materials may be carried out, for example, at a temperature of −20° C. to 100° C. using the starting materials in proportions such that 0.8+m/n to 1.2+m/n, such as 1+m/n primary amino group is present for each olefinic double bond, wherein m and n are as defined above with respect to the formula of the primary polyamine. The reaction may be carried out solvent-free or in the presence of suitable solvents such as methanol, ethanol, propanol, dioxane and mixtures of such solvents. The reaction may optionally be carried out in the presence of a catalyst such as an organic metal catalyst where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate or a combination of any two or more of the foregoing.

The reaction of the polyisocyanate and the isocyanate-functional silane with (i) the active hydrogen-containing ethylenically unsaturated compound, (ii) the compound comprising more than one active hydrogen atoms, and (iii) the active hydrogen-containing aspartate to produce the ethylenically unsaturated oligomer of certain embodiments of this specification may, if desired, be carried out in the presence of a catalyst. Suitable catalysts include, without limitation, an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing. In some implementations, the reaction takes place at a temperature of 10 to 120° C. or 25 to 100° C. In addition, in some implementations, the reactants are employed in relative amounts to provide a molar ratio of isocyanate-reactive groups to isocyanate groups of at least 1:1, such as more than 1 to less than 1.5. The resulting ethylenically unsaturated oligomer comprises an aspartate group, as is depicted, for example, by structure (10) described earlier.

In some implementations, the resulting aspartate group-containing ethylenically unsaturated oligomer is subjected to further processing to convert at least some of the aspartate groups to a hydantoin group, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., 80 to 100° C., 90 to 120° C., or 100 to 120° C. The resulting ethylenically unsaturated oligomer comprises a hydantoin group, as is depicted, for example, by structure (11) described earlier.

As a result, this specification also relates to methods for making an ethylenically unsaturated oligomer that comprise reacting (i) a polyisocyanate and (ii) an isocyanate-functional silane with (iii) an active hydrogen-containing ethylenically unsaturated compound, (iv) a compound comprising more than one active hydrogen atoms, and (v) an aspartate having the structure (23):

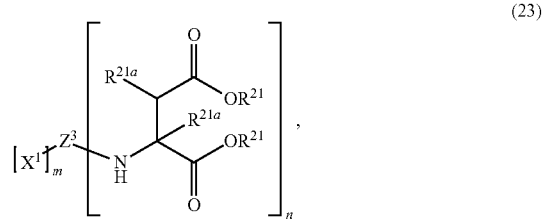

(23)

in which: (i) $X^1$ is OH, SH, or $NH_2$, (ii) $Z^3$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group; (iii) each $R^{21}$, which may be the same or different, represents an organic group that is inert towards isocyanate groups at temperatures of 100° C. or less, such as where each $R^{21}$ represents the same or different alkyl group, such as an alkyl group having 1 to 9 or 1 to 4 carbon atoms, such as where each $R^{21}$ is a methyl group, an ethyl group, a propyl group or a butyl group, (iv) each $R^{21a}$, which may be the same or different, represents hydrogen or an organic group that is inert to isocyanate groups at temperatures of 100° C. or less; and (v) m and n, which may be the same or different, are each an integer having a value of 1 to 4, such as where m+n is no more than 4, such as where m is 1 or 2, such as 1, and n is 1 or 2, such as 1, in which the reaction optionally takes place in the presence of a catalyst, to produce an ethylenically unsaturated oligomer comprising an aspartate group. In some implementations, the method further comprises converting at least some aspartate groups to a hydantoin group, wherein such conversion is carried out optionally in the presence of a catalyst, to produce an ethylenically unsaturated oligomer comprising a hydantoin group.

In some cases, the ethylenically unsaturated oligomers of this specification comprise a reaction product of reactants comprising: (a) a polyisocyanate; (b) an isocyanate-functional ethylenically unsaturated compound; (c) a compound comprising more than one active hydrogen atoms; and (e) an aspartate silane. In these implementations, suitable polyisocyanates (a), compounds comprising more than one active hydrogen atoms (c), and aspartate silanes (d) include any of those described earlier in this specification. In addition, suitable isocyanate-functional ethylenically unsaturated compounds include those having the structure:

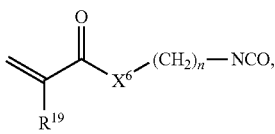

wherein $R^{19}$ represents H or $CH_3$, $X^6$ represents O, S, NH, or NR' in which R' is an alkyl radical, such as an alkyl radical having 1 to 6 carbon atoms, and n is an integer having a value of 2 to 8, such as 2 to 4.

Specific examples of suitable isocyanate-functional ethylenically unsaturated compounds include, without limitation, isocyanoethyl methacrylate, isocyanatopropyl methacrylate, isocyanatobutyl methacrylate, isocyanatoethyl acrylate, isocyanatopropyl acrylate, isocyanatobutyl acrylate, or a mixture of any two or more thereof.

Other suitable isocyanate-functional ethylenically unsaturated compounds, which may be used in combination with any one or more of the isocyanate-functional ethylenically unsaturated compounds previously mentioned, are the reaction products of reactants comprising: (i) a monohydroxy-substituted monofunctional or multifunctional (meth)acrylate, and (ii) a polyisocyanate. Specific examples of suitable monohydroxy-substituted monofunctional and/or multifunctional (meth)acrylates include, without limitation, 2-hydroxyethyl acrylate, 2-hydroxyethyl methacrylate, 2-hydroxyethyl 2-chloro acrylate, 2-hydroxyethyl 2-ethylacrylate, 2-hydroxyethyl 2-propylacrylate, 2-hydroxyethyl 2-butylacrylate, 3-hydroxypropyl methacrylate, 3-hydroxypropyl-2-propylacrylate, 2-hydroxypropyl acrylate, 3-hydroxypropyl 2-butylacrylate, 3-hydroxypropyl 2-bromo acrylate, 4-hydroxybutyl acrylate, 4-hydroxybutyl methacrylate, 3-hydroxybutyl 2-ethylacrylate, 4-hydroxybutyl 2-butylacrylate, 2-hydroxybutyl 2-propylacrylate, 4-hydroxybutyl 2-chloro acrylate, bis(methacryloyloxy)propanol, bis(acryloyloxy)propanol, pentaerythritol triacrylate, or a combination of any two or more thereof. Specific examples of suitable polyisocyanates for use in reacting with the monohydroxy-substituted monofunctional and/or multifunctional (meth)acrylate to form the isocyanate-functional ethylenically unsaturated compound include, without limitation, 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, 2,4,4 trimethylhexamethylene diisocyanate, hexamethylene diisocyanate, bis(2-isocyanato-ethyl) fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, hexamethylene diisocyanate trimers (such as is commercially available as Desmodur® N3300A from Covestro), triphenylmethane-4,4',4"-triisocyanate (such as is commercially available as Desmodur® RE from Covestro), hexamethylene diisocyanate trimers (such as is commercially available as Desmodur® N3200 from Covestro), aromatic polyisocyanates based on toluene diisocyanate (such as is commercially available as Desmodur® IL BA from Covestro), polyisocyanurates of toluene diisocyanate (such as is commercially available as Desmodur® RC from Covestro), or a combination of any two or more thereof.

In addition, in some of these implementations, the reactants further comprise a polyaspartate amine having the structure set forth earlier in this specification.

The reaction of the polyisocyanate (a) and the isocyanate-functional ethylenically unsaturated compound (b) with the compound comprising more than one active hydrogen atoms (c), the aspartate silane (d) and, optionally, the polyaspartate amine (e), to produce the ethylenically unsaturated oligomer of certain embodiments of this specification may, if desired, be carried out in the presence of a catalyst. Suitable catalysts include, without limitation, an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing. In some implementations, the reaction takes place at a temperature of 10 to 120° C. or 25 to 100° C. In addition, in some implementations, the reactants are employed in relative amounts to provide a molar ratio of isocyanate-reactive groups to isocyanate groups of at least 1:1, such as more than 1 to less than 1.5. The resulting ethylenically unsaturated oligomer comprises an aspartate group, as is depicted, for example, by structure (12) or, in the case where the reactants comprise the polyaspartate amine, structure (14), each of which is described earlier.

In some implementations, the resulting aspartate group-containing ethylenically unsaturated oligomer is subjected to further processing to convert at least some of the aspartate groups to a hydantoin group, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., 80 to 100° C., 90 to 120° C., or 100 to 120° C. The resulting ethylenically unsaturated oligomer comprises a hydantoin group, as is depicted, for example, by structure (13) or structure (15) described earlier.

As a result, this specification also relates to methods for making an ethylenically unsaturated oligomer that comprise reacting (a) a polyisocyanate and (b) an isocyanate-functional ethylenically unsaturated compound with (c) a compound comprising more than one active hydrogen atoms, (d) an aspartate silane, and optionally (e) a polyaspartate amine having the structure described above. In some implementations, the method further comprises converting at least some aspartate groups to a hydantoin group, wherein such conversion is carried out optionally in the presence of a catalyst, to produce an ethylenically unsaturated oligomer comprising a hydantoin group.

In some cases, the ethylenically unsaturated oligomers of this specification comprise a reaction products of reactants comprising: (a) a polyisocyanate, (b) an isocyanate-functional ethylenically unsaturated compound and (c) isocyanate-functional silane with (d) a compound comprising more than one active hydrogen atoms, and (e) a polyaspartate amine having the structure described above. In these implementations, suitable polyisocyanates (a), isocyanate-functional ethylenically unsaturated compounds (b), isocyanate-functional silanes (c), compounds comprising more than one active hydrogen atoms (d), and polyaspartate amines include any of those described earlier in this specification.

The reaction of the polyisocyanate (a), the isocyanate-functional ethylenically unsaturated compound (b), and the isocyanate-functional silane (c) with the compound comprising more than one active hydrogen atoms (c), the polyaspartate amine to produce the ethylenically unsaturated oligomer of certain embodiments of this specification may, if desired, be carried out in the presence of a catalyst. Suitable catalysts include, without limitation, an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing. In some implementations, the reaction takes place at a temperature of 10 to 120° C. or 25 to 100° C. In addition, in some implementations, the reactants are employed in relative amounts to provide a molar ratio of isocyanate-reactive groups to isocyanate groups of at least 1:1, such as more than 1 to less than 1.5. The resulting ethylenically unsaturated oligomer comprises an aspartate group, as is depicted, for example, by structure (16) described earlier.

In some implementations, the resulting aspartate group-containing ethylenically unsaturated oligomer is subjected to further processing to convert at least some of the aspartate groups to a hydantoin group, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., 80 to 100° C., 90 to 120° C., or 100 to 120° C. The resulting ethylenically unsaturated oligomer comprises a hydantoin group, as is depicted, for example, by structure (17) described earlier.

As a result, this specification also relates to methods for making an ethylenically unsaturated oligomer that comprise reacting (a) a polyisocyanate, (b) an isocyanate-functional ethylenically unsaturated compound and (c) isocyanate-functional silane with (d) a compound comprising more than one active hydrogen atoms, and (e) a polyaspartate amine having the structure described above. In some implementations, the method further comprises converting at least some aspartate groups to a hydantoin group, wherein such conversion is carried out optionally in the presence of a catalyst, to produce an ethylenically unsaturated oligomer comprising a hydantoin group.

In some implementations, the ethylenically unsaturated oligomers of this specification comprise a reaction product of reactants comprising: (a) a polyisocyanate; (b) an isocyanate-functional ethylenically unsaturated compound; (c) a compound comprising more than one active hydrogen atoms; (d) an aspartate silane; and (e) an aspartate of the structure (22). In these implementations, suitable polyisocyanates (a), isocyanate-functional ethylenically unsaturated compounds (b), compounds comprising more than one active hydrogen atoms (c), aspartate silanes (d) and active hydrogen-containing aspartates include any of those described earlier in this specification.

The reaction of the polyisocyanate (a) and the isocyanate-functional ethylenically unsaturated compound (b) with the compound comprising more than one active hydrogen atoms (c), the aspartate silane (d) and the active hydrogen-containing aspartate (e), to produce the ethylenically unsaturated oligomer of certain embodiments of this specification may, if desired, be carried out in the presence of a catalyst. Suitable catalysts include, without limitation, an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing. In some implementations, the reaction takes place at a temperature of 10 to 120° C. or 25 to 100° C. In addition, in some implementations, the reactants are employed in relative amounts to provide a molar ratio of isocyanate-reactive groups to isocyanate groups of at least 1:1, such as more than 1 to less than 1.5. The resulting ethylenically unsaturated oligomer comprises an aspartate group, as is depicted, for example, by structure (18) described earlier.

In some implementations, the resulting aspartate group-containing ethylenically unsaturated oligomer is subjected to further processing to convert at least some of the aspartate groups to a hydantoin group, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., 80 to 100° C., 90 to 120° C., or 100 to 120° C. The resulting ethylenically unsaturated oligomer comprises a hydantoin group, as is depicted, for example, by structure (19) described earlier.

As a result, this specification also relates to methods for making an ethylenically unsaturated oligomer that comprise reacting (a) a polyisocyanate; (b) an isocyanate-functional ethylenically unsaturated compound; (c) a compound comprising more than one active hydrogen atoms; (d) an aspartate silane; and (e) an aspartate of the structure (23). In some implementations, the method further comprises converting at least some aspartate groups to a hydantoin group, wherein such conversion is carried out optionally in the presence of a catalyst, to produce an ethylenically unsaturated oligomer comprising a hydantoin group.

In other implementations, the ethylenically unsaturated oligomers of this specification comprise a reaction product of reactants comprising: (a) a polyisocyanate; (b) an isocyanate-functional ethylenically unsaturated compound; (c) an isocyanate-functional silane; (d) a compound comprising more than one active hydrogen atoms; and (e) an active hydrogen-containing aspartate. In these implementations, suitable polyisocyanates (a), isocyanate-functional ethylenically unsaturated compounds (b), isocyanate-functional silanes (c), compounds comprising more than one active hydrogen atoms (d), and active hydrogen-containing aspartates include any of those described earlier in this specification.

The reaction of the polyisocyanate (a), the isocyanate-functional ethylenically unsaturated compound (b) and the isocyanate-functional silane (c) with the compound comprising more than one active hydrogen atoms (d) and the active hydrogen-containing aspartate (e), to produce the ethylenically unsaturated oligomer of certain embodiments of this specification may, if desired, be carried out in the presence of a catalyst. Suitable catalysts include, without limitation, an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing. In some implementations, the reaction takes place at a temperature of 10 to 120° C. or 25 to 100° C. In addition, in some implementations, the reactants are employed in relative amounts to provide a molar ratio of isocyanate-reactive groups to isocyanate groups of at least 1:1, such as more than 1 to less than 1.5. The resulting ethylenically unsaturated oligomer comprises an aspartate group, as is depicted, for example, by structure (20) described earlier.

In some implementations, the resulting aspartate group-containing ethylenically unsaturated oligomer is subjected to further processing to convert at least some of the aspartate groups to a hydantoin group, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., 80 to 100° C., 90 to 120° C., or 100 to 120° C. The resulting ethylenically unsaturated oligomer comprises a hydantoin group, as is depicted, for example, by structure (21) described earlier.

As a result, this specification also relates to methods for making an ethylenically unsaturated oligomer that comprise reacting (a) a polyisocyanate; (b) an isocyanate-functional ethylenically unsaturated compound; (c) an isocyanate-functional silane; (d) a compound comprising more than one active hydrogen atoms; and (e) an active hydrogen-containing aspartate. In some implementations, the method further comprises converting at least some aspartate groups to a hydantoin group, wherein such conversion is carried out optionally in the presence of a catalyst, to produce an ethylenically unsaturated oligomer comprising a hydantoin group.

To produce the various ethylenically unsaturated oligomer described above, the various compounds that include isocyanate groups react with the various compounds that include active hydrogen groups. As will be appreciated, the reaction result in a reaction product mixture that has a statistical distribution of structures and molecular weights that depends on order of material addition, weight percentage content of materials and process conditions, such as reaction temperature. The resulting reaction product mixture will include at least some content an ethylenically unsaturated oligomer of the type described in this specification.

The control of the sequence of reaction between isocyanate group-containing compounds and active hydrogen group-containing compounds can be accomplished by in a variety of ways, such as by varying order of material addition. As will also be appreciated, different processes can have significant impact on reaction product mixture composition and performance.

This specification also relates to use of the various ethylenically unsaturated oligomers described above. More particular, in some respects, this specification relates to the use of such oligomers in, for example, coating compositions, such as radiation curable coating compositions, including such composition that are suitable for application to optical glass fiber substrates. In particular, the ethylenically unsaturated oligomers described in this specification are currently believed to be particularly beneficial functioning as an adhesion promoting compound in such compositions. In fact, it has been surprisingly observed that at least some embodiments of such ethylenically unsaturated oligomers, while being readily and efficiently synthesized, can result in cured coatings exhibiting surprisingly high level of adhesion.

Some aspects of this specification, therefore, relate to radiation curable coating compositions that comprise the ethylenically unsaturated oligomer as described above. In some implementations, the ethylenically unsaturated oligomer described above is present in the radiation curable composition as part of a mixture of two or more different ethylenically unsaturated oligomers, in which, for example, such a mixture of two or more different ethylenically unsaturated oligomers is present is an amount of in an amount of 1 to 99% by weight, 10 to 90% by weight, 20 to 50 by weight, 40 to 70% by weight, 60 to 80% by weight, 65 to 99% by weight, 80 to 99% by weight, or, in some cases, 1 to 30% by weight, based on the total weight of solids in the radiation curable coating composition. Moreover, in some implementations, the ethylenically unsaturated oligomer described above is present in an amount of 1 to 90% by weight, such as 10 to 90% by weight, 20 to 80% by weight, 30 to 70% by weight, or 40 to 60% by weight, based on the total weight of the oligomer mixture.

Thus, in these implementations, the radiation curable coating composition may include other compounds having radiation-curable groups, such other radiation-curable composition may be used in amounts of up to, for example, 90% by weight, 75% by weight, or 70% by weight, based on the total weight of solids in the radiation curable coating composition. Examples of such other radiation-curable compounds are oligomers and polymers including, without limitation, polyether (meth)acrylates, polyester (meth)acrylates, urethane (meth)acrylates, epoxy (meth)acrylates, and the known reactive diluents from radiation curing (cf. Rompp Lexikon Chemie, p. 491, 10$^{th}$ Ed. 1998, Georg-Thieme-Verlag, Stuttgart).

In some implementations, the radiation curable coating composition comprises a mixture of two or more different ethylenically unsaturated oligomers, in which such a mixture comprises an ethylenically unsaturated oligomer that does not contain a silane group and, as a result, is different from the ethylenically unsaturated oligomers described above. In some implementations, these ethylenically unsaturated oligomers have a number average molecular weight (Mn) of at least 400 g/mol, 1000 g/mol to 35,000 g/mol, 1000 g/mol to 30,000 g/mol, 1000 g/mol to 25,000 g/mol, 1000 g/mol to 20,000 g/mol, 2,200 to 10,000 g/mol, or 2,200 to 5,500 g/mol, measured as described earlier in this specification. These ethylenically unsaturated oligomers comprise at least one ethylenically unsaturated group, in some case, 2 or more ethylenically unsaturated groups, per molecule.

In some implementations, the silane-free ethylenically unsaturated oligomer comprises a urethane (meth)acrylate oligomer, comprising a (meth)acrylate group, urethane groups and a backbone, such as where the backbone is derived from a polyol which has been reacted with an isocyanate, such as a polyisocyanate, and a hydroxyl group-containing (meth)acrylate. As used in this specification "(meth)acrylate" encompasses acrylates and methacrylates.

Examples of suitable polyols for use in preparing the silane-free ethylenically unsaturated oligomer are, without limitation, polyether polyols, polyester polyols, polycarbonate polyols, polycaprolactone polyols, acrylic polyols, and mixtures of any two or more thereof.

Suitable polyether polyols include, without limitation, polyethylene glycol, polypropylene glycol, polypropylene glycol-ethylene glycol copolymer, polytetramethylene glycol, polyhexamethylene glycol, polyheptamethylene glycol, polydecamethylene glycol, and polyether diols obtained by ring-opening copolymerization of two or more ion-polymerizable cyclic compounds, such as cyclic ethers, including, without limitation, ethylene oxide, isobutene oxide, tetrahydrofuran, 2-methyltetrahydrofuran, 3-methyltetrahydrofuran, dioxane, trioxane, tetraoxane, cyclohexene oxide, styrene oxide, epichlorohydrin, isoprene monoxide, vinyl oxetane, vinyl tetrahydrofuran, vinyl cyclohexene oxide, phenyl glycidyl ether, butyl glycidyl ether, and glycidyl benzoate. Specific examples of combinations of two or more ion-polymerizable cyclic compounds include, without limitation, combinations for producing a binary copolymer, such as tetrahydrofuran and 2-methyltetrahydrofuran, tetrahydrofuran and 3-methyltetrahydrofuran, and tetrahydrofuran and ethylene oxide; and combinations for producing a ternary copolymer such as a combination of tetrahydrofuran, 2-methyltetrahydrofuran, and ethylene oxide, a combination of tetrahydrofuran, butene-1-oxide, and ethylene oxide, and the like. The ring-opening copolymers of these ion-polymerizable cyclic compounds may be either random copolymers or block copolymers.

Suitable polyester diols include, without limitation, those obtained by reacting a polyhydric alcohol and a polybasic acid. Suitable polyhydric alcohols include, without limitation, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and mixtures of any two or more thereof. Suitable polybasic acids include, without limitation, phthalic acid, dimer acid, isophthalic acid, terephthalic acid, maleic acid, fumaric acid, adipic acid, sebasic acid, and mixtures of any two or more thereof.

Suitable polycarbonate polyols include, without limitation, polycarbonates of polytetrahydrofuran, poly(hexanediol carbonate), poly(nonanediol carbonate), poly(3-methyl-1,5-pentamethylene carbonate), and mixtures of any two or more thereof.

Suitable polycaprolactone diols include, without limitation, those having a melting point of 0° C. or higher that are obtained by reacting e-caprolactone and a diol compound. Suitable diol compounds include, without limitation, ethylene glycol, polyethylene glycol, polypropylene glycol, polypropylene glycol, tetramethylene glycol, polytetramethylene glycol, 1,2-polybutylene glycol, 1,6-hexanediol, neopentyl glycol, 1,4-cyclohexanedimethanol, 1,4-butanediol, and mixtures of any two or more thereof.

Other suitable polyols include, without limitation, ethylene glycol, 1,4-butanediol, 1,5-pentanediol, 1,6-hexanediol, polyoxyethylene bisphenol A ether, polyoxypropylene bisphenol A ether, polyoxyethylene bisphenol F ether, polyoxypropylene bisphenol F ether, and mixtures of any two or more thereof. In some embodiments, these other polyols have an alkylene oxide structure in the molecule, such as polyols containing polytetramethylene glycol and copolymer glycols of butylene oxide and ethylene oxide.

In some implementations, the number average molecular weight derived from the hydroxyl number of the polyol is 50 to 15,000 g/mol, such as 1,000 to 8,000 g/mol.

Suitable polyisocyanates for preparing the silane-free urethane (meth)acrylate oligomer include, without limitation, 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanato-ethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, hexamethylene diisocyanate trimers (such as is commercially available as Desmodur® N3300A from Covestro), triphenylmethane-4,4',4"-triisocyanate (such as is commercially available as Desmodur® RE from Covestro), hexamethylene diisocyanate trimers (such as is commercially available as Desmodur® N3200 from Covestro), aromatic polyisocyanates based on toluene diisocyanate (such as is commercially available as Desmodur® IL BA from Covestro), polyisocyanurates of toluene diisocyanate (such as is commercially available as Desmodur® RC from Covestro), as well as combinations of any two or more thereof.

Suitable hydroxyl group-containing (meth)acrylates for use in preparing the silane-free urethane (meth)acrylate oligomer, include, without limitation, (meth)acrylates derived from (meth)acrylic acid and epoxy and (meth)acrylates comprising alkylene oxides, such as, in particular, 2-hydroxy ethyl (meth)acrylate, 2-hydroxypropylacrylate and 2-hydroxy-3-oxyphenyl(meth)acrylate.

To prepare the silane-free urethane (meth)acrylate oligomer, the ratio of polyol, polyisocyanate, and hydroxyl group-containing (meth)acrylate is, in some implementations, determined so that 0.1 to 0.9 equivalents of a hydroxyl group included in the hydroxyl group-containing (meth)acrylate and 1.0 to 1.5 equivalents of total hydroxyl groups present from the polyol and the hydroxyl group-containing (meth)acrylate are used for one equivalent of isocyanate group included in the polyisocyanate.

In some embodiments, a urethanization catalyst is present during the reaction of the foregoing three components. Suitable such catalysts included, without limitation, copper naphthenate, cobalt naphthenate, zinc naphthenate, di-n-butyl tin dilaurate, bismuth neodecanoate, triethylamine, triethylenediamine-2-methyltriethyleneamine, as well as mixtures of any two or more thereof. In some implementations, the urethanization catalyst is used in an amount of 0.01 to 1% by weight, based on the total weight of the reactants. In some cases, the reaction is carried out at a temperature of 10 to 90° C., such as 30 to 80° C.

When the radiation curable coating composition includes both an ethylenically unsaturated oligomer of this specification and a silane-free urethane (meth)acrylate oligomer, the composition can be produced by separately preparing an ethylenically unsaturated oligomer of this specification and a silane-free urethane (meth)acrylate oligomer and the mixing them together. Alternatively, an ethylenically unsaturated oligomer of this specification and a silane-free urethane (meth)acrylate oligomer can also be synthesized together in one pot.

In such a one-pot synthesis, the various compounds that include isocyanate groups react with the various compounds that include active hydrogen containing groups. In some embodiments, the various components are combined in amounts such that the ratio of active hydrogen groups present to isocyanate groups present is from 1 to 1.5. As will be appreciated, the reaction results in a reaction product mixture that has a statistical distribution of structures and molecular weights depends on the order of material addition, weight percentage content of materials and process conditions, such as reaction temperature. When multiple oligomers are synthesized in one pot synthesis, the resulting reaction product mixture will include at least some content an ethylenically unsaturated oligomer of the type described in this specification. The control of the sequence of reaction between isocyanate group-containing compounds and active hydrogen group-containing compounds can be accomplished by in a variety of ways, such as by varying order of material addition. As will also be appreciated, different processes can have significant impact on reaction product mixture composition and performance.

In addition to, or in lieu of, the previously described silane-free urethane (meth)acrylate, other silane-free ethylenically unsaturated oligomers that can be used in embodiments of the radiation curable compositions of this specification include polyester (meth)acrylates, epoxy (meth) acrylates, polyamide (meth)acrylates, siloxane polymers having a (meth)acryloyloxy group, reactive polymers obtained by reacting (meth)acrylic acid and a copolymer of glycidyl methacrylate and other polymerizable compounds, as well as mixtures of any two or more thereof. In some implementations, such an oligomer comprises a bisphenol A based acrylate oligomer, such as alkoxylated bisphenol-A-diacrylates and diglycidyl-bisphenol-A-diacrylates.

In some implementations, the silane-free ethylenically-unsaturated oligomer may comprise an unsaturated urethane-free oligomer, such as an unsaturated urethane-free polyester acrylate oligomer and/or an unsaturated urethane-free alkyd acrylate oligomer. Examples of such oligomeric unsaturated compounds are acrylated epoxy resins, acrylated polyethers, and acrylated polyesters. Further examples of unsaturated oligomers are unsaturated polyester resins, such as those prepared from maleic acid, phthalic acid and one or more diols and which have molecular weights of greater than about 500. Unsaturated oligomers of this type are also known as prepolymers. Typical examples of unsaturated compounds are esters of ethylenically unsaturated carboxylic acids and polyols or polyepoxides, and polymers containing ethylenically unsaturated groups in the chain or in side groups, including unsaturated polyesters, polyamides and copolymers thereof, polybutadiene and butadiene copolymers, polyisoprene and isoprene copolymers, polymers and copolymers containing (meth)acrylic groups in side-chains, as well as mixtures of one or more than one such polymer. Illustrative examples of unsaturated carboxylic acids are acrylic acid, methacrylic acid, crotonic acid, itaconic acid, cinnamic acid, unsaturated fatty acids such as linolenic acid or oleic acid. Suitable polyols are aromatic, aliphatic and cycloaliphatic polyols. Aromatic polyols are typically hydroquinone, 4,4'-dihydroxydiphenyl, 2,2-bis(4-hydroxyphenyl)propane, as well as novolacs and cresols. Polyepoxides include those based on the cited polyols, for instance on the aromatic polyols and epichlorohydrin.

One or more of the aforementioned silane-free ethylenically unsaturated oligomers can be employed in compositions according to the present invention in any suitable amount and may be chosen singly or in combination of one or more of the types enumerated herein. In some implementations, the silane-free ethylenically unsaturated oligomer is present in an amount of 5 to 95% by weight, 10 to 90% by weight, 10 to 80% by weight or 30 to 90% by weight, or 50 to 80% by weight, based on the total weight of solids in the radiation curable composition.

In addition, in some implementations, the radiation curable coating composition comprises a reactive diluent compound comprising one or more ethylenically unsaturated groups. Examples of such compounds include those containing one double bond, such as alkyl or hydroxyalkyl (meth)acrylates, suitable examples of which include, without limitation, methyl, ethyl, butyl, 2-ethylhexyl and 2-hydroxyethyl acrylate, isobornyl acrylate, methyl and ethyl methacrylate, lauryl-acrylate, ethoxylated nonyl-phenol acrylate, phenoxyethyl (meth)acrylate, diethylene-glycol-ethyl-hexyl acylate (DEGEHA), acrylonitrile, acrylamide, methacrylamide, N-substituted (meth)acrylamides, vinyl esters, such as vinyl acetate, styrene, alkylstyrenes, halostyrenes, N-vinylpyrrolidone, N-vinyl caprolactam, vinyl chloride, vinylidene chloride, and mixtures of any two or more thereof. Examples of such reactive diluent compounds that contain more than one double bond are ethylene glycol diacrylate, propylene glycol diacrylate, neopentyl glycol diacrylate, hexamethylene glycol diacrylate, bisphenol A diacrylate, 4,4'-bis(2-acryloyloxyethoxy)diphenylpropane, trimethylolpropane triacrylate, ethoxylated trimethylolpropane triacrylate, pentaerythritol triacrylate and tetraacrylate, vinyl acrylate, divinyl benzene, divinyl succinate, diallyl phthalate, triallyl phosphate, triallyl isocyanurate, tris(2-acryloylethyl)isocyanurate, and mixtures of any two or more thereof.

In some embodiments, reactive diluent compound is present in an amount of 5 to 90% by weight, 10 to 90% by weight, 10 to 80% by weight, 10 to 60% by weight, 10 to 40% by weight, or 10 to 30% by weight, based on the total weight of solids in the radiation curable composition.

In some implementations, the radiation curable compositions of this specification include a free-radical photoinitiator. More specifically, in some cases, the free-radical photoinitiator comprises an acylphosphine oxide, such as a bisacylphosphine oxide (BAPO) and/or monoacylphosphine oxide (MAPO), an α-hydroxy ketone, or a mixture of any two or more thereof.

In some embodiments, the photoinitiator comprises a bisacylphosphine oxide having the structure:

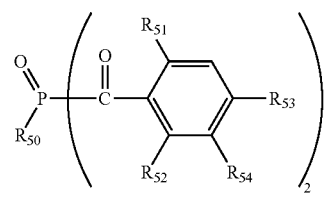

in which wherein $R_{50}$ is $C_1$-$C_{12}$ alkyl, cyclohexyl or phenyl, which is unsubstituted or is substituted by 1 to 4 halogen atoms, or $C_1$-$C_8$ alkyl; $R_{51}$ and $R_{52}$ are each independently of the other $C_1$-$C_8$ alkyl or $C_1$-$C_8$ alkoxy; $R_{53}$ is hydrogen or $C_1$-$C_8$ alkyl; and $R_{54}$ is hydrogen or methyl. For example, in some implementations, $R_{50}$ is $C_2$-$C_{10}$ alkyl, cyclohexyl or phenyl which is unsubstituted or is substituted by 1 to 4 $C_1$-$C_4$ alkyl, Cl or Br. In another embodiment, $R_{50}$ is $C_3$-$C_8$ alkyl, cyclohexyl or phenyl which is unsubstituted or is substituted in the 2-, 3-, 4- or 2,5-positions by $C_1$-$C_4$ alkyl. In some cases, $R_{50}$ is $C_4$-$C_{12}$ alkyl or cyclohexyl, $R_{51}$ and $R_{52}$ are each independently of the other $C_1$-$C_8$ alkyl or $C_1$-$C_8$ alkoxy and $R_{53}$ is hydrogen or $C_1$-$C_8$ alkyl. In some embodiments, $R_{51}$ and $R_{52}$ are $C_1$-$C_4$ alkyl or $C_1$-$C_4$ alkoxy and $R_{53}$ is hydrogen or $C_1$-$C_4$ alkyl. Another embodiment is where $R_{51}$ and $R_{52}$ are methyl or methoxy and $R_{53}$ is hydrogen or methyl, such as where $R_{51}$, $R_{52}$ and $R_{53}$ are methyl. Still another embodiment is where $R_{51}$, $R_{52}$ and $R_{53}$ are methyl and $R_{54}$ is hydrogen. In yet other embodiments, $R_{50}$ is $C_3$-$C_8$ alkyl, such as where $R_{51}$ and $R_{52}$ are methoxy, $R_{53}$ and $R_{54}$ are hydrogen and $R_{50}$ is isooctyl. In some cases, $R_{50}$ is isobutyl or phenyl. Specific examples of suitable bisacylphosphine oxides include, without limitation, bis(2,4,6-trimethylbenzoyl)-phenylphosphine oxide, bis(2,4,6-trimethylbenzoyl)-(2,4-bis-pentyloxyphenyl)phosphine oxide, or a mixture thereof.

Specific examples of suitable photoinitiator blends include, without limitation, those disclosed in U.S. Pat. Nos. 6,020,528 and 7,169,826. In some implementations, the photoinitiator blends comprises mixture of bis(2,4,6-trimethylbenzoyl)phenylphosphine oxide (CAS #162881-26-7) and 2,4,6,-trimethylbenzoylethoxyphenylphosphine oxide (CAS #84434-11-7) in a ratio by weight of, for example, 1:11 to 1:7. In other implementations, the photoinitiator blend comprises a mixture of bis(2,4,6-trimethylbenzoyl)phenylphosphine oxide, 2,4,6,-trimethylbenzoylethoxyphenylphosphine oxide and 2-hydroxy-2-methyl-1-phenyl-1-propanone (CAS #7473-98-5) in a weight ratios of, for example, 3:1:15 to 4:1:16. In another embodiments, the photoinitiator blend comprises a mixture of bis(2,4,6-trimethylbenzoyl)phenylphosphine oxide and 2-hydroxy-2-methyl-1-phenyl-1-propanone in a weight ratio of, for example, 1:3 to 1:5.

Other suitable photoinitiators include, without limitation, other mono- or bisacylphosphinoxides, such as diphenyl-2,4,6-trimethylbenzoylphosphine oxide and bis(2,6-dimethoxybenzoyl)-2,4,4-trimethylpentylphosphineoxide; α-hydroxyketones, such as 1-hydroxycyclohexylphenylketone and 2-hydroxy-1-[4-(2-hydroxyethoxy)phenyl]-2-methyl-1-propanone; α-aminoketones, such as 2-methyl-1-[4-(methylthio)phenyl]-2-(4-morpholinyl)-1-propanone, 2-benzyl-2-(dimethylamino)-1-[4-(4-morpholinyl)phenyl]-1-butanone, 2-(4-methylbenzyl-2-(dimethylamino)-1-[4-(4-morpholinyl)phenyl]-1-butanone and 2-benzyl-2-(dimethylamino)-1-[3,4-dimethoxyphenyl]-1-butanone; benzophenones, such as benzophenone, 2,4,6-trimethylbenzophenone, 4-methylbenzophenone, 2-methylbenzophenone, 2-methoxycarbonylbenzophenone, 4,4'-bis(chloromethyl)-benzophenone, 4-chlorobenzophenone, 4-phenylbenzophenone, 4,4'-bis(dimethylamino)-benzophenone, 4,4'-bis(diethylamino)benzophenone, methyl2-benzoylbenzoate, 3,3'-dimethyl-4-methoxybenzophenone, 4-(4-methylphenylthio)benzophenone, 2,4,6-trimethyl-4'-phenyl-benzophenone and 3-methyl-4'-phenyl-benzophenone; ketal compounds, such as 2,2-dimethoxy-1,2-diphenyl-ethanone; and compoundic or dimeric phenylglyoxylic acid esters, such as methylphenylglyoxylic acid ester, 5,5'-oxo-di(ethyleneoxydicarbonylphenyl) and 1,2-(benzoylcarboxy)ethane, as well as mixtures of any two or more thereof.

Still other suitable photoinitiators include, without limitation, oxime esters as disclosed in U.S. Pat. No. 6,596,445. Also suitable are phenyl glyoxalates, such as are disclosed in U.S. Pat. No. 6,048,660 and germanium-based photoinitiators as disclosed in Dalton Trans. 2021, 50, 12392-12398.

In some implementations, the free-radical photoinitiator is present in an amount of 0.1 to 10% by weight, such as 0.1 to 5% by weight, or, in some cases, 1 to 5% by weight, based on the total weight of the radiation curable composition.

Photoinitiators suitable for use in the radiation curable compositions of this specification are also described in United States Patent Application Publication No. US 2021/0088720 A1 at [0080]-[0128], the cited portion of which being incorporated herein by reference.

As will be appreciated, the radiation curable compositions of this specification may include any of a variety of further components, including any of a variety of various additives that may enable the composition to achieve certain desirable characteristics such as improved shelf life, improved coating oxidative and hydrolytic stability, improved cure speed, additional coating functional performance, and the like. For example, in some implementations, the radiation curable compositions of this specification may include one or more of a photosensitizer, a radiation cure amine synergist, a UV absorber, an antioxidant, a UV stabilizer, a light stabilizer, a filler material, a chain transfer thiol compound, a surface active compound, a viscosity modifier, an additional addition promoter, a water scavenger such as tetraethyl orthosilicate (TEOS) and orthoformate, oxygen quencher or a functional material including pigments, dyes, photochromic dyes, laser dyes, liquid crystals, light emitting materials, nano materials, quantum dots, fluorescent materials, dichroic dyes, antistatic materials, refractive index modifier and bioactive materials, among others. Some suitable additives are described in United States Patent Application Publication No. US 2021/0088720 A1 at [0122]-[0134], the cited portion of which being incorporated herein by reference.

In some implementations, the radiation curable compositions of this specification comprise an adhesion promoter that is different from the ethylenically unsaturated compound described earlier in this specification. Suitable adhesion promoters include silane coupling agents (different from the previously described ethylenically unsaturated compounds), such as hydrolysable silane compounds which contain a mercapto group and/or a plurality of alkoxy groups, such as those described in United States Patent Application Publication No. US 2002/0013383 A1, the relevant portions of which being incorporated herein by reference. Specific examples of such adhesion promoters are gamma-mercaptopropyltrimethoxysilane, trimethoxysiliylpropyl acrylate, 3-trimetoxysilylpropane-1-thiol, and mixtures of any two or more thereof.

In some implementations, the radiation curable composition may include an ethylenically unsaturated silane monomer comprising: (a) a moiety of the structure (1):

$$\text{—Y—Si(X)}_3 \tag{1); and}$$

(b)(1) a moiety of the structure (2):

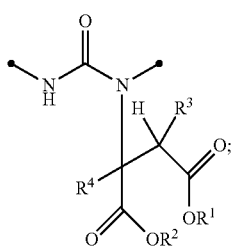
(2)

(b)(2) a moiety of the structure (3):

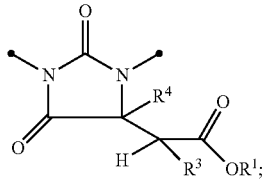
(3)

(b)(3) a combination of a moiety of the structure (2) and a moiety of the structure (3), in which (i) Y represents a linear or branched linking group comprising 1 or more carbon atoms, (ii) each X, which may be the same or different, represents an alkoxy group or an organic group that is inert towards isocyanate groups at temperatures of 100° C. or less, with the proviso that at least one X represents an alkoxy group, (iii) $R^1$ and $R^2$, which may be the same or different, each represent an organic group that is inert to isocyanate groups at temperatures of 100° C. or less; (iv) $R^3$ and $R^4$, which may be the same or different, each represent hydrogen or an organic group that is inert to isocyanate groups at temperatures of 100° C. or less; and (v) each " 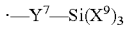 " represents a linkage to another portion of the ethylenically unsaturated silane. Such ethylenically unsaturated silanes, as well the preparation thereof, are described in U.S. Provisional Patent Application Ser. No. 63/616,890, entitled ETHYLENICALLY UNSATURATED COMPOUNDS, METHODS FOR THEIR PREPARATION, AND THE USE THEREOF IN COATING COMPOSITIONS, which is filed concurrently herewith and is incorporated herein by reference.

In some implementations, the radiation curable composition may include a poly-silane, such as a poly-silane monomer comprising: (a) at least two, in some cases two, moieties of the structure (1):

$$\text{—}Y^7\text{—}Si(X^9)_3 \qquad (1); \text{ and}$$

(b1) a moiety of the structure (2):

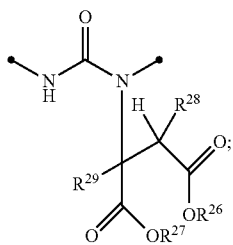
(2)

(b2) a moiety of the structure (3):

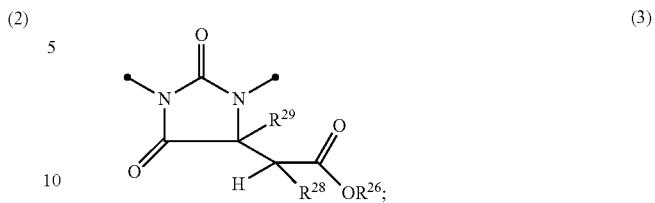
(3)

(b3) a combination of a moiety of the structure (2) and a moiety of the structure (3), in which (i) $Y^7$ represents a linear or branched linking group comprising 1 or more carbon atoms, (ii) each $X^9$ represents an alkoxy group or an organic group that is inert towards isocyanate groups at temperatures of 100° C. or less, with the proviso that at least one $X^9$ represents an alkoxy group, (iii) $R^{26}$ and $R^{27}$, which may be the same or different, each represent an organic group that is inert to isocyanate groups at temperatures of 100° C. or less; (iv) $R^{28}$ and $R^{29}$, which may be the same or different, each represent hydrogen or an organic group that is inert to isocyanate groups at temperatures of 100° C. or less; and (v) each " ————● " represents a linkage to another portion of the poly-silane. Such poly-silanes, as well the preparation thereof, are described in U.S. Provisional Patent Application Ser. No. 63/616,868 entitled POLYSILANES, METHODS FOR THEIR PREPARATION, AND THE USE THEREOF IN COATING COMPOSITIONS, which is filed concurrently herewith and is incorporated herein by reference.

In some embodiments, the radiation curable compositions of this specification have a total silane content (determined as described in the Examples section of this specification) of up to 10 mmol, such as 1 to 10 mmol, 1 to 8 mmol, or, in some cases 2 to 6 mmol, per 100 gram of the radiation curable composition. Also, in some implementations, the radiation curable compositions of this specification have a total content of urea+urethane (determined as described in the Examples section of this specification) of 20 to 200 mmol, such as 30 to 150 mmol, or, in some cases 40 to 100 mmol, per 100 gram of the radiation curable composition.

Further, in some embodiments, a cured coating deposited from the coating composition exhibits a peel strength of at least 40 gram-force/inch ("gf/in"), or at least 55 gf/in, when measured at least 7 days after as described in the Examples section of this specification. In addition, in some embodiments, a cured coating deposited from the coating composition exhibits an elongation at break of at least 35%, such as at least 50%, when measured as described in the Examples section of this specification.

In addition, in some embodiments, the coating compositions of this specification are configured to possess a viscosity of at least >0.1 Pascal seconds (Pa s), at least 0.2, at least 0.5, at least 1 Pa s, and/or less than 15 Pa s, less than 12 Pa-s, or less than 10 Pa s, or 1 to 15 Pa s, 2 to 12 Pa s, or 3 to 10 Pa s, wherein viscosity is measured at 25° C. and a shear rate of 2500 s-1.

As should be appreciated, in some respects, this specification relates to a method for coating an optical fiber. Such methods comprise providing a glass optical fiber, such as by drawing a glass optical fiber through a draw tower; applying a primary coating composition onto the surface of the glass optical fiber; optionally, imparting a dose of UV light sufficient to at least partially cure said primary coating composition; applying a secondary coating composition to the primary coating composition; exposing the secondary coating composition to at least one radiation source capable of emitting ultraviolet radiation to affect curing of said secondary coating composition and, optionally said primary coting composition, to form a cured primary coating on the surface of the optical fiber, and a cured secondary coating on the surface of the cured primary coating. In these methods, the primary coating composition and/or the secondary coating composition is a composition of the type described in this specification.

As should also be appreciated, this specification also relates to coated optical fibers, the coated optical fiber comprising a glass core and a cladding layer in contact with and surrounding said glass core; and a coating portion, said coating portion further including a primary coating layer in contact with said cladding layer; and a secondary coating layer in contact with and surrounding said primary coating layer. According to this aspect, the primary coating layer and/or the secondary coating layer is a cured product of a coating composition of the type described in this specification. In some cases, the optical fiber comprises a core, a cladding, a primary coating contacting and surrounding the outer annular cladding region, and a secondary coating. According to some of these embodiments, the core comprises pure silica glass ($SiO_2$) or silica glass with one or more dopants that increase the index of refraction of the glass core relative to pure, undoped silica glass. Suitable such dopants include, without limitation, GeO2, $Al_2O_3$, $P_2OL_5$, $TiO_2$, $ZrO_2$, $Nb_2O_5$, $Ta_2O_5$, and/or combinations thereof. The cladding layer may comprise pure silica glass ($SiO_2$), silica glass with one or more dopants which increase the index of refraction (e.g., $GeO_2$, $Al_2O_3$, $P_2OL_5$, $TiO_2$, $ZrO_2$, $Nb_2O_5$ and/or $Ta_2O_5$), such as when the cladding is "up-doped," or silica glass with a dopant which decreases the index of refraction, such as fluorine, such as when the inner cladding is "down-doped", so long as the maximum relative refractive index [Δ1MAX] of the core is greater than the maximum relative refractive index [Δ4MAX] of the cladding. According to one embodiment, the cladding is pure silica glass. According to some of these embodiments, the primary coating has an in-situ (or on-fiber) tensile modulus of less than 5 MPa, less than 2 MPa, less than 1.5 MPa, or less than 1.0 MPa. Methods for describing in-situ modulus are well-known in the art and are described in, inter alia, U.S. Pat. Nos. 7,171,103 and 6,961,508, which are incorporated herein by reference. In an embodiment, the cured primary coating has an in-situ glass transition temperature of less than −10° C., less than −35° C., less than −40° C., less than −45° C., and in other embodiments not more than −50° C. A primary coating with a low in-situ modulus reduces the microbending which is the coupling mechanism between the modes propagating in the fiber. A low in-situ glass transition temperature ensures that the in-situ modulus of the primary coating will remain low even when the fiber is deployed in very cold environments.

The primary coating typically has a thickness in the range of 20 to 50 μm (e.g., about 25 or 32.5 μm), thinner thickness in the range of 15 to 25 μm for 200 μm fibers. In other embodiments, the primary coating has a thickness that is no more than 40 μm, such as 20 to about 40 μm, or, in some cases, 20 to 30 μm.

The secondary coating is in contact with and surrounds the primary coating. The secondary coating is, for example, the polymerization product of a coating composition whose molecules become highly crosslinked when polymerized. The secondary coating, according to an embodiment, may possess an in-situ tensile modulus of greater than 800 MPa, greater than 1110 MPa, greater than 1300 MPa, greater than 1400 MPa, or, in some cases, greater than 1500 MPa. In some embodiments, the secondary coating has a high in-situ modulus (e.g., greater than about 800 MPa at 25° C.) and a high Tg (e.g., greater than about 50° C.). In some cases, the in-situ secondary modulus is from 1000 MPa to 8000 MPa, such as 1200 MPa to 5000 MPa or 1500 MPa to 3000 MPa. The in-situ Tg of the secondary coating is, in some embodiments, from 50° C. to 120° C. or, in some cases, 50° C. to 100° C. Moreover, in some embodiments, the secondary coating has a thickness of no more than 40 μm, such as 20 to 40 μm, or, in some cases, 20 to 30 μm.

Suitable outer (or secondary) coating materials, as well as considerations related to selection of these materials, are also described in, for example, U.S. Pat. Nos. 4,962,992 and 5,104,433, each of which being incorporated herein by reference. As an alternative to these, high modulus coatings have also been obtained using low oligomer content coating systems, as described in U.S. Pat. Nos. 6,775,451 and 6,689,463, each of which being incorporated herein by reference. Also suitable are high modulus coating produced using non-reactive oligomer components, as described in U.S. Patent Application Publication. No. US 2007/0100039 A1, which is incorporated herein by reference. The secondary coating may also include an ink, as is well known in the art and, in such cases, may be referred to as a "colored secondary coating."

The coated optical fiber may, if desired, comprise one or more additional layers disposed on the secondary layer, such as a standalone "ink" layer which is applied and cured separately from the secondary coating.

It is known in the art how to formulate typical optical fiber coating for primary and secondary coatings for fiber as described above, as well as for ink and matrix materials for curing using broadband UV lamps. A good discussion of this technology and associated chemistry and test methods can be found in sections 4.6 to the end of chapter 4 in the textbook, "Specialty Optical Fibers Handbook" by A. Mendez and T. F. Morse, (c) Elsevier Inc. 2007, published by Elsevier.

Any optical fiber type may be used in embodiments of inventions described herein. In some implementations, however, the coated optical fiber possesses a mode-field diameter from 8 to 10 μm at a wavelength of 1310 nm, a mode-field diameter from 9 to 13 μm at a wavelength of 1550 nm, and/or an effective area of 20 to 200 μm². Such fibers may be single mode and/or large-effective area fibers, given the expected demand for coating processes for these fibers that utilize higher line or processing speeds. However, other fiber types, such as multimode fibers, may be used as well.

As should also be appreciated, this specification also relates to an optical fiber cable, wherein the optical fiber comprises at least one optical fiber as described herein, and/or wherein the optical fiber is the cured product of a coating composition as described herein.

As should also be appreciated, this specification also relates to an optical fiber cable, wherein the optical fiber comprises at least one optical fiber as described herein, and/or wherein the optical fiber is the cured product of a coating composition as described herein.

Various aspects of the subject matter described herein are set out in the following numbered clauses:

Clause 1. An ethylenically unsaturated oligomer comprising: (a) a moiety of the structure (1):

$$—Y^1—Si(X)_3 \qquad (1);$$

(b1) a moiety of the structure (2):

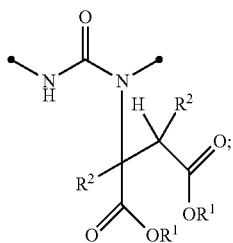

(b2) a moiety of the structure (3):

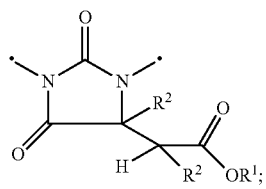

(b3) a combination of a moiety of the structure (2) and a moiety of the structure (3); and (c) a moiety of the structure (3a):

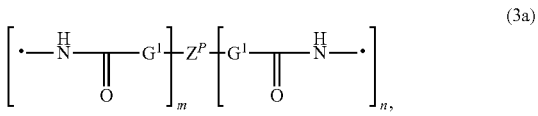

in which (i) $Y^1$ represents a linear or branched linking group comprising 1 or more carbon atoms, (ii) each X, which may be the same or different, represents an alkoxy group or an organic group that is inert towards isocyanate groups at temperatures of 100° C. or less, with the proviso that at least one X represents an alkoxy group, (iii) each $R^1$, which may be the same or different, represents an organic group that is inert to isocyanate groups at temperatures of 100° C. or less; (iv) each $R^2$, which may be the same or different, represents hydrogen or an organic group that is inert to isocyanate groups at temperatures of 100° C. or less; (v) each "———•" represents a linkage to another portion of the ethylenically unsaturated oligomer; (vi) each $G^1$ is O or S, (vii) m has a value of 1 to 5, such as 1 to 3, or 1, (viii) n has a value of 1 to 5, 1 to 3, or 1, and (ix) $Z^P$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group.

Clause 2. The ethylenically unsaturated oligomer of clause 1 wherein each $R^1$ and $R^2$ in structures (2) and (3), which may be the same or different, represents an alkyl group, such as an alkyl group having 1 to 9 or 1 to 4 carbon atoms, such as where each $R^1$ and $R^2$ in structures (2) and (3), which may be the same or different, represents a methyl group, an ethyl group, a propyl group or a butyl group.

Clause 3. The ethylenically unsaturated oligomer of clause 1 or clause 2, wherein each X in structure (1) represents an identical or different alkyl, acyloxy, or alkoxy group, such as an identical or different alkyl, acyloxy, or alkoxyl group having 1 to 9 or 1 to 4 carbon atoms, with the proviso that at least one X represents an alkoxy group, such as where at least two X's represent an alkoxy, such as methoxy, ethoxy, or propyloxy, group, or where each X represents an alkoxy, such as methoxy, ethoxy, or propyloxy group.

Clause 4. The ethylenically unsaturated oligomer of one of clause 1 to clause 3, wherein $Y^1$ in structure (1) comprises a linear or branched alkylene radical having 1 to 8 carbon atoms, such as a linear alkylene radical having 2 to 4 or, in some cases 3, carbon atoms, or a branched alkylene radical having 5 to 6 carbon atoms.

Clause 5. The ethylenically unsaturated oligomer of one of clause 1 to clause 4, wherein the ethylenically unsaturated oligomer has a Mn, measured according to the procedure described in this specification, of at least 800 g/mol, 800 g/mol to 35,000 g/mol, 1000 g/mol to 35,000 g/mol, 2000 g/mol to 30,000 g/mol, 2000 g/mol to 25,000 g/mol, 2000 g/mol to 20,000 g/mol, 2,200 to 10,000 g/mol, or 2,200 to 5,500 g/mol.

Clause 6. An ethylenically unsaturated oligomer (or the ethylenically unsaturated oligomer of one of clause 1 to clause 5), wherein the ethylenically unsaturated oligomer comprises the structure (4):

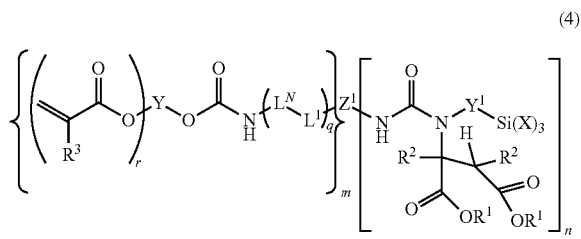

in which: (i) each Y, which may be the same or different, represents a group comprising a branched or straight chain alkylene radical, such as where the branched or straight chain alkylene radical has at least 2, 2 to 8, or 2 to 4 carbon atoms; (ii) each $Y^1$, which may be the same or different, represents a linear or branched linking group comprising 1 or more carbon atoms; (iii) each $R^1$, which may be the same or different, represents an organic group that is inert to isocyanate groups at temperatures of 100° C. or less; (iv) each $R^2$, which may be the same or different, represents hydrogen or an organic group that is inert to isocyanate groups at temperatures of 100° C. or less; (v) each $R^3$, which may be the same or different, represents H or $CH_3$; (vi) each X, which may be the same or different, represents an alkoxy group or an organic group that is inert towards isocyanate groups at temperatures of 100° C. or less, with the proviso that at least one X represents an alkoxy group; (vii) $Z^1$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group; (viii) m has a value of 1 to 5, such as 1 to 3, or 1; (ix) n has a value of 1 to 5, 1 to 3, or 1, (x) q has a value of at least 1, such as 1 to 20, 1 to 5, or 1 to 3; (xi) r is 1, 2 or 3; (xii) $L^N$ is represented by the structure:

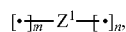

Z n in which $Z^1$, m, and n are each as described earlier in this clause and "———●" represents a linkage to another portion of the ethylenically unsaturated oligomer; and (xiii) $L^1$ is represented by the structure (4a):

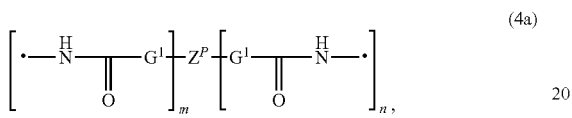

(4a)

in which $Z^P$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group, $G^1$ is O or S, and m, n and "———●" are each as described earlier in this clause.

Clause 7. The ethylenically unsaturated oligomer of clause 6, wherein Y comprises a linear or branched alkylene radical having 1 to 8 carbon atoms, such as a linear alkylene radical having 2 to 4 or, in some cases 3, carbon atoms (such as a propylene radical), or a branched alkylene radical having 5 to 6 carbon atoms.

Clause 8. The ethylenically unsaturated oligomer of clause 6 or clause 7, wherein at least one Y is:

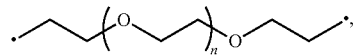

in which n has a value of 0 to 100, 0 to 50, or 0 to 10;

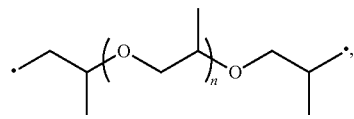

in which n has a value of 0 to 100, 0 to 50, or 0 to 10;

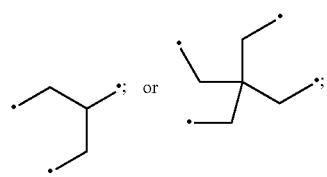

or a combination of any two or more thereof, in which each "———●" represents a linkage to another portion of the ethylenically unsaturated oligomer.

Clause 9. The ethylenically unsaturated compound of one of clause 6 to clause 8, wherein $Z^1$ is:

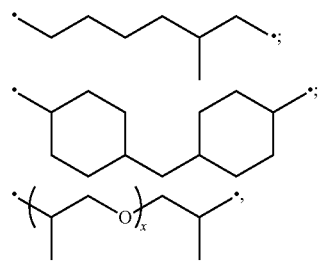

in which x has a value of 3 to 19;

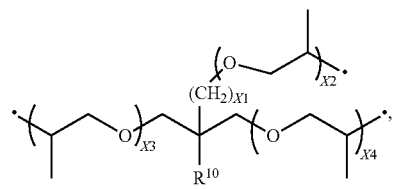

in which $R^{10}$ is $C_2H_5$ or H and each of X1, X2, X3 and X4, which may be the same or different, has a value of 1 to 10, provided that the structure has a molecular weight of 200 to 1500;

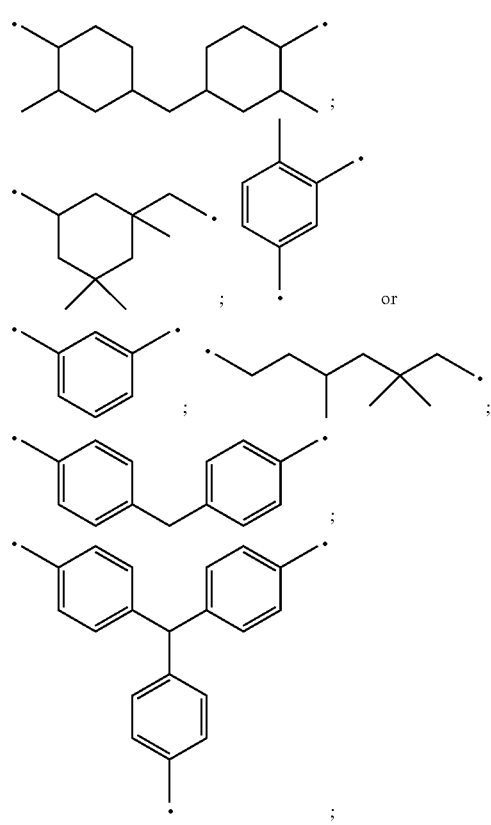

-continued

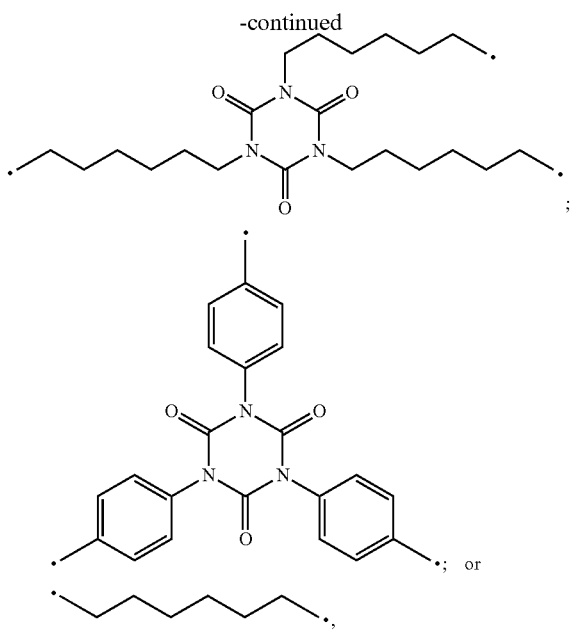

in which each "———●" represents a linkage to another portion of the ethylenically oligomer compound.

Clause 10. The ethylenically unsaturated oligomer of one of clause 6 to clause 9, wherein each $R^1$, which may be the same or different, represents an alkyl group, such as an alkyl group having 1 to 9 or 1 to 4 carbon atoms, such as where $R^1$, which may be the same or different, represents a methyl group, an ethyl group, a propyl group or a butyl group and each $R^2$ in structure (4) represents a hydrogen.

Clause 11. The ethylenically unsaturated oligomer of one of clause 6 to clause 10, wherein each X represents an identical or different alkyl, acyloxy, or alkoxy group, such as an identical or different alkyl, acyloxy, or alkoxyl group having 1 to 9 or 1 to 4 carbon atoms, with the proviso that at least one X represents an alkoxy group, such as where at least two Xs represent an alkoxy, such as methoxy, ethoxy, or propyloxy, group, or where each X represents an alkoxy, such as methoxy, ethoxy, or propyloxy group.

Clause 12. The ethylenically unsaturated oligomer of one of clause 6 to clause 11, wherein $Y^1$ comprises a linear or branched alkylene radical having 1 to 8 carbon atoms, such as a linear alkylene radical having 2 to 4 or, in some cases 3, carbon atoms (such as a propylene radical), or a branched alkylene radical having 5 to 6 carbon atoms.

Clause 13. The ethylenically unsaturated oligomer of one of clause 6 to clause 12, wherein $Z^P$ in structure (4a) is a portion of the residue of a polyol, such as a diol, a triol, or a higher functionality polyol, such as a polyether polyol, a polyester polyol, a polycarbonate polyol, a polycaprolactone polyol, an acrylic polyol, or a combination of any two or more thereof.

Clause 14. The ethylenically unsaturated oligomer of clause 13, wherein the $Z^P$ is a portion of a residue of a polyol that has a number average molecular weight, derived from the hydroxyl number of the polyol, of 50 to 15,000 g/mol, such as 1,000 to 8,000 g/mol, or, in some cases, 2,000 to 6,000 g/mol or 3,000 to 5,000 g/mol.

Clause 15. An ethylenically unsaturated oligomer (or the ethylenically unsaturated oligomer of one of clause 1 to clause 5), wherein the ethylenically unsaturated oligomer comprises the structure (5):

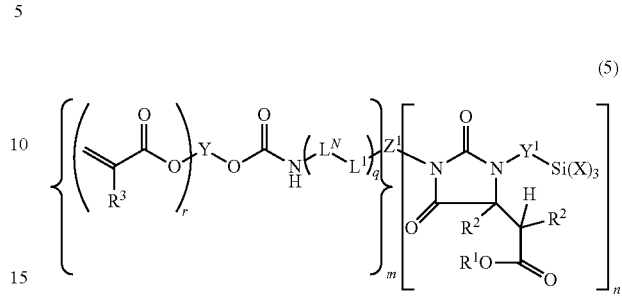

wherein Y, $Y^1$, $R^1$, $R^2$, $R^3$, X, $Z^1$, $L^N$, $L^1$, m, n, q and r are each as described above in clause 6 to clause 14.

Clause 16. An ethylenically unsaturated oligomer (or the ethylenically unsaturated oligomer of one of clause 1 to clause 5), wherein the ethylenically unsaturated oligomer comprises the structure (6):

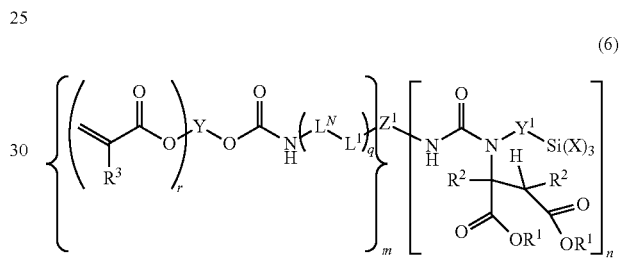

wherein Y, $Y^1$, $R^1$, $R^2$, $R^3$, $Z^1$, X, $L^N$, m, n, q, and r are each as described above in clause 6 to clause 14, and $L^2$ is a mixture of $L^1$ and $L^B$, in which $L^1$ is represented by structure (4a) in clause 6, and $L^B$ is represented by structure (6b):

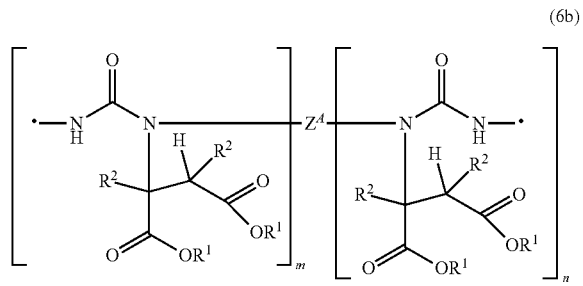

in which: (i) $Z^A$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group; (ii) $R^1$, $R^2$, m, and n are each as described above in clause 6, and (iii) each "———●" represents a linkage to another portion of the ethylenically unsaturated oligomer.

Clause 17. An ethylenically unsaturated oligomer (or the ethylenically unsaturated oligomer of one of clause 1 to clause 5), wherein the ethylenically unsaturated oligomer comprises the structure (7):

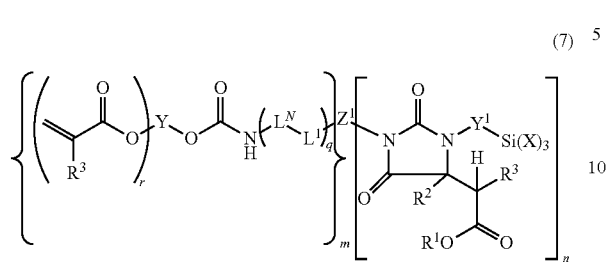
(7)

wherein Y, $Y^1$, $R^1$, $R^2$, $R^3$, $Z^1$, X, $L^N$, m, n, q, and r are each as described above in clause 6 to clause 14, and $L^3$ is a mixture of $L^1$ and $L^C$, in which $L^1$ is represented by structure (4a) in clause 6 and $L^C$ is represented by the structure (7b):

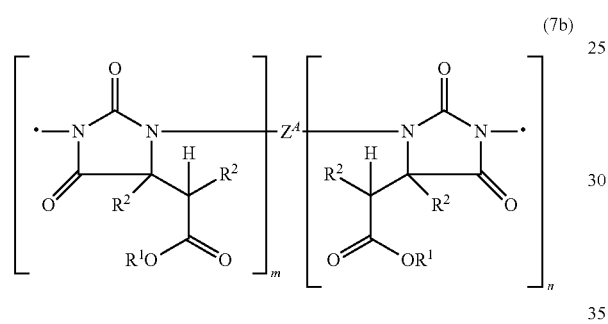
(7b)

in which: (i) $Z^A$ is as described above with reference to structure (6b) in clause 16; $R^1$, $R^2$, m, and n are each as described above in clause 6; and (iii) each "————●" represents a linkage to another portion of the ethylenically unsaturated oligomer.

Clause 18. An ethylenically unsaturated oligomer (or the ethylenically unsaturated oligomer of one of clause 1 to clause 5), wherein the ethylenically unsaturated oligomer comprises the structure (8):

(8)

in which: (1) $Z^A$ is as described above in clause 16; (2) $A^1$ is:

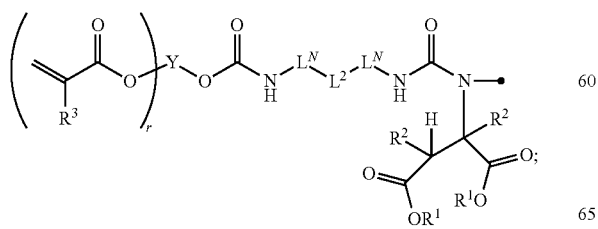

and (3) $B^1$ is:

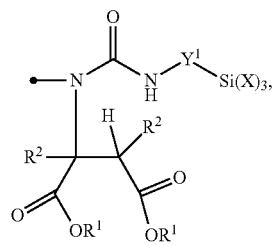

wherein Y, $Y^1$, $R^1$, $R^2$, $R^3$, X, $L^N$, m, n, q, and r are each as described above in clause 6 to clause 14, each "————●" represents a linkage to $Z^A$, and $L^2$ is $L^1$ or a mixture of $L^1$ and $L^B$, which $L^1$ is represented by structure (4a) in clause 6 and $L^B$ is represented by structure (8b):

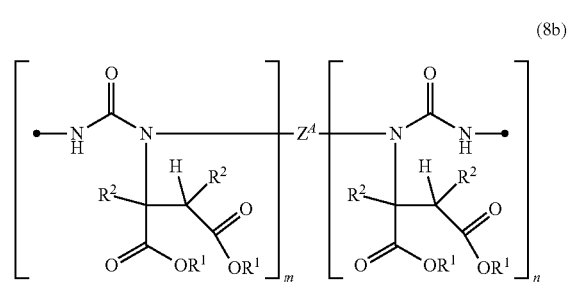
(8b)

in which: (i) $Z^A$ is as described above in clause 16; (ii) $R^1$, $R^2$, m, and n are each as described in clause 6; and (iii) each "0" represents a linkage to $L^N$.

Clause 19. An ethylenically unsaturated oligomer (or the ethylenically unsaturated oligomer of one of clause 1 to clause 5), wherein the ethylenically unsaturated oligomer comprises the structure (9):

(9)

in which: (1) $Z^A$ is as described above in clause 16; (2) $A^2$ is:

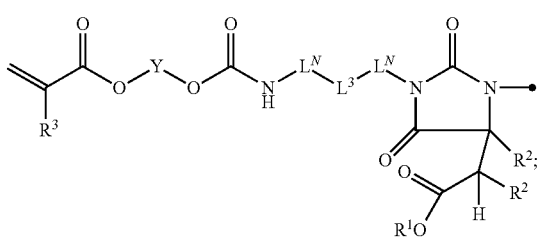

and (3) $B^2$ is:

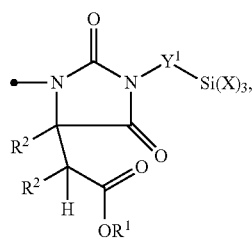

wherein Y, $Y^1$, $R^1$, $R^2$, $R^3$, X, $L^N$, m, n, q and r are each as described above in clause 6 to clause 14, each "———●" represents a linkage to $Z^A$, and $L^3$ is $L^1$, or a mixture of $L^1$ and $L^C$, in which $L^1$ is represented by structure (4a) in clause 6 and $L^C$ is represented by structure (9a):

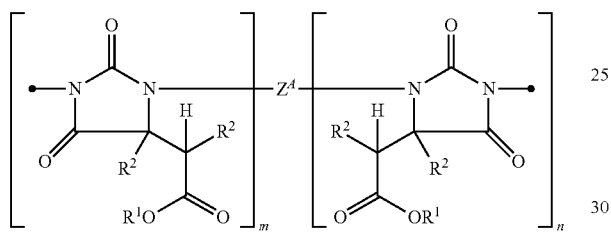
(9a)

in which: (i) $Z^A$ is as described above in clause 16; (ii) $R^1$, $R^2$, m, and n are each as described above in clause 6; and (iii) each "———●" represents a linkage to $L^N$.

Clause 20. An ethylenically unsaturated oligomer (or the ethylenically unsaturated oligomer of one of clause 1 to clause 5), wherein the ethylenically unsaturated oligomer has the structure (10):

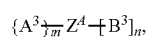
(10)

in which: (1) $Z^A$ is as described above in clause 16; (2) $A^3$ is:

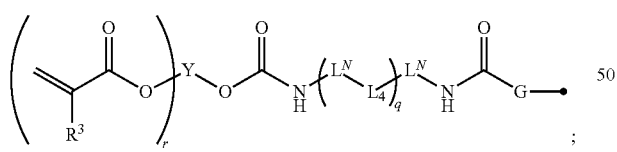
;

and (3) $B^3$ is:

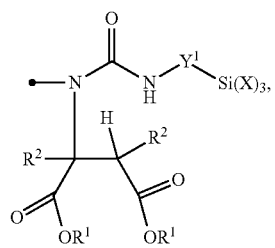

wherein (i) Y, $Y^1$, $R^1$, $R^2$, $R^3$, X, $L^N$, m, n, q, and r are each as described above in clause 6 to clause 14, (ii) G is O, S, or NH, (iii) each "———●" represents a linkage to $Z^A$, and (iv) $L^4$ is $L^1$ or a mixture of $L^1$ and $L^D$ in which $L^1$ is represented by the structure (4a) in clause 6 and $L^D$ is represented by the structure (10b):

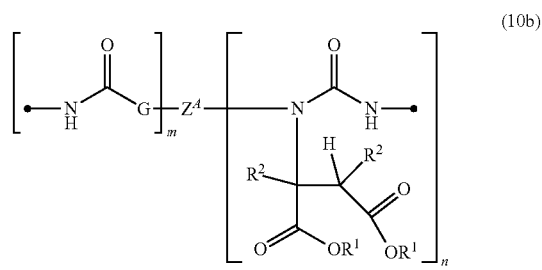
(10b)

in which: (i) $Z^A$ is as described above in clause 16; (ii) G is O, S, or NH; (iii) $R^1$, $R^2$, m, and n are each as described above in clause 6; and (iv) each "———●" represents a linkage to $L^N$.

Clause 21. An ethylenically unsaturated oligomer (or the ethylenically unsaturated oligomer of one of clause 1 to clause 5), wherein the ethylenically unsaturated oligomer comprises the structure (11):

(11)

in which: (1) $Z^A$ is as described above in clause 16; (2) $A^4$ is:

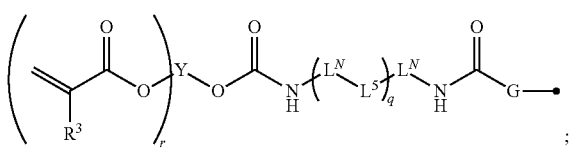
;

and (3) $B^4$ is:

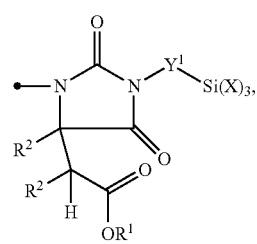

wherein (i) Y, $Y^1$, $R^1$, $R^2$, $R^3$, X, $L^N$, m, n, q and r are each as described above in clause 6 to clause 14, (ii) G is O, S or NH, (iii) each "———●" represents a linkage to $Z^A$, and (iv) $L^5$ is $L^1$, or a mixture of $L^1$ and $L^E$, in which $L^1$ is represented by structure (4a) in clause 6, and $L^E$ is represented by structure (11b):

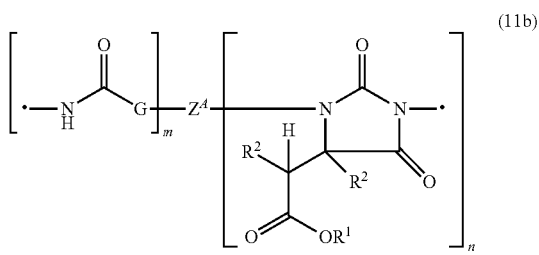

(11b)

in which: (i) $Z^A$ is as described above with reference to structure (6b) in clause 16; (ii) G is O, S, or NH; (iii) $R^1$, $R^2$, m, and n are each as described above in clause 6; and (iv) each "———●" represents a linkage to $L^N$.

Clause 22. An ethylenically unsaturated oligomer (or the ethylenically unsaturated oligomer of one of clause 1 to clause 5), wherein the ethylenically unsaturated oligomer comprises the structure (12):

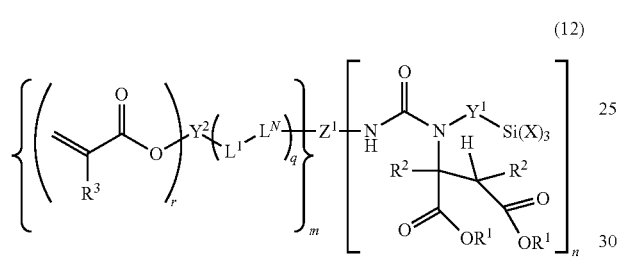

(12)

in which: (i) $R^1$, $R^2$, $R^3$, X, $Z_1$, $L^1$, $L^N$, m, n, q and r are each as described above in clause 6 to clause 14; and (ii) $Y^2$ represents a group comprising a branched or straight chain alkylene radical, such as where the branched or straight chain alkylene radical has at least 2, 2 to 8, or 2 to 4 carbon atoms, such as where $Y^2$ comprises a linear or branched alkylene radical having 1 to 8 carbon atoms, such as a linear alkylene radical having 2 to 4 or, in some cases 3, carbon atoms (such as a propylene radical), or a branched alkylene radical having 5 to 6 carbon atoms.

Clause 23. The ethylenically unsaturated oligomer of clause 22, wherein $Y^2$ is:

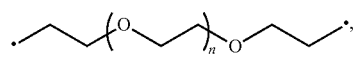

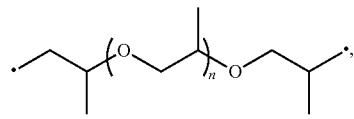

in which n has a value of 0 to 100, 0 to 50, or 0 to 10;

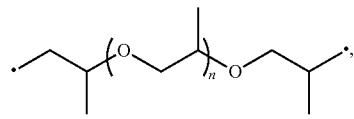

in which n has a value of 0 to 100, 0 to 50, or 0 to 10;

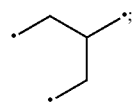

or

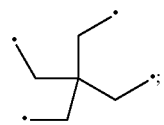

or a combination of any two or more thereof, in which each "———●" represents a linkage to another portion of the ethylenically unsaturated oligomer.

Clause 24. An ethylenically unsaturated oligomer (or the ethylenically unsaturated oligomer of one of clause 1 to clause 5), wherein the ethylenically unsaturated oligomer comprises the structure (13):

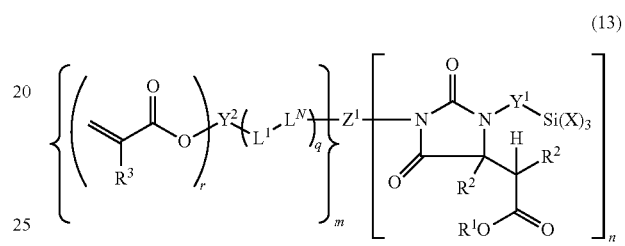

(13)

in which: (i) $R^1$, $R^2$, $R^3$, X, $Z_1$, $L^1$, $L^N$, m, n, q and r are each as described above in clause 6 to clause 14; and (ii) $Y^2$ is as described above in clause 22 and clause 23.

Clause 25. An ethylenically unsaturated oligomer (or the ethylenically unsaturated oligomer of one of clause 1 to clause 5), wherein the ethylenically unsaturated oligomer has the structure (14):

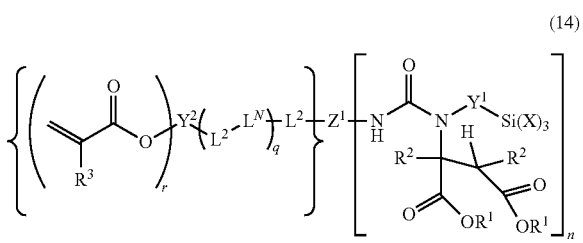

(14)

in which: (i) $R^1$, $R^2$, $R^3$, X, $Z^1$, $L^N$, m, n, q and r are each as described above in clause 6 to clause 14; (ii) $L^2$ is as described above in clause 16; and (iii) $Y^2$ is as described above in clause 22 and clause 23.

Clause 26. An ethylenically unsaturated oligomer (or the ethylenically unsaturated oligomer of one of clause 1 to clause 5), wherein the ethylenically unsaturated oligomer comprises the structure (15):

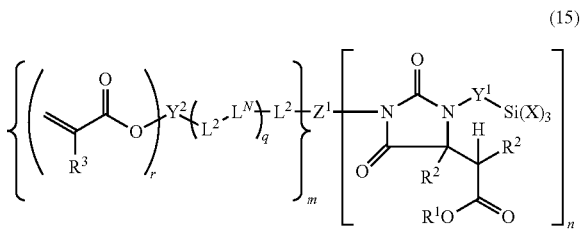

(15)

in which: (i) $R^1$, $R^2$, $R^3$, X, $Z^1$, $L^N$, m, n, q and r are each as described above in clause 6 to clause 14; (ii) $L^3$ is as described above in clause 17; and (iii) $Y^2$ is as described above in clause 22 and clause 23.

Clause 27. An ethylenically unsaturated oligomer (or the ethylenically unsaturated oligomer of one of clause 1 to clause 5), wherein the ethylenically unsaturated oligomer comprises the structure (16):

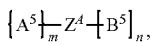
(16)

in which: (1) $Z^A$ is as described above in clause 16; (2) $A^5$ is:

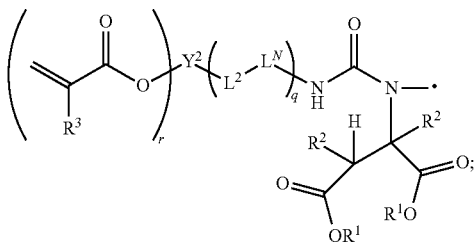

and (3) $B^5$ is:

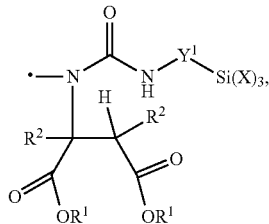

wherein: (i) $Y^1$, $R^1$, $R^2$, $R^3$, X, $L^N$, m, n, q, and r are each as described above in clause 6 to clause 14; (ii) $L^2$ is as described above in clause 16, and (iii) each " ——●" represents a linkage to $Z^A$.

Clause 28. An ethylenically unsaturated oligomer (or the ethylenically unsaturated oligomer of one of clause 1 to clause 5), wherein the ethylenically unsaturated oligomer comprises the structure (17):

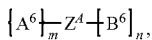
(17)

in which: (1) $Z^A$ is as described above in clause 16; (2) $A^6$ is:

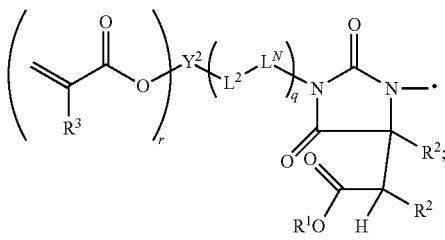

and (3) $B^6$ is:

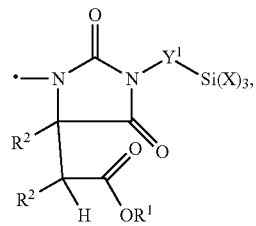

wherein: (i) $Y^1$, $R^1$, $R^2$, $R^3$, X, $L^N$, m, n, q, and r are each as described above in clause 6 to clause 14; (ii) $L^2$ is as described above in clause 16, and (iii) each " ——●" represents a linkage to $Z^A$.

Clause 29. An ethylenically unsaturated oligomer (or the ethylenically unsaturated oligomer of one of clause 1 to clause 5), wherein the ethylenically unsaturated oligomer comprises the structure (18):

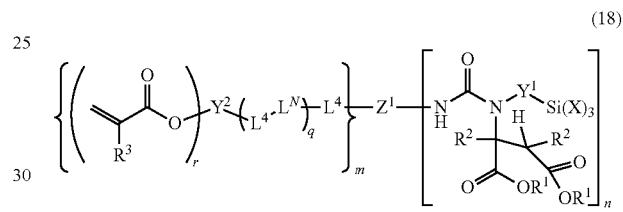
(18)

in which: (i) $R^1$, $R^2$, $R^3$, X, $Z^1$, $L^N$, m, n, q and r are each as described above in clause 6 to clause 14; (ii) $L^4$ is as described above in clause 20; and (iii) $Y^2$ is as described above in clause 22.

Clause 30. An ethylenically unsaturated oligomer (or the ethylenically unsaturated oligomer of one of clause 1 to clause 5), wherein the ethylenically unsaturated oligomer comprises the structure (19):

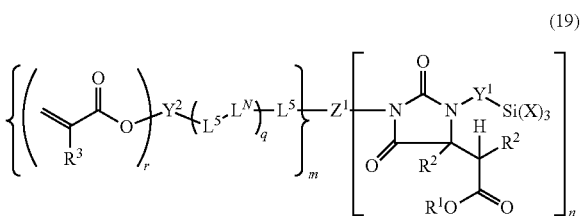
(19)

in which: (i) $R^1$, $R^2$, $R^3$, X, $Z^1$, $L^N$, m, n, q and r are each as described above in clause 6 to clause 14; (ii) $L^1$ is as described above in clause 21; and (iii) $Y^2$ is as described above in clause 22.

Clause 31. An ethylenically unsaturated oligomer (or the ethylenically unsaturated oligomer of one of clause 1 to clause 5), wherein the ethylenically unsaturated oligomer comprises the structure (20):

(20)

in which: (1) $Z^A$ is as described above in clause 16; (2) $A^1$ is:

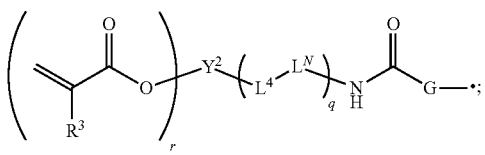

and (3) $B^7$ is:

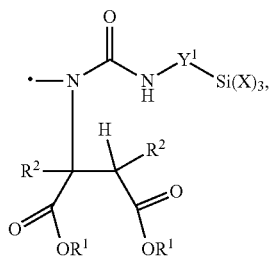

wherein (i) $Y^1$, $R^1$, $R^2$, $R^3$, X, $L^N$, m, n, q, and r are each as described above in clause 6 to clause 14, (ii) G is O, S, or NH, (iii) $L^4$ is as described above in clause 20; (iv) $Y^2$ is as described above in clause 22; and (v) each "———•" represents a linkage to $Z^A$.

Clause 32. An ethylenically unsaturated oligomer (or the ethylenically unsaturated oligomer of one of clause 1 to clause 5), wherein the ethylenically unsaturated oligomer comprises the structure (21):

 (21)

in which: (1) $Z^A$ is as described above in clause 16; (2) $A^1$ is:

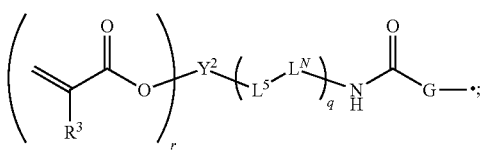

and (3) $B^8$ is:

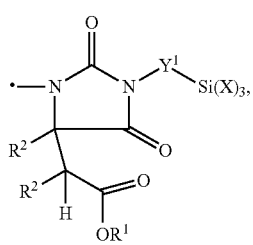

wherein (i) $Y^1$, $R^1$, $R^2$, $R^3$, X, $L^N$, m, n, and q are each as described above in clause 6 to clause 14, (ii) G is O, S or NH, (iii) $L^5$ is as described above in clause 21; (iv) $Y^2$ is as described above in clause 22; and (v) each "———•" represents a linkage to $Z^A$.

Clause 33. An ethylenically unsaturated oligomer comprising a reaction product of reactants comprising: (a) a polyisocyanate; (b) an active hydrogen-containing ethylenically unsaturated compound; (c) a compound comprising more than one active hydrogen atoms; and (d) an aspartate silane, such as where the reaction product comprises an ethylenically unsaturated oligomer of one of clause 1 to clause 15.

Clause 34. The ethylenically unsaturated oligomer of clause 33, wherein the polyisocyanate (a) comprises 2,4-tolylene diisocyanate, 2,6-tolylene diisocyanate, (hydrogenated) xylylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, 2,4,4 trimethyl hexamethylene diisocyanate, hexamethylene diisocyanate, 2,4- and/or 4,4'-methylenedicyclohexyl diisocyanate, methylene diphenyl diisocyanate, tetramethyl xylene diisocyanate, 1,5-pentane diisocyanate, bis(2-isocyanato-ethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, hexamethylene diisocyanate trimers, triphenylmethane-4,4',4"-triisocyanate, hexamethylene diisocyanate trimers, aromatic polyisocyanates based on toluene diisocyanate, polyisocyanurates of toluene diisocyanate, or a combination of any two or more thereof.

Clause 35. The ethylenically unsaturated oligomer of clause 33 or clause 34, wherein the polyisocyanate (a) has the structure:

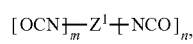

in which (i) m has a value of 1 to 5, such as 1 to 3, or 1, (ii) n has a value of 1 to 5, 1 to 3, or 1, and (iii) $Z^1$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group.

Clause 36. The ethylenically unsaturated oligomer of clause 35, wherein $Z^1$ is:

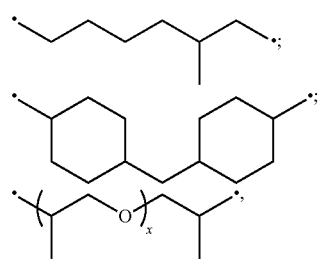

in which x has a value of 3 to 19;

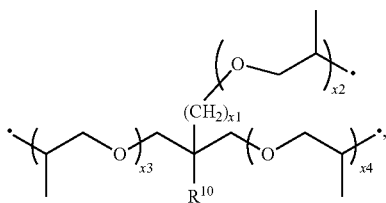

in which each X1, X2, X3 and X4, which may be the same or different, has a value of 1 to 10, provided that the structure has a molecular weight of 200 to 1500, and $R^{10}$ is $C_2H_5$ or H;

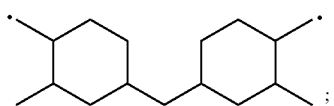

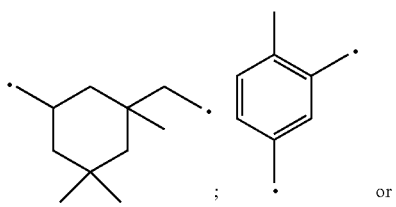

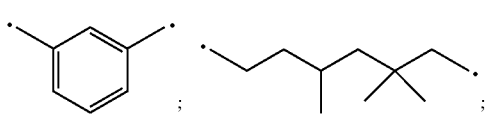

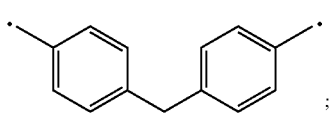

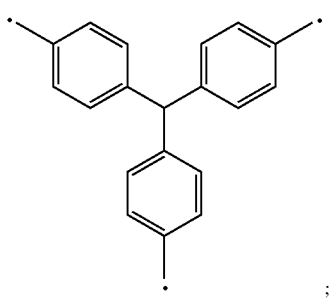

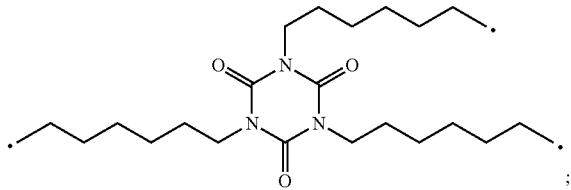

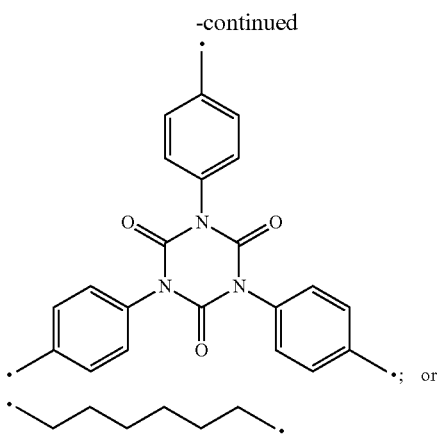

in which each "———•" represents a linkage to an NCO group.

Clause 37. The ethylenically unsaturated oligomer of one of clause 33 to clause 36, wherein the active hydrogen-containing ethylenically unsaturated compound (b) comprises an active hydrogen-containing (meth)acrylate of the structure:

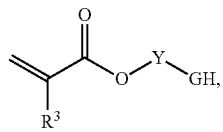

in which $R^3$ is H or $CH_3$, G is O, S, or NH, and Y represents a linear or branched linking group comprising 1 or more carbon atoms, such as where Y comprises a linear or branched alkylene radical having 1 to 8 carbon atoms, such as a linear alkylene radical having 2 to 4 or, in some cases 3, carbon atoms (such as a propylene radical), or a branched alkylene radical having 5 to 6 carbon atoms.

Clause 38. The ethylenically unsaturated oligomer of one of clause 33 to clause 37, wherein the compound comprising more than one active hydrogen atoms (c) comprises a compound of the structure:

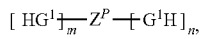

in which (i) m has a value of 1 to 5, such as 1 to 3, or 1, (ii) n has a value of 1 to 5, 1 to 3, or 1, (iii) each $G^1$, which may be the same or different, is O or S, and (iv) $Z^P$ is a linking group, which may be monomeric, oligomeric, or polymeric, that has a chain length sufficient to provide the compound comprising more than one active hydrogen atoms (c) with a molecular weight (or a number average molecular weight in the case where $Z^P$ is oligomeric or polymeric) of 50 to 15,000 g/mol, such as 1,000 to 8,000 g/mol, or, in some cases, 2,000 to 6,000 g/mol or 3,000 to 5,000 g/mol.

Clause 39. The ethylenically unsaturated oligomer of clause 38, wherein the compound comprising more than one active hydrogen atoms (c) comprises a polyol, such as a polyether polyol, polyester polyol, polycarbonate polyol, polycaprolactone polyol, acrylic polyol, or a combination of any two or more thereof.

Clause 40. The ethylenically unsaturated oligomer of one of clause 33 to clause 39, wherein the aspartate silane (d) has the structure:

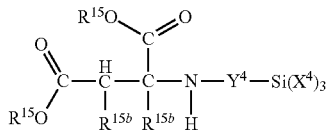

in which each $R^{15}$ and each $X^4$, which may be the same or different, represents an organic group that is inert with respect to isocyanate groups at temperatures of 100° C. or less, with the proviso that at least one $X^4$ represents an alkoxy group, $Y^4$ represents a linear or branched linking group comprising 1 or more carbon atoms, and each $R^{15b}$, which may be the same or different, represents hydrogen or an organic group which is inert towards isocyanate groups at temperatures of 100° C. or less.

Clause 41. The ethylenically unsaturated oligomer of clause 40, wherein the aspartate silane comprises a reaction product of reactants comprising: (i) an aminoalkyl alkoxysilane of the formula $H_2N\text{—}(CH_2)_n\text{—}Si(X^5)_3$, and (ii) a maleic or fumaric acid ester of the formula $R^{16}OOC\text{—}CR^{18}\text{=}CR^{18}\text{—}COOR^{17}$, in which $R^{16}$ and $R^{17}$ represent identical or different organic groups which are isocyanate-inert below 100° C., such as where $R^{16}$ and $R^{17}$ represent identical or different alkyl groups having 1 to 4 carbon atoms, each $R^{18}$, which may be the same or different, represents hydrogen or an organic group which is isocyanate-inert below 100° C. each $X^5$ represents identical or different organic groups which are isocyanate-inert below 100° C., with the proviso that at least one $X^5$ is an alkoxy group, such as where each $X^5$ represents an identical or different alkyl or alkoxy group having 1 to 4 carbon atoms, with the proviso that at least one $X^5$ is an alkoxy group, and n is an integer having a value of 2 to 4, such as 3.

Clause 42. The ethylenically unsaturated oligomer of clause 41, wherein the aminoalkyl alkoxysilanes include, without limitation, 2-aminoethyl-dimethyl-methoxysilane, 3-aminopropyl-trimethoxysilane, 3-aminopropyl-triethoxysilane, 3-aminopropyl-methyl-diethoxysilane, or a mixture of any two or more thereof.

Clause 43. The ethylenically unsaturated oligomer of clause 40 or clause 41, wherein the maleic or fumaric acid ester comprises maleic acid dimethyl ester, maleic acid diethyl ester, maleic acid di-n-butyl ester, fumaric acid dimethyl ester, fumaric acid diethyl ester, fumaric acid di-n-butyl ester, or a mixture of any two or more thereof.

Clause 44. The ethylenically unsaturated oligomer one of clause 50 to clause 52, wherein the maleic or fumaric acid ester and the aminoalkyl alkoxysilane are present in a molar ratio of acid ester to aminoalkyl alkoxysilane of 0.8 to 1.2:1, 1.0 to 1.2:1, or 1.01 to 1.2.

Clause 45. A method for producing an ethylenically unsaturated compound of one of clause 33 to clause 44 comprising reacting the polyisocyanate with (i) the active hydrogen-containing ethylenically unsaturated compound, (ii) the compound comprising more than one active hydrogen atoms, and (iii) the aspartate silane, optionally in the presence of a catalyst, to produce an ethylenically unsaturated oligomer of one of clause 1 to clause 14, wherein the aspartate silane has the structure:

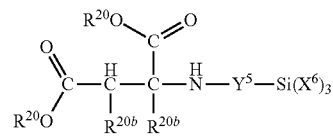

in which each $R^{20}$, which may be the same or different, represents an organic group that is inert with respect to isocyanate groups at temperatures of 100° C. or less, each $R^{20b}$, which may be the same or different, represents hydrogen or an organic group which is inert towards isocyanate groups at temperatures of 100° C. or less, each $X^6$ represents an alkoxy group or an organic group that is inert with respect to isocyanate groups at temperatures of 100° C. or less, with the proviso that at least one X6 represents an alkoxy group, and $Y^5$ represents an organic group that is inert with respect to isocyanate groups at temperatures of 100° C. or less.

Clause 46. The method of clause 45, wherein the optional catalyst comprises an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing.

Clause 47. The method of clause 45 or clause 46, wherein the reaction takes place at a temperature of 10 to 120° C. or 25 to 100° C.

Clause 48. The method of one of clause 45 to clause 47, wherein the reactants are employed in relative amounts to provide a molar ratio of isocyanate-reactive groups to isocyanate groups of at least 1:1, such as more than 1 to less than 1.5.

Clause 49. The method of one of clause 45 to clause 48, further comprising converting one or more aspartate groups to one or more hydantoin groups, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., or 80 to 100° C. to produce an ethylenically unsaturated oligomer of one of clause 1 to clause 5 or clause 15.

Clause 50. An ethylenically unsaturated oligomer comprising a reaction product of reactants comprising: (a) a polyisocyanate; (b) an active hydrogen-containing ethylenically unsaturated compound; (c) a compound comprising more than one active hydrogen atoms; (d) an aspartate silane; and (e) a polyaspartate amine, such as where the reaction product comprises an ethylenically unsaturated oligomer of one of clause 1 to clause 5, clause 16 or clause 17.

Clause 51. The ethylenically unsaturated oligomer of clause 50, wherein the polyisocyanate (a) comprises a polyisocyanate as described in one of clause 34 to clause 36.

Clause 52. The ethylenically unsaturated oligomer of clause 50 or clause 51, wherein the active hydrogen-containing ethylenically unsaturated compound (b) comprises an active-hydrogen containing ethylenically unsaturated compound as described in clause 37.

Clause 53. The ethylenically unsaturated oligomer of one of clause 50 to clause 52, wherein the compound comprising more than one active hydrogen atoms comprises a compound comprising more than one active hydrogen atoms as described in clause 38 or clause 39.

Clause 54. The ethylenically unsaturated oligomer of one of clause 50 to clause 53, wherein the aspartate silane comprises an aspartate silane of one of clause 40 to clause 44.

Clause 55. The ethylenically unsaturated oligomer of one of clause 50 to clause 54, wherein the polyaspartate amine has the structure (22):

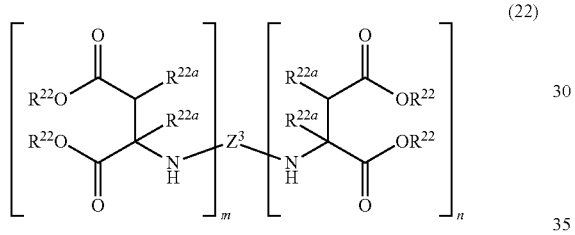

(22)

in which $Z^3$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group; each $R^{22a}$, which may be the same or different, represents a hydrogen or an organic group that is inert towards isocyanate groups at temperatures of 100° C. or less; each $R^{22}$, which may be the same or different, represents an organic group that is inert towards isocyanate groups at temperatures of 100° C. or less, such as where each $R^{22}$ represents the same or different alkyl group, such as an alkyl group having 1 to 9 or 1 to 4 carbon atoms, such as where each $R^{22}$ is a methyl group, an ethyl group, a propyl group or a butyl group; and m and n, which may be the same or different, are each an integer having a value of 1 to 4, such as where m+n is no more than 4, such as where m is 1 or 2, such as 1, and n is 1 or 2, such as 1.

Clause 56. The ethylenically unsaturated oligomer of clause 55, wherein the polyaspartate amine comprises a reaction product of a primary polyamine of the formula: $(NH_2)_m Z^3 (NH_2)_n$, in which $Z^3$ is the organic described in clause 55 and m+n is an integer having a value of at least 2, such as 2 to 4, with a maleic or fumaric acid ester of the formula (with both isomers as represented by wavy bonds):

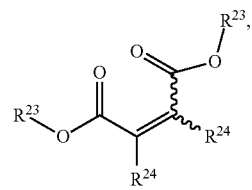

in which each $R^{23}$, which may be the same or different, represents an organic groups that is inert towards isocyanate groups at temperatures of 100° C. or less and each $R^{24}$, which may be the same or different, represents hydrogen or an organic groups that is inert towards isocyanate groups at temperatures of 100° C. or less.

Clause 57. The ethylenically unsaturated oligomer of clause 56, wherein the primary polyamine comprises ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, 2,5-diamino-2,5-dimethylhexane, 2,2,4- and/or 2,4,4-trimethyl-1,6-diaminohexane, 1,11-diaminoundecane, 1,12-diaminododecane, bis-(3-aminopropyl) ether, 1,2-bis-(3-aminopropyloxy)ethane, 1,3-bis-(3-aminopropyloxy)-2,2'-dimethylpropane, 1,2-bisaminocyclohexane, 1,3-bisaminocyclohexane, 1,4-bisaminocyclohexane, 1,3-bisaminomethylcyclohexane, 1,4-bisaminomethylcyclohexane, 1,3-bisaminoethylcyclohexane, 1,4-bisaminoethylcyclohexane, 1,3-bisaminopropylcyclohexane, 1,4-bisaminopropylcyclohexane, hydrogenated 4,4'-diaminodiphenylmethane, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane, 3,3'-dimethyl-4,4'-diamino-dicyclohexyl methane, propane-1,2,3-triamine, pentane-1,3,5-triamine, benzene-1,3,5-triamine, isophoronediamine, menthanediamine, 1,4-bisaminopropylpiperazine, o-phenylenediamine, m-phenylenediamine, p-phenylenediamine, 2,4-tolylenediamine, 2,6-tolylenediamine, 2,4-toluenediamine, 2,4'- and/or 4,4'-diaminodiphenyl methane, m-aminobenzylamine, 4-chloro-o-phenylenediamine, tetrachloro-p-xylylenediamine, 4-methoxy-6-methyl-m-phenylenediamine, m-xylylenediamine, p-xylylenediamine, 1,5-naphthalenediamine, 2,6-naphthalenediamine, benzidine, 4,4'-bis(o-toluidine), dianisidine, 4,4'-diaminodiphenylmethane, 2,2-(4,4'-diaminodiphenyl)propane, 4,4'-diaminodiphenyl ether, 4,4'-thiodianiline, 4,4'-diaminodiphenylsulfone, 4,4'-diaminoditolylsulfone, methylenebis(o-chloroaniline), 3,9-bis(3-aminopropyl) 2,4,8,10-tetraoxaspiro[5,5]undecane, diethylenetriamine, iminobispropylamine, methyliminobispropylamine, bis(hexamethylene)triamine, triethylenetetramine, tetraethylenepentamine, pentaethylenehexamine, 1,4-bis(aminoethylpiperazine), 1,4-bis(aminopropylpiperazine), 2,6-diaminopyridine, and bis(3,4-diaminophenyl)sulfone, relatively high molecular weight polyether polyamines containing aliphatically bound primary amino groups, or a combination of any two or more of any of the foregoing.

Clause 58. The ethylenically unsaturated oligomer of clause 56 or clause 57, wherein the maleic or fumaric acid ester comprises maleic acid dimethyl ester, maleic acid diethyl ester, maleic acid di-n-butyl ester, fumaric acid dimethyl ester, fumaric acid diethyl ester, fumaric acid di-n-butyl ester, or a mixture of any two or more thereof.

Clause 59. A method for producing an ethylenically unsaturated compound of one of clause 50 to clause 58 comprising reacting (i) a polyisocyanate with (ii) an active hydrogen-containing ethylenically unsaturated compound, (iii) a compound comprising more than one active hydrogen atoms, (iv) an aspartate silane, and (v) a polyaspartate amine, optionally in the presence of a catalyst, to produce an ethylenically unsaturated oligomer of one of clause 1 to clause 5 or clause 16.

Clause 60. The method of clause 59, wherein the optional catalyst comprises an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing.

Clause 61. The method of clause 59 or clause 60, wherein the reaction takes place at a temperature of 10 to 120° C. or 25 to 100° C.

Clause 62. The method of one of clause 59 to clause 61, wherein the reactants are employed in relative amounts to provide a molar ratio of isocyanate-reactive groups to isocyanate groups of at least 1:1, such as more than 1 to less than 1.5.

Clause 63. The method of one of clause 59 to clause 62, further comprising converting one or more aspartate groups to one or more hydantoin groups, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., or 80 to 100° C. to produce an ethylenically unsaturated oligomer of one of clause 1 to clause 5 or clause 17.

Clause 64. An ethylenically unsaturated oligomer comprising a reaction product of reactants comprising: (a) a polyisocyanate; (b) an isocyanate-functional silane; (c) an active hydrogen-containing ethylenically unsaturated compound; (d) a compound comprising more than one active hydrogen atoms; (e) a polyaspartate amine, such as where the reaction product comprises an ethylenically unsaturated oligomer of one of clause 1 to clause 5, clause 18 or clause 19.

Clause 65. The ethylenically unsaturated oligomer of clause 64, wherein the polyisocyanate (a) comprises a polyisocyanate as described in one of clause 34 to clause 36

Clause 66. The ethylenically unsaturated oligomer of clause 64 or clause 65, wherein the active hydrogen-containing ethylenically unsaturated compound (c) comprises an active-hydrogen containing ethylenically unsaturated compound as described in clause 37.

Clause 67. The ethylenically unsaturated oligomer of one of clause 64 to clause 66, wherein the compound comprising more than one active hydrogen atoms (d) comprises a compound comprising more than one active hydrogen atoms as described in clause 38 or clause 39.

Clause 68. The ethylenically unsaturated oligomer of one of clause 64 to clause 67, wherein the polyaspartate amine (e) comprises a polyaspartate amine as described in one of clause 55 to clause 58.

Clause 69. The ethylenically unsaturated compound of one of clause 64 to clause 68, wherein the isocyanate-functional silane (b) comprises an isocyanate-functional silane of the structure: OCN—$Y^6$—$Si(X^8)_3$, in which $Y^6$ represents a linear or branched linking group comprising 1 or more carbon atoms, such as where $Y^6$ comprises a linear or branched alkylene radical having 1 to 8 carbon atoms, such as a linear alkylene radical having 2 to 4 or, in some cases, 3 carbon atoms, or a branched alkylene radical having 5 to 6 carbon atoms, and each $X^8$, represents an alkoxy group or an organic group that is inert towards isocyanate groups at temperatures of 100° C. or less, with the proviso that at least one $X^8$ represents an alkoxy group, such as where each $X^8$ represents an identical or different alkyl, acyloxy, or alkoxy group, such as an identical or different alkyl, acyloxy, or alkoxyl group having 1 to 9 or 1 to 4 carbon atoms, with the proviso that at least one $X^8$ represents an alkoxy group, such as where at least two $X^8$'s represent an alkoxy, such as methoxy, ethoxy, or propyloxy, group, or where each $X^8$ represents an alkoxy, such as methoxy, ethoxy, or propyloxy group.

Clause 70. The ethylenically unsaturated compound of one of clause 64 to clause 69, wherein the isocyanate-functional silane (b) comprises 3-isocyanatopropyl-methyldimethoxysilane, 3-isocyanatopropyl-trimethoxysilane, 3-isocyanatopropyl-triethoxysilane, or a mixture of any two or more thereof.

Clause 71. A method for producing an ethylenically unsaturated compound of one of clause 64 to clause 70 comprising reacting (i) a polyisocyanate and (ii) an isocyanate-functional silane with (iii) an active hydrogen-containing ethylenically unsaturated compound, (iv) a compound comprising more than one active hydrogen atoms, and (v) a polyaspartate amine, optionally in the presence of a catalyst, to produce an ethylenically unsaturated oligomer of one of clause 1 to clause 5 or clause 18.

Clause 72. The method of clause 71, wherein the optional catalyst comprises an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing.

Clause 73. The method of clause 71 or clause 72, wherein the reaction takes place at a temperature of 10 to 120° C. or 25 to 100° C.

Clause 74. The method of one of clause 71 to clause 73, wherein the reactants are employed in relative amounts to provide a molar ratio of isocyanate-reactive groups to isocyanate groups of at least 1:1, such as more than 1 to less than 1.5.

Clause 75. The method of one of clause 71 to clause 74, further comprising converting one or more aspartate groups to one or more hydantoin groups, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., or 80 to 100° C. to produce an ethylenically unsaturated oligomer of one of clause 1 to clause 5 or clause 19.

Clause 76. An ethylenically unsaturated oligomer comprising a reaction product of reactants comprising: (a) a polyisocyanate; (b) an isocyanate-functional silane; (c) an active hydrogen-containing ethylenically unsaturated compound; (d) a compound comprising more than one active hydrogen atoms; (e) an active hydrogen-containing aspartate having the structure:

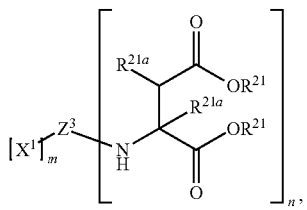

in which $X^1$ is OH, SH, or $NH_2$, $Z^3$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group, and each $R^{21}$, which may be the same or different, represents an organic group that is inert towards isocyanate groups at temperatures of 100° C. or less, such as where each $R^{21}$ represents the same or different alkyl group, such as an alkyl group having 1 to 9 or 1 to 4 carbon atoms, such as where each $R^{21}$, methyl group, an ethyl group, a propyl group or a butyl group, and each $R^{21a}$, which may be the same or different, represents hydrogen or an organic group that is inert to isocyanate groups at temperatures of 100° C. or less, and m and n, which may be the same or different, are each an integer having a value of 1 to 4, such as where m+n is no more than 4, such as where m is 1 or 2, such as 1, and n is 1 or 2, such as 1, such as where the reaction product comprises an ethylenically unsaturated oligomer of one of clause 1 to clause 5, clause 20 or clause 21.

Clause 77. The ethylenically unsaturated oligomer of clause 76, wherein the polyisocyanate (a) comprises a polyisocyanate as described in one of clause 34 to clause 36

Clause 78. The ethylenically unsaturated oligomer of clause 76 or clause 77, wherein the active hydrogen-containing ethylenically unsaturated compound (c) comprises an active-hydrogen containing ethylenically unsaturated compound as described in clause 37.

Clause 79. The ethylenically unsaturated oligomer of one of clause 76 to clause 78, wherein the compound comprising more than one active hydrogen atoms (d) comprises a compound comprising more than one active hydrogen atoms as described in clause 38 or clause 39.

Clause 80. The ethylenically unsaturated oligomer of one of clause 76 to clause 79, wherein the isocyanate-functional silane (b) comprises an isocyanate-functional silane as described in clause 69 or clause 70.

Clause 81. The ethylenically unsaturated compound of one of clause 76 to clause 80 wherein the active hydrogen-containing aspartate comprises a primary amine-containing aspartate, such as a primary amine-containing aspartates comprising a reaction product of (i) a primary polyamine as described in clause 56 or clause 57, with (ii) a maleic or fumaric acid ester as described in clause 58.

Clause 82. A method for making an ethylenically unsaturated oligomer of one of clause 76 to clause 81 comprising reacting (i) a polyisocyanate and (ii) an isocyanate-functional silane with (iii) an active hydrogen-containing ethylenically unsaturated compound, (iv) a compound comprising more than one active hydrogen atoms, and (v) an aspartate having the structure (23):

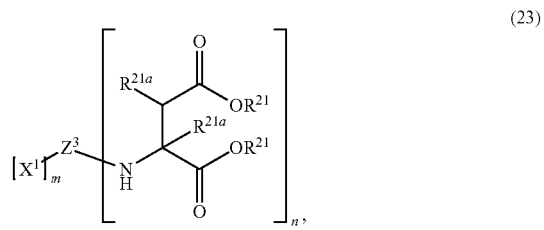

(23)

in which: (i) $X^1$ is OH, SH, or $NH_2$, (ii) $Z^3$ represents an organic group, in some cases a divalent organic group, that is inert towards isocyanate groups at temperatures of 100° C. or less, such as a hydrocarbon group that optionally contains isocyanate-inert oxygen, nitrogen, sulfur, or a combination thereof and that includes a $C_1$ to $C_{18}$ alkylene group or a $C_5$-$C_6$ cycloalkylene group; (iii) each $R^{21}$, which may be the same or different, represents an organic group that is inert towards isocyanate groups at temperatures of 100° C. or less, such as where each $R^{21}$ represents the same or different alkyl group, such as an alkyl group having 1 to 9 or 1 to 4 carbon atoms, such as where each $R^{21}$ is a methyl group, an ethyl group, a propyl group or a butyl group, (iv) each $R^{21a}$, which may be the same or different, represents hydrogen or an organic group that is inert to isocyanate groups at temperatures of 100° C. or less; and (v) m and n, which may be the same or different, are each an integer having a value of 1 to 4, such as where m+n is no more than 4, such as where m is 1 or 2, such as 1, and n is 1 or 2, such as 1, in which the reaction optionally takes place in the presence of a catalyst, to produce an ethylenically unsaturated oligomer of one of clause 1 to clause 5 or clause 20.

Clause 83. The method of clause 82, wherein the optional catalyst comprises an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing.

Clause 84. The method of clause 82 or clause 83, wherein the reaction takes place at a temperature of 10 to 120° C. or 25 to 100° C.

Clause 85. The method of one of clause 82 to clause 84, wherein the reactants are employed in relative amounts to provide a molar ratio of isocyanate-reactive groups to isocyanate groups of at least 1:1, such as more than 1 to less than 1.5.

Clause 86. The method of one of clause 82 to clause 85, further comprising converting one or more aspartate groups to one or more hydantoin groups, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., or 80 to 100° C. to produce an ethylenically unsaturated oligomer of one of clause 1 to clause 5 or clause 21.

Clause 87. An ethylenically unsaturated oligomer comprising a reaction product of reactants comprising: (a) a polyisocyanate; (b) an isocyanate-functional ethylenically unsaturated compound; (c) a compound comprising more than one active hydrogen atoms; and (e) an aspartate silane such as where the reaction product comprises an ethylenically unsaturated oligomer of one of clause 1 to clause 5 or clause 22 to clause 26.

Clause 88. The ethylenically unsaturated oligomer of clause 87, wherein the polyisocyanate (a) comprises a polyisocyanate as described in one of clause 34 to clause 36.

Clause 89. The ethylenically unsaturated oligomer of clause 87 or clause 88, wherein the compound comprising more than one active hydrogen atoms (c) comprises a compound comprising more than one active hydrogen atoms as described in clause 38 or clause 39.

Clause 90. The ethylenically unsaturated oligomer of one of clause 87 to clause 89, wherein the aspartate silane (d) comprises an aspartate silane of one of clause 40 to clause 44.

Clause 91. The ethylenically unsaturated oligomer of one of clause 87 to clause 90, wherein the isocyanate-functional ethylenically unsaturated compound has the structure:

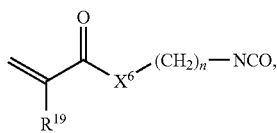

wherein $R^{19}$ represents H or $CH_3$, $X^6$ represents O, S, NH, or NR' in which R' is an alkyl radical, such as an alkyl radical having 1 to 6 carbon atoms, and n is an integer having a value of 2 to 8, such as 2 to 4.

Clause 92. The ethylenically unsaturated oligomer of one of clause 87 to clause 91, wherein the isocyanate-functional ethylenically unsaturated compound comprises isocyanoethyl methacrylate, isocyanatopropyl methacrylate, isocyanatobutyl methacrylate, isocyanatoethyl acrylate, isocyanatopropyl acrylate, isocyanatobutyl acrylate, or a mixture of any two or more thereof.

Clause 93. The ethylenically unsaturated oligomer of one of clause 87 to clause 92, wherein the isocyanate-functional ethylenically unsaturated compound comprises a reaction product of reactants comprising: (i) a monohydroxy-substituted monofunctional or multi-functional (meth)acrylate, and (ii) a polyisocyanate, such as where the monohydroxy-substituted monofunctional and/or multifunctional (meth)acrylate comprises 2-hydroxyethyl acrylate, 2-hydroxyethyl methacrylate, 2-hydroxyethyl 2-chloro acrylate, 2-hydroxyethyl 2-ethylacrylate, 2-hydroxyethyl 2-propylacrylate, 2-hydroxyethyl 2-butylacrylate, 3-hydroxypropyl methacrylate, 3-hydroxypropyl-2-propylacrylate, 2-hydroxypropyl acrylate, 3-hydroxypropyl 2-butylacrylate, 3-hydroxypropyl 2-bromo acrylate, 4-hydroxybutyl acrylate, 4-hydroxybutyl methacrylate, 3-hydroxybutyl 2-ethylacrylate, 4-hydroxybutyl 2-butylacrylate, 2-hydroxybutyl 2-propylacrylate, 4-hydroxybutyl 2-chloro acrylate, bis(methacryloyloxy)propanol, bis(acryloyloxy)propanol, pentaerythritol triacrylate, or a combination of any two or more thereof, and/or the polyisocyanate comprises a polyisocyanate as described in one of clause 34 to clause 36.

Clause 94. The ethylenically unsaturated oligomer of one of clause 87 to clause 93, wherein the reactants further comprise (f) a polyaspartate amine as described in one of clause 55 to clause 58.

Clause 95. A method for making an ethylenically unsaturated oligomer of one of clause 87 to clause 94 comprising reacting (a) a polyisocyanate and (b) an isocyanate-functional ethylenically unsaturated compound with (c) a compound comprising more than one active hydrogen atoms, (d) an aspartate silane, and optionally (e) a polyaspartate amine, in which the reaction optionally takes place in the presence of a catalyst, to produce an ethylenically unsaturated oligomer of one of clause 1 to clause 5 or clause 22, clause 23 or clause 25.

Clause 96. The method of clause 95, wherein the optional catalyst comprises an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing.

Clause 97. The method of clause 95 or clause 96, wherein the reaction takes place at a temperature of 10 to 120° C. or 25 to 100° C.

Clause 98. The method of one of clause 95 to clause 97, wherein the reactants are employed in relative amounts to provide a molar ratio of isocyanate-reactive groups to isocyanate groups of at least 1:1, such as more than 1 to less than 1.5.

Clause 99. The method of one of clause 95 to clause 98, further comprising converting one or more aspartate groups to one or more hydantoin groups, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., or 80 to 100° C. to produce an ethylenically unsaturated oligomer of one of clause 1 to clause 5 or clause 24 or clause 26.

Clause 100. An ethylenically unsaturated oligomer comprising a reaction product of reactants comprising: (a) a polyisocyanate, (b) an isocyanate-functional ethylenically unsaturated compound and (c) isocyanate-functional silane with (d) a compound comprising more than one active hydrogen atoms, and (e) a polyaspartate amine having the structure described above, such as where the reaction product comprises an ethylenically unsaturated oligomer of one of clause 1 to clause 5, clause 27 or clause 28.

Clause 101. The ethylenically unsaturated oligomer of clause 100, wherein the polyisocyanate (a) comprises a polyisocyanate as described in one of clause 34 to clause 36.

Clause 102. The ethylenically unsaturated oligomer of clause 100 or clause 101, wherein the isocyanate-functional ethylenically unsaturated compound (b) comprises a isocyanate-functional ethylenically unsaturated compound as described in one of clause 91 to clause 93.

Clause 103. The ethylenically unsaturated oligomer of one of clause 100 to clause 102, wherein the isocyanate-functional silane (c) comprises an isocyanate-functional silane as described in clause 69 or clause 70.

Clause 104. The ethylenically unsaturated oligomer of one of clause 100 to clause 103, wherein the compound comprising more than one active hydrogen atoms (d) comprises a compound comprising more than one active hydrogen atoms as described in clause 38 or clause 39.

Clause 105. The ethylenically unsaturated oligomer of one of clause 100 to clause 104, wherein the polyaspartate amine comprises a polyaspartate amine as described in one of clause 55 to clause 58.

Clause 106. A method for making an ethylenically unsaturated oligomer of one of clause 100 to clause 105 comprising reacting: (a) a polyisocyanate, (b) an isocyanate-functional ethylenically unsaturated compound and (c) isocyanate-functional silane with (d) a compound comprising more than one active hydrogen atoms, and (e) a polyaspartate amine, in which the reaction optionally takes place in the presence of a catalyst, to produce an ethylenically unsaturated oligomer of one of clause 1 to clause 5 or clause 27.

Clause 107. The method of clause 106, wherein the optional catalyst comprises an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing.

Clause 108. The method of clause 106 or clause 107, wherein the reaction takes place at a temperature of 10 to 120° C. or 25 to 100° C.

Clause 109. The method of one of clause 106 to clause 108, wherein the reactants are employed in relative amounts to provide a molar ratio of isocyanate-reactive groups to isocyanate groups of at least 1:1, such as more than 1 to less than 1.5.

Clause 110. The method of one of clause 106 to clause 109, further comprising converting one or more aspartate groups to one or more hydantoin groups, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., or 80 to 100° C. to produce an ethylenically unsaturated oligomer of one of clause 1 to clause 5 or clause 28.

Clause 111. An ethylenically unsaturated oligomer comprising a reaction product of reactants comprising: (a) a polyisocyanate; (b) an isocyanate-functional ethylenically unsaturated compound; (c) a compound comprising more than one active hydrogen atoms; (d) an aspartate silane; and (e) an aspartate of the structure (23) in clause 82, such as where the reaction product comprises an ethylenically unsaturated oligomer of one of clause 1 to clause 5, clause 29 or clause 30.

Clause 112. The ethylenically unsaturated oligomer of clause 111, wherein the polyisocyanate (a) comprises a polyisocyanate as described in one of clause 34 to clause 36.

Clause 113. The ethylenically unsaturated oligomer of clause 111 or clause 112, wherein the isocyanate-functional ethylenically unsaturated compound (b) comprises a isocyanate-functional ethylenically unsaturated compound as described in one of clause 91 to clause 93.

Clause 114. The ethylenically unsaturated oligomer of one of clause 111 to clause 113, wherein the compound comprising more than one active hydrogen atoms (c) comprises a compound comprising more than one active hydrogen atoms as described in clause 38 or clause 39.

Clause 115. The ethylenically unsaturated oligomer of one of clause 111 to clause 114, wherein the aspartate silane (d) comprises an aspartate silane of one of clause 40 to clause 44.

Clause 116. A method for making an ethylenically unsaturated oligomer of one of clause 111 to clause 115 comprising reacting: (a) a polyisocyanate; (b) an isocyanate-functional ethylenically unsaturated compound; (c) a compound comprising more than one active hydrogen atoms; (d) an aspartate silane; and (e) an aspartate of the structure (23), in which the reaction optionally takes place in the presence of a catalyst, to produce an ethylenically unsaturated oligomer of one of clause 1 to clause 5 or clause 29.

Clause 117. The method of clause 116, wherein the optional catalyst comprises an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing.

Clause 118. The method of clause 116 or clause 117, wherein the reaction takes place at a temperature of 10 to 120° C. or 25 to 100° C.

Clause 119. The method of one of clause 116 to clause 118, wherein the reactants are employed in relative amounts to provide a molar ratio of isocyanate-reactive groups to isocyanate groups of at least 1:1, such as more than 1 to less than 1.5.

Clause 120. The method of one of clause 116 to clause 119, further comprising converting one or more aspartate groups to one or more hydantoin groups, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., or 80 to 100° C. to produce an ethylenically unsaturated oligomer of one of clause 1 to clause 5 or clause 30.

Clause 121. An ethylenically unsaturated oligomer comprising a reaction product of reactants comprising: (a) a polyisocyanate; (b) an isocyanate-functional ethylenically unsaturated compound; (c) an isocyanate-functional silane; (d) a compound comprising more than one active hydrogen atoms; and (e) an active hydrogen-containing aspartate as described in clause 76, such as where the reaction product comprises an ethylenically unsaturated oligomer of one of clause 1 to clause 5, clause 31 or clause 32.

Clause 122. The ethylenically unsaturated oligomer of clause 121, wherein the polyisocyanate (a) comprises a polyisocyanate as described in one of clause 34 to clause 36.

Clause 123. The ethylenically unsaturated oligomer of clause 121 or clause 122, wherein the isocyanate-functional ethylenically unsaturated compound (b) comprises a isocyanate-functional ethylenically unsaturated compound as described in one of clause 91 to clause 93.

Clause 124. The ethylenically unsaturated oligomer of one of clause 121 to clause 123, wherein the isocyanate-functional silane (c) comprises an isocyanate-functional silane as described in clause 69 or clause 70.

Clause 125. The ethylenically unsaturated oligomer of one of clause 121 to clause 124, wherein the compound comprising more than one active hydrogen atoms (d) comprises a compound comprising more than one active hydrogen atoms as described in clause 38 or clause 39.

Clause 126. A method for making an ethylenically unsaturated oligomer of one of clause 121 to clause 125 comprising reacting: (a) a polyisocyanate; (b) an isocyanate-functional ethylenically unsaturated compound; (c) an isocyanate-functional silane; (d) a compound comprising more than one active hydrogen atoms; and (e) an active hydrogen-containing aspartate, in which the reaction optionally takes place in the presence of a catalyst, to produce an ethylenically unsaturated oligomer of one of clause 1 to clause 5 or clause 31.

Clause 127. The method of clause 126, wherein the optional catalyst comprises an organic metal catalyst, an amine catalyst, or a combination thereof, such as where the catalyst comprises a copper compound, such as copper naphthenate, a cobalt compound, such as cobalt naphthenate, a zinc compound, such as zinc naphthenate, a bismuth compound, such as bismuth neodecanoate, a tin compound, such as di-n-butyl tin dilaurate, triethylamine, triethylenediamine, DABCO, DMEA, or a combination of any two or more of the foregoing.

Clause 128. The method of clause 126 or clause 127, wherein the reaction takes place at a temperature of 10 to 120° C. or 25 to 100° C.

Clause 129. The method of one of clause 126 to clause 128, wherein the reactants are employed in relative amounts to provide a molar ratio of isocyanate-reactive groups to isocyanate groups of at least 1:1, such as more than 1 to less than 1.5.

Clause 130. The method of one of clause 126 to clause 129, further comprising converting one or more aspartate groups to one or more hydantoin groups, wherein such conversion is carried out optionally in the presence of a catalyst, such as a Bronsted acids, a carboxylic acid, a sulfonic acid, a phenol, or a mixture of any two or more thereof, at a reaction temperature of 0 to 200° C., 70 to 130° C., 75 to 105° C., or 80 to 100° C. to produce an ethylenically unsaturated oligomer of one of clause 1 to clause 5 or clause 32.

Clause 131. A composition, such as a coating composition, comprising: (a) the ethylenically unsaturated oligomer of any one of clause 1 to clause 44, clause 50 to clause 58, clause 64 to clause 70, clause 76 to clause 81, clause 87 to clause 94, clause 100 to clause 105, clause 111 to clause 115, or clause 121 to clause 125; or (b) an ethylenically unsaturated oligomer produced by the method of any of clause 45 to clause 49, clause 59 to clause 63, clause 71 to clause 75, clause 82 to clause 86, clause 95 to clause 99, clause 106 to clause 110, clause 116 to clause 120, or clause 126 to clause 130.

Clause 132. The composition of clause 131, wherein the composition further comprises an ethylenically unsaturated oligomer (b) that is different from ethylenically unsaturated oligomer (a), wherein the sum of the amount of ethylenically unsaturated oligomer (a) and ethylenically unsaturated oligomer (b) is 1 to 99% by weight, 10 to 90% by weight, 20 to 50 by weight, 40 to 70% by weight, 60 to 80% by weight, 65 to 99% by weight, or 1 to 30% by weight, based on the total weight of solids in the radiation curable coating composition.

Clause 133. The composition of clause 131 or clause 132, wherein ethylenically unsaturated oligomer (a) is present in an amount of 1 to 90% by weight, such as 10 to 90% by weight, 20 to 80% by weight, 30 to 70% by weight, or 40 to 60% by weight, based on the total weight of ethylenically unsaturated oligomer (a) and ethylenically unsaturated oligomer (b) in the composition.

Clause 134. The composition of clause 133, wherein the ethylenically unsaturated oligomer (b) has a number average molecular weight (Mn), measured according to the procedure described in this specification, of 1000 g/mol to 35,000 g/mol, 1000 g/mol to 30,000 g/mol, 1000 g/mol to 25,000 g/mol, 1000 g/mol to 20,000 g/mol, 2,200 to 10,000 g/mol, or 2,200 to 5,500 g/mol.

Clause 135. The composition of clause 133 or clause 134, wherein the ethylenically unsaturated oligomer (b) comprises a urethane (meth)acrylate oligomer, comprising a (meth)acrylate group, a urethane group and a backbone, such as where the backbone is a reaction product of: (1) a polyol, such as a diol, (2) an isocyanate, such as a polyisocyanate, such as a diisocyanate, and (3) a hydroxyl group-containing (meth)acrylate.

Clause 136. The composition of 135, wherein the polyol comprises a polyether polyol, a polyester polyol, a polycarbonate polyol, a polycaprolactone polyol, an acrylic polyol, or a mixture of any two or more thereof, such as where the polyol comprises a polypropylene glycol.

Clause 137. The composition of clause 135 or clause 136, wherein the number average molecular weight derived from the hydroxyl number of the polyol is 50 to 15,000 g/mol or 1,000 to 8,000 g/mol.

Clause 138. The composition of one of clause 135 to clause 137 wherein the polyisocyanate used to prepare the urethane acrylate oligomer comprises 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanato-ethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, a hexamethylene diisocyanate trimer, triphenylmethane-4,4',4"-triisocyanate, a hexamethylene diisocyanate trimer, an aromatic polyisocyanate based on toluene diisocyanate, polyisocyanurates of toluene diisocyanate, as well as combinations of any two or more thereof.

Clause 139. The composition of one of clause 135 to clause 138, wherein the hydroxyl group-containing (meth)acrylate used to prepare the urethane (meth)acrylate oligomer comprises a (meth)acrylate derived from (meth)acrylic acid and/or an epoxy (meth)acrylate comprising an alkylene oxide, such as 2-hydroxy ethyl (meth)acrylate, 2-hydroxypropylacrylate and 2-hydroxy-3-oxyphenyl(meth)acrylate.

Clause 140. The composition of one of clause 135 to clause 139, wherein the polyol, the polyisocyanate, and the hydroxyl group-containing (meth)acrylate used to prepare the urethane (meth)acrylate oligomer are used in relative amounts such that 0.1 to 0.9 equivalents of a hydroxyl group included in the hydroxyl group-containing (meth)acrylate and 1.0 to 1.5 equivalents of total hydroxyl groups present from the polyol and the hydroxyl group-containing (meth)acrylate are used for one equivalent of isocyanate group included in the polyisocyanate.

Clause 141. The composition of one of clause 131 to clause 140, wherein the composition further comprises a reactive diluent compound (c) comprising one or more ethylenically unsaturated groups.

Clause 142. The composition of clause 141, wherein the reactive diluent (c) comprises one double bond, such as an alkyl or hydroxyalkyl (meth)acrylate, such as methyl (meth)acrylate, ethyl (meth)acrylate, butyl (meth)acrylate, 2-ethylhexyl (meth)acrylate, 2-hydroxyethyl (meth)acrylate, isobornyl (meth)acrylate, lauryl (meth)acrylate, ethoxylated nonyl-phenol (meth)acrylate, phenoxyethyl (meth)acrylate, diethylene-glycol-ethyl-hexyl acylate (DEGEHA), acrylonitrile, acrylamide, methacrylamide, an N-substituted (meth)acrylamide, a vinyl ester (such as vinyl acetate), styrene, an alkylstyrene, a halostyrene, a N-vinylpyrrolidone, a N-vinyl caprolactam, a vinyl chloride, a vinylidene chloride, or a mixture of any two or more thereof.

Clause 143. The composition of clause 141 or clause 142, wherein the reactive diluent (c) comprises more than one double bond, such as ethylene glycol di(meth)acrylate, propylene glycol di(meth)acrylate, neopentyl glycol di(meth)acrylate, hexamethylene glycol di(meth)acrylate, bisphenol A di(meth)acrylate, 4,4'-bis(2-acryloyloxyethoxy)diphenylpropane, trimethylolpropane tri(meth)acrylate, pentaerythritol tri(meth)acrylate, pentaerythritol tetra(meth)acrylate, vinyl (meth)acrylate, divinyl benzene, divinyl succinate, diallyl phthalate, triallyl phosphate, triallyl isocyanurate, tris(2-acryloylethyl)isocyanurate, or a mixture of any two or more thereof.

Clause 144. The composition of any one of clause 141 to clause 143, wherein the reactive diluent (c) is present in an amount of 5 to 90% by weight, 10 to 90% by weight, 10 to 80% by weight, or, in some cases, 10 to 60% by weight, 10 to 40% by weight, or 10 to 30% by weight, based on the total weight of solids in the composition.

Clause 145. The composition of any one of clause 131 to clause 144, wherein the composition further comprises a photoinitiator (d).

Clause 146. The composition of clause 145, wherein the photoinitiator (d) comprises an acylphosphine oxide, such as a bisacylphosphine oxide (BAPO) and/or a monoacylphosphine oxide (MAPO), an α-hydroxy ketone, or a mixture of any two or more thereof.

Clause 147. The composition of clause 145, wherein the photoinitiator (d) comprises a bisacylphosphine oxide having the structure:

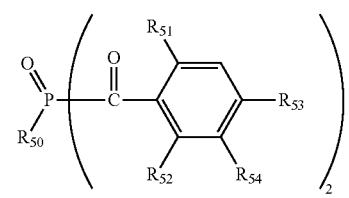

in which wherein $R_{50}$ is $C_1$-$C_{12}$ alkyl, cyclohexyl or phenyl, which is unsubstituted or is substituted by 1 to 4 halogen atoms, or $C_1$-$C_8$ alkyl; $R_{51}$ and $R_{52}$ are each independently of the other $C_1$-$C_8$ alkyl or $C_1$-$C_8$ alkoxy; $R_{53}$ is hydrogen or $C_1$-$C_8$ alkyl; and $R_{54}$ is hydrogen or methyl, such as where the bisacylphosphine oxide comprises bis(2,4,6-trimethylbenzoyl)-phenylphosphine oxide, bis(2,4,6-trimethylbenzoyl)-(2,4-bis-pentyloxyphenyl)phosphine oxide, or a mixture thereof Clause 148. The composition of one of clause 145 to clause 147, wherein the photoinitiator (d) is present in an amount of 0.1 to 10% by weight, such as 0.1 to 5% by weight, or, in some cases, 1 to 5% by weight, based on the total weight of the radiation curable composition.

Clause 149. The composition of one of clause 131 to clause 148, wherein the composition further comprises (e) gamma-mercaptopropyltrimethoxysilane, trimethoxysiliylpropyl acrylate, 3-trimetoxysilylpropane-1-thiol, an ethylenically unsaturated silane monomer, or a mixture of any two or more thereof, such as where the ethylenically unsaturated silane monomer comprises: (a) a moiety of the structure:

—Y—Si(X)$_3$; and (b1) a moiety of the structure:

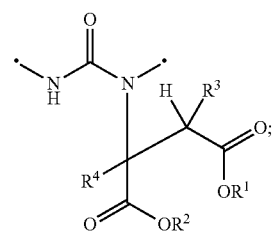

(b2) a moiety of the structure:

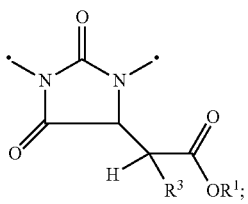

(b3) a combination of a moiety of the structure (2) and a moiety of the structure (3), in which (i) Y represents a linear or branched linking group comprising 1 or more carbon atoms, (ii) each x, which may be the same or different, represents an alkoxy group or an organic group that is inert towards isocyanate groups at temperatures of 100° C. or less, with the proviso that at least one X represents an alkoxy group, (iii) $R^1$ and $R^2$, which may be the same or different, each represent an organic group that is inert to isocyanate groups at temperatures of 100° C. or less; (iv) $R^3$ and $R^4$, which may be the same or different, each represent hydrogen or an organic group that is inert to isocyanate groups at temperatures of 100° C. or less; and (v) each "———●" represents a linkage to another portion of the ethylenically unsaturated silane monomer, such as where the ethylenically unsaturated silane monomer has a molecular weight, calculated from the molecular formula of the ethylenically unsaturated silane monomer, of 400 to less than 2000 g/mol or 400 to 1000 g/mol.

Clause 150. The composition of one of clause 131 to clause 149, wherein the composition has a total silane content (determined as described in the Examples section of this specification) of up to 10 mmol, such as 1 to 10 mmol, 1 to 8 mmol, or, in some cases 2 to 6 mmol, per 100 gram of the radiation curable composition and/or the composition has a total content of urea+ urethane (determined as described in the Examples section of this specification) of 20 to 200 mmol, such as 30 to 150 mmol, or, in some cases 40 to 100 mmol, per 100 gram of the composition.

Clause 151. The composition of one of clause 131 to claim 150, wherein the composition further comprises an additive that comprises a photosensitizer, a radiation cure amine synergist, a UV absorber, an antioxidant, a UV stabilizer, a thermo stabilizer, a filler material, a train transfer thiol compound, a surface active compound, a viscosity modifier, an additional addition promoter, a water scavenger, such as TEOS and orthoformate, an oxygen quencher or a functional material, such as pigments, dyes, photochromic dyes, laser dyes, liquid crystals, light emitting materials, nano materials, quantum dots, fluorescent materials, dichroic dyes, antistatic materials, refractive index modifier and bioactive materials.

Clause 152. The composition of one of clause 131 to clause 151, wherein the composition further comprises organic solvent.

Clause 153. The composition of one of clause 131 to clause 152, wherein the composition has a viscosity of at least >0.1 Pascal seconds (Pa s), at least 0.2, at least 0.5, at least 1 Pa s, and/or less than 15 Pa s, less than 12 Pa-s, or less than 10 Pa s, or 1 to 15 Pa s, 2 to 12 Pa s, or 3 to 10 Pa s, wherein viscosity is measured at 25° C. and a shear rate of 2500 s-1.

Clause 154. A cured coating formed from the composition of one of clause 131 to clause 153.

Clause 155. A substrate at least partially coated with a cured coating of clause 154, such as where the substrate comprises an optical fiber.

Clause 156. The substrate of clause 155, further comprising a secondary coating in contact with and surrounding the cured coating and, optionally, an ink layer disposed on the secondary coating.

Clause 157. The substrate of clause 155 or clause 156, wherein the cured coating has a tensile modulus of less than less than 5 MPa, less than 2 MPa, less than 1.5 MPa, or less than 1.0 MPa.

Clause 158. The substrate of any one of clause 155 to clause 157, wherein the cured coating exhibits a peel strength of at least 40 gf/in, or at least 55 gf/in, when measured at least 7 days after as described in the Examples section of this specification.

Clause 159. The substrate of any one of clause 155 to clause 158, wherein the cured coating exhibits an elongation at break of at least 35%, such as at least 50%, when measured as described in the Examples section of this specification.

Clause 160. A method for coating an optical fiber comprising: (a) providing a glass optical fiber, such as by drawing a glass optical fiber through a draw tower; (b) applying a primary coating composition onto the surface of the glass optical fiber; (c) optionally, imparting a dose of UV light sufficient to at least partially cure said primary coating composition; (d) applying a secondary coating composition to the primary coating composition; (e) exposing the secondary coating composition to at least one radiation source capable of emitting ultraviolet radiation to affect curing of said secondary coating composition and, optionally said primary coating composition, wherein the primary coating composition and/or the secondary coating composition comprises a composition of any one of clause 131 to clause 153.

Clause 161. A coated optical fiber comprising: (a) a glass core and a cladding layer in contact with and surrounding said glass core; and (b) a coating portion at least partially coating the cladding layer, the coating portion comprising: (i) a primary coating layer in contact with said cladding layer; and (ii) a secondary coating layer in contact with and surrounding said primary coating layer, wherein the primary coating layer and/or the secondary coating layer is a cured product of a composition of any one of clause 131 to clause 153.

Clause 162. The coated optical fiber of clause 161, wherein the core comprises pure silica glass ($SiO_2$) or silica glass with one or more dopants, such as where the dopants comprise $GeO_2$, $Al_2O_3$, $P_2OL_5$, $TiO_2$, $ZrO_2$, $Nb_2O_5$, $Ta_2O_5$, or a combination of any two or more thereof.

Clause 163. The method of clause 160 or the coated optical fiber of clause 161 or clause 162, wherein the cured primary coating has an in-situ glass transition temperature of less than −35° C., less than −40° C., less than −45° C., or not more than −50° C., and/or the cured primary coating has a thickness of 20 to 50 μm, 20 to 40 μm, 20 to 30 μm, 25 or 32.5 μm, or 15 to 25 μm.

Clause 164. The method of clause 160 or clause 163 or the coated optical fiber of one of clause 161 to clause 163, wherein the secondary coating exhibits an in-situ tensile modulus of greater than 800 MPa, greater than 1110 MPa, greater than 1300 MPa, greater than 1400 MPa, or greater than 1500 MPa, 1000 MPa to 8000 MPa, 1200 MPa to 5000 MPa, or 1500 MPa to 3000 MPa, and/or an in-situ Tg of 50° C. to 120° C. or 50° C. to 100° C., and/or a thickness of no more than 40 µm, 20 to 40 µm, or 20 to 30 µm.

Clause 165. The coated optical fiber of one of clause 161 to clause 164, wherein the coated optical fiber possesses a mode-field diameter from 8 to 10 µm at a wavelength of 1310 nm, a mode-field diameter from 9 to 13 µm at a wavelength of 1550 nm, and/or an effective area of 20 to 200 µm².

Clause 166. The ethylenically unsaturated oligomer of one of clause 6 to clause 32, wherein each $R^1$ and $R^2$, which may be the same or different, represents an alkyl group, such as an alkyl group having 1 to 9 or 1 to 4 carbon atoms, such as where each $R^1$ and $R^2$, which may be the same or different, represents a methyl group, an ethyl group, a propyl group or a butyl group.

Clause 167. The ethylenically unsaturated oligomer of clause 166, wherein each X represents an identical or different alkyl, acyloxy, or alkoxy group, such as an identical or different alkyl, acyloxy, or alkoxyl group having 1 to 9 or 1 to 4 carbon atoms, with the proviso that at least one X represents an alkoxy group, such as where at least two X's represent an alkoxy, such as methoxy, ethoxy, or propyloxy, group, or where each X represents an alkoxy, such as methoxy, ethoxy, or propyloxy group.

Clause 168. The ethylenically unsaturated oligomer of clause 166 or clause 167, wherein $Y^1$ comprises a linear or branched alkylene radical having 1 to 8 carbon atoms, such as a linear alkylene radical having 2 to 4 or, in some cases 3, carbon atoms, or a branched alkylene radical having 5 to 6 carbon atoms.

Clause 169. The ethylenically unsaturated oligomer of one of clause 166 to clause 168, wherein the ethylenically unsaturated oligomer has a Mn of at least 800 g/mol, 1000 g/mol to 35,000 g/mol, 2000 g/mol to 30,000 g/mol, 2000 g/mol to 25,000 g/mol, 2000 g/mol to 20,000 g/mol, 2,200 to 10,000 g/mol, or 2,200 to 5,500 g/mol, as measured by SEC.

The non-limiting and non-exhaustive examples that follow are intended to further describe various non-limiting and non-exhaustive implementations without restricting the scope of the implementations described in this specification.

EXAMPLES

TABLE 1

Materials Used

| Component | Chemical Descriptor | Trade name | Supplier/Manufacturer |
| --- | --- | --- | --- |
| DBTDL | Dibutyltin Dilaurate | DABCO T-12 | EVONIK |
| Coscat 83 | Organobismuth catalyst | Coscat 83 | Vertellus |
| BHT | Butylated hydroxytoluene | | Acros |
| IPDI | Isophorone diisocyanate | DESMODUR I | Covestro |
| TDI | 2,4-diisocyanato-1-methyl-benzene | DESMODUR T 100 SP | Covestro |
| TESPI | 3-(Triethoxysilyl)propyl isocyanate | | Sigma-Aldrich |
| PPG 4000 | Polypropylene glycol | ACCLAIM POLYOL 4200 | Covestro |
| NH-1423LF | A polyaspartate of the type described by structure (22) | Desmophen NH-1423LF | Covestro |
| HEA | 2-Hydroxyethyl acrylate | | BASF |
| HEMA | Methacrylic acid oxyethylester | | Lotte |
| BVE | 1,4-butanediol vinyl ether | | TCI |
| KBM-903 | 3-Aminopropyltrimethoxysilane | KBM-903 | Shin-Etsu Silicone |
| KBM-803 | (3-Mercaptopropyl)trimethoxysilane | KBM-803 | Shin-Etsu |
| IPDA | Isophorone diamine | | Sigma-Aldrich |
| Diethyl maleate | Diethyl maleate | | Acros |
| PEA | 2-Propenoic acid, 2-phenoxyethyl ester | AgiSyn 2832 | Covestro |
| ENPA | Ethoxylated nonyl phenol acrylate | AgiSyn 2895 | Covestro |
| EOEOEA | 2-Propenoic acid, 2-(2-ethoxyethoxy)ethyl ester | AgiSyn ™ 2880 | Covestro |
| IBOA | Isobornyl acrylate | AgiSyn ™ 2870 | Covestro |
| TMPTA | 2-Propenoic acid, 1,1'-[2-ethyl-2-[[(1-oxo-2-propen-1-yl)oxy]methyl]-1,3-propanediyl] ester | AgiSyn ™ 2811 | Covestro |
| TMPTA(3EO) | Trimethylolpropane ethoxylated, triacrylate | AgiSyn ™ 2836 | Covestro |
| Isooctyl 3-mercaptopropionate | Isooctyl 3-mercaptopropionate | Evabopol ® 498 | Bruno Bock |
| Antioxidant 1520 | 2-methyl-4,6-bis(octylsulfanylmethyl)phenol | Irganox 1520 | BASF |
| Tetraethoxy silane | Tetraethoxy silane | | Acros |
| Acrylic acid | Acrylic acid | | Sigma-Aldrich |
| TPO | Diphenyl(2,4,6-trimethylbenzoyl)phosphine oxide | Speedcure TPO | Lambson |

Many materials used herein were made resulting in a mixture having a statistical distribution of molecular weight that can be easily recognized by those skilled in the art. The structures in this section, and elsewhere herein, only show the designed averaged, or "ideal" structure, unless otherwise noted.

The inventive ethylenically unsaturated oligomers provides significant process advantages compared to other possible silane-containing ethylenically unsaturated oligomers that are used as adhesion promoters, as is apparent from Table 2. In Table 2, all numbers related to materials used in the synthesis are relative equivalents. The oligomers were similar in structure with the only difference being the adhesion promoter residue attached to one end of the oligomer. The use of mercaptosilane and aminosilane adhesion promoter as endcap of an oligomer that contains an ethylenically unsaturated group and a silane group are known. In the process examples studied and compared, which utilized a bismuth catalyst, the aspartic silane precursor provided a significant improvement in the process relative to an aminosilane endcap in which a white gel formed immediately upon the addition of aminosilane, preventing the oligomer synthesis from processing. When using the aspartic silane precursor, this gelation was avoided and the oligomers successfully synthesized. The production of ethylenically unsaturated oligomers that contain a silane group via a mercaptosilane endcap is typically carried out with a tin catalyst. As shown in Table 2, carrying out such a synthesis with a bismuth catalyst led to significant yellowing of the reaction mixture and retardation of the reaction kinetics to a point where it is not practical. As will be appreciated, bismuth catalysts are preferred over tin catalysts due to known detrimental environmental effect of tin catalysts. To demonstrate the benefit of better catalyst selection, both DBTDL and Coscat 83 are used in inventive aspartate oligomer synthesis, as shown in the various Examples.

TABLE 2-continued

Adhesion promoter procedure advantages of Aspartic Silane

|  | Process Example 1 | Process Example 2 | Process Example 3 |
|---|---|---|---|
| KBM-903 |  |  | 1 |
| Observations | No gel Complete reaction | Significant yellowing; Incomplete reaction | White gel formed; unable to progress synthesis |

Process Example 1

For Process Example 1, the successful synthesis was carried out in Example 7: OE-05 using the aspartic silane precursor of Example 1.

Process Example 2

For Process Example 2, a mixture of HEA (6.4 g, 0.06 mol), KBM-803 (10.8 g, 0.06 mol), PPG 4000 (213.3 g, 0.06 mol), and BHT (0.15 g, 600 ppm) was placed in a four-necked flask (500 ml) and purged with dry air and stirred. TDI (19.1 g, 0.11 mol) was then added to the mixture and the resulting mixture was then stirred and heated to 60° C. for 2 to 4 hours. Then, Coscat 83 (0.25 g, 1000 ppm) was added. Upon the addition of Coscat 83, the reaction mixture turned bright yellow, rendering the oligomer useless for optical fiber coating development. While still under the purge of dry air, the reaction mixture was stirred at 60° C. for 3 hours resulting in 1.2 weight percent of isocyanate groups remaining. Traditionally this step would be complete after 1 to 2 hours. The reaction mixture was then reacted to 70° C. for 4 to 6 hours to push the reaction to completion. The reaction was stopped after 4 to 6 hours as the weight percent of isocyanate groups remaining plateaued at 0.1% for 2 hours, which is above the requirement of 0.05% for a complete reaction. The final product mixture with an average structure (PE2) as a viscous liquid. The structure (PE2) appears below:

(PE2)

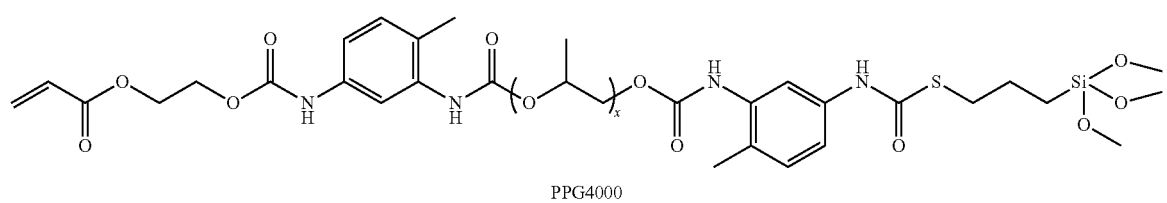

PPG4000

TABLE 2

Adhesion promoter procedure advantages of Aspartic Silane

|  | Process Example 1 | Process Example 2 | Process Example 3 |
|---|---|---|---|
| Adhesion Promoter | Aspartic Silane Precursor | Mercaptosilane | Aminosilane |
| Catalyst | Coscat 83 | Coscat 83 | Coscat 83 |
| HEA | 1 | 1 | 1 |
| TDI | 2 | 2 | 2 |
| PPG 4000 | 1 | 1 | 1 |
| Aspartic Silane Precursor | 1 | — | — |
| KBM-803 | — | 1 | — |

Process Example 3

For Process Example 3, a mixture of HEA (2.56 g, 0.02 mol), KBM-903 (3.95 g, 0.02 mol), PPG 4000 (85.64 g, 0.02 mol), and BHT (0.06 g, 600 ppm) was placed in a four-necked flask (500 ml) and purged with dry air and stirred. TDI (7.68 g, 0.04 mol) was then added to the mixture, however immediately upon adding the reaction mixture became opaque white with the formation of a gel on the walls of the flask. Gelling and insolubility prevented continuing the synthesis of the targeted oligomer (PE3) shown below:

(PE3)

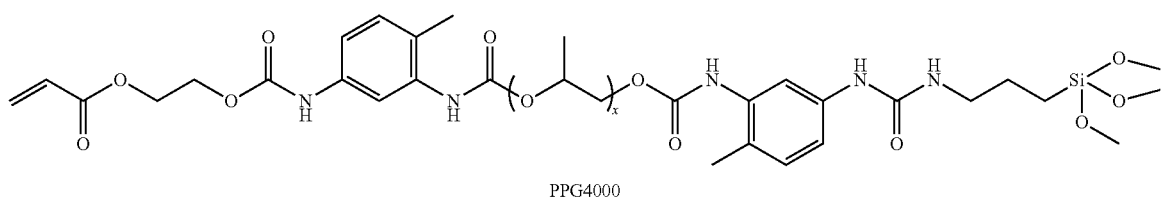

PPG4000

The synthesis of aspartic silane precursor are shown below together with all other materials including inventive aspartate oligomers prepared for this application.

Example 1: Synthesis of Aspartic Silane Precursor

KBM-903 (182 g, 1 mol) was placed in a four-necked flask (500 ml) and then cooled down to 0-5° C. using an ice bath under nitrogen before the addition of Diethyl maleate (175 g, 1 mol) dropwise. The resulting mixture was then stirred at 0-10° C. for 0.5 to 3 hours to yield the final product mixture comprising a compound of structure (A). The product was then available to be used in subsequent synthesis without further purification. The structure (A) appears below:

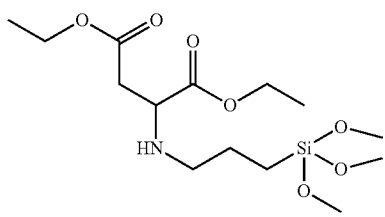

(A)

Example 2: Synthesis of NH-IPDA (Polyaspartic Precursor)

IPDA (738 g, 4.3 mol) was added to a four-necked flask (5000 mL), purged with dry air, and cooled to 10° C. using an ice bath. Diethyl maleate (1500 g, 8.7 mol) was then added dropwise, keeping the mixture below 15° C. Upon addition the mixture was stirred for 4 hours and allowed to warm up to 20-25° C. to yield the final product mixture comprising a compound of structure (B) as a viscous liquid. The product was then available to be used in subsequent formulation without further purification. The structure (B) appears below:

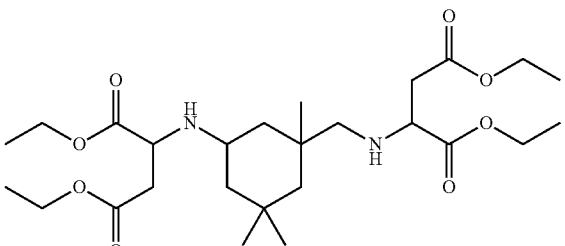

(B)

Example 3: Synthesis of Oligomer OE-01

To create Oligomer OE-01, a mixture of PPG 4000 (3474 g, 0.9 mol), TDI (313 g, 1.8 mol), and BHT (4 g, 1000 ppm) was placed in a four-necked flask (5000 ml) and purged with dry air. The resulting mixture was then stirred at 20-25° C. for 15 mins before the addition of DBTDL (1.6 g, 400 ppm). The resulting mixture was then stirred without external heat for 15 minutes, then stirred at 60° C. for 1-2 hours. HEA (208 g, 1.8 mol) was then added to the reaction mixture. While still under the purge of dry air, the reaction mixture was stirred at 85° C. for another 1 to 2 hours to yield the final product mixture comprising a compound of structure (C) as a viscous liquid. The product was then available to be used in subsequent formulation without further purification. The structure (C) is shown below:

(C)

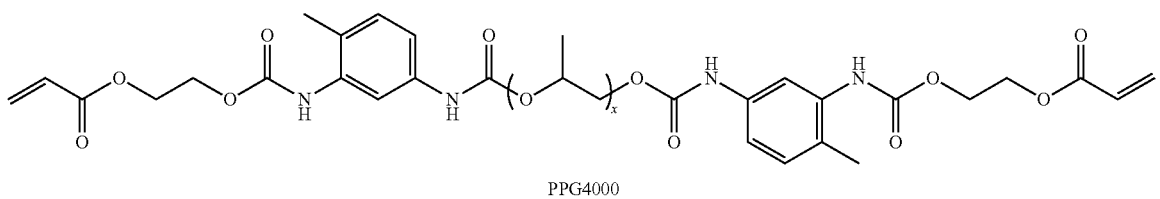

PPG4000

Example 4: Synthesis of Oligomer OE-02

To create Oligomer OE-02, a mixture of PPG 4000 (74.3 kg, 19.1 mol), HEA (2.2 kg, 19.1 mol), BHT (80 g, 1000 ppm), acrylic acid (40 g, 0.56 mol), TDI (3.3 kg, 19.1 mol), and DBTDL (64 g, 800 ppm) were added sequentially to a batch reactor (180 L). The resulting mixture was then stirred at 70° C. for 2 to 4 hours to yield the final product mixture comprising a compound having the structure (D) as a viscous liquid. The product was then available to be used in subsequent formulation without further purification. The structure (D) is shown below:

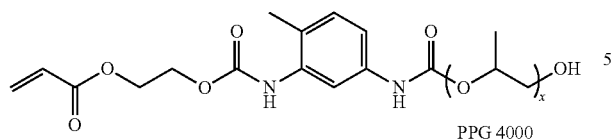

(D)

Example 5: Synthesis of Oligomer OE-03

To create Oligomer OE-03, a mixture of TDI (7.55 g, 0.04 mol) and BHT (0.1 g, 1000 ppm) was placed in a four-necked flask (250 ml) and then purged with a gaseous mixture consisting of air and nitrogen in a 3:1 ratio by volume. The resulting mixture was then stirred at 20-25° C. for 10 mins before the addition of mixture of DBTDL (0.03 g, 300 ppm) and HEMA (5.63 g, 0.04 mol). The resulting mixture was then stirred at 60° C. for 1 to 2 hours. Then, DBTDL (0.03 g, 300 ppm) was added. While still under the purge of the 3:1 air/nitrogen mixture, the reaction mixture was further stirred at 85° C. for another 2 to 14 hours to yield the final product mixture with an average structure (E) as viscous liquid. The product was then available to be used in subsequent formulation without further purification. The structure (D) appears below:

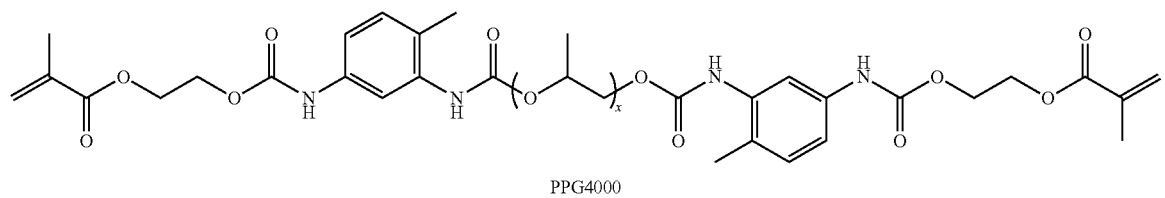

(D)

Example 6: Synthesis of Oligomer OE-04

To create Oligomer OE-04, a mixture of TDI (7.59 g, 0.04 mol) and BHT (0.10 g, 1000 ppm) was placed in a four-necked flask (250 ml) and then purged with a gaseous mixture consisting of air and nitrogen in a 3:1 ratio by volume. The resulting mixture was then stirred at 20-25° C. for 10 mins before the addition of mixture of DBTDL (0.03 g, 300 ppm) and PPG 4000 (87.2 g, 0.02 mol). The resulting mixture was then stirred at 60° C. for 1 hour. Then, DBTDL (0.03 g, 300 ppm) and BVE (5.06 g, 0.04 mol) were each added sequentially. While still under the purge of the 3:1 air/nitrogen mixture, the reaction mixture was further stirred at 85° C. for another 1 hour to yield the final product mixture with an average structure (E) as viscous liquid. The product was then available to be used in subsequent formulation without further purification. The structure (E) appears below:

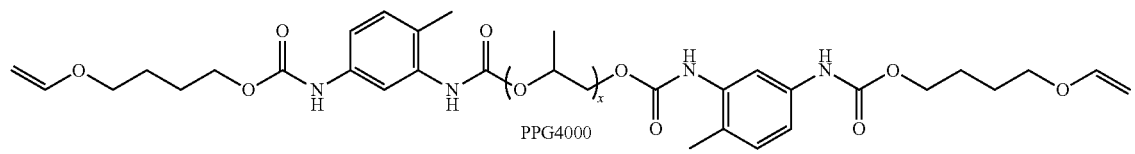

(E)

Example 7: Synthesis of Oligomer OE-05

To create Oligomer OE-05, a mixture of TDI (7.22 g, 0.04 mol) and BHT (0.10 g, 1000 ppm) was placed in a four-necked flask (250 ml) and then purged with a gaseous mixture consisting of air and nitrogen in a 3:1 ratio by volume. The resulting mixture was then stirred at 20-25° C. for 10 mins before the addition of mixture of DBTDL (0.03 g, 300 ppm), HEA (2.40 g, 0.02 mol) and the aspartic silane precursor of Example 1 (7.28 g, 0.02 mol). The resulting mixture was then stirred at 60° C. for 1 to 2 hours. Then, DBTDL (0.03 g, 300 ppm) and PPG 4000 (82.9 g, 0.02 mol) were added sequentially. While still under the purge of the 3:1 air/nitrogen mixture, the reaction mixture was further stirred at 85° C. for another 2 hours to yield the final product mixture with an average structure (F) as a viscous liquid. The product was then available to be used in subsequent formulation without further purification. The structure (F) appears below:

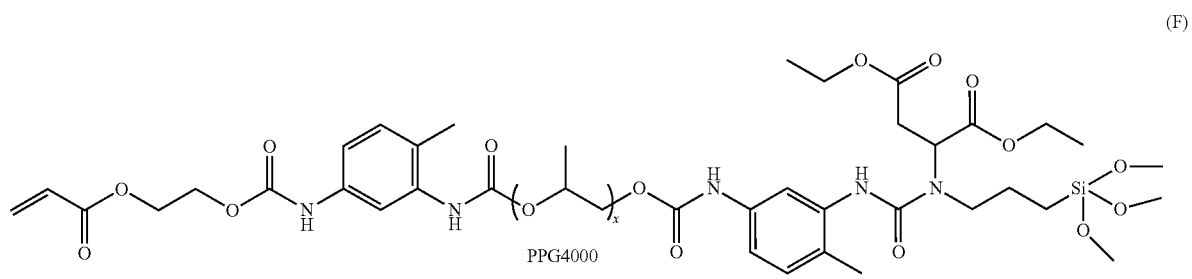

(F)

Oligomer OE-05 had a Mn of 4277 g/mol, a Mw of 9324 g/mol, a Mz of 15661 g/mol, and a polydispersity index (PDI) of 2.2, in which Mn, Mw and Mz were measured according to the procedure described in this specification.

Example 8: Synthesis of Oligomer OE-06

To create Oligomer OE-06, a mixture of IPDI (9.03 g, 0.04 mol) and BHT (0.10 g, 1000 ppm) was placed in a four-necked flask (250 ml) and then purged with a gaseous mixture consisting of air and nitrogen in a 3:1 ratio by volume. The resulting mixture was then stirred at 20-25° C. for 10 mins before the addition of mixture of DBTDL (0.03 g, 300 ppm), HEA (2.36 g, 0.02 mol) and the aspartic silane precursor of Example 1 (7.14 g, 0.02 mol). The resulting mixture was then stirred at 60° C. for 1 to 2 hours. Then, DBTDL (0.03 g, 300 ppm) and PPG 4000 (81.31 g, 0.02 mol) were added sequentially. While still under the purge of the 3:1 air/nitrogen mixture, the reaction mixture was further stirred at 85° C. for another 2 hours to yield the final product mixture with an average structure (G) as a viscous liquid. The product was then available to be used in subsequent formulation without further purification. The structure (G) appears below:

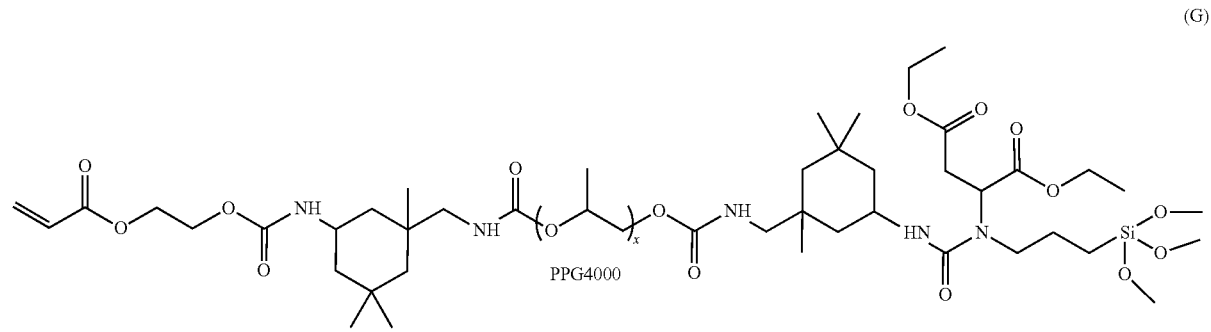

(G)

Example 9: Synthesis of Oligomer OE-07

To create Oligomer OE-07, a mixture of TDI (9.43 g, 0.05 mol) and BHT (0.10 g, 1000 ppm) was placed in a four-necked flask (250 ml) and then purged with a gaseous mixture consisting of air and nitrogen in a 3:1 ratio by volume. The resulting mixture was then stirred at 20-25° C. for 10 mins before the addition of mixture of DBTDL (0.03 g, 300 ppm), HEA (2.09 g, 0.02 mol), the aspartic silane precursor of Example 1 (6.34 g, 0.02 mol) and PPG 4000 (54.88 g, 0.01 mol). The resulting mixture was then stirred at 60° C. for 1 to 2 hours. Then, a mixture of DBTDL (0.03 g, 300 ppm), NH-1423LF (9.89 g, 0.02 mol) and PPG 4000 (23.52 g, 0.01 mol) was added dropwise. While still under the purge of the 3:1 air/nitrogen mixture, the reaction mixture was further stirred at 85° C. for another 2 hours to yield the final product mixture with an average structure (H) as a viscous liquid. The product was then available to be used in subsequent formulation without further purification. The structure (H) appears below:

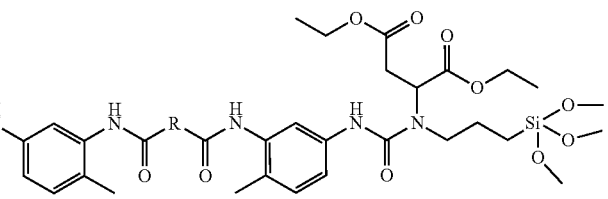

(H)

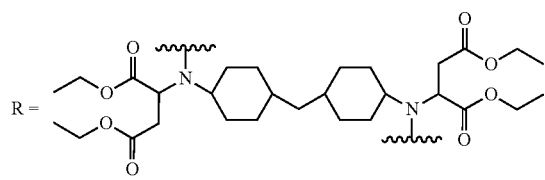

Oligomer OE-07 had a Mn of 3804 g/mol, a Mw of 14290 g/mol, a Mz of 26553 g/mol, and a polydispersity index (PDI) of 3.8, in which Mn, Mw and Mz were measured according to the procedure described in this specification.

Example 10: Synthesis of Oligomer OE-08

To create Oligomer OE-08, a mixture of TDI (48.7 g, 0.28 mol) and BHT (0.50 g, 1000 ppm) was placed in a four-necked flask (1000 ml) and then purged with dry air. The resulting mixture was then stirred at 20-25° C. for 10 mins before the addition of mixture of DBTDL (0.14 g, 300 ppm), HEA (10.8 g, 0.09 mol), the aspartic silane precursor of Example 1 (32.7 g, 0.09 mol) and PPG 4000 (252 g, 0.06 mol). The resulting mixture was then stirred at 60° C. for 2 hours. Then, a mixture of DBTDL (0.15 g, 300 ppm), NH-IPDA of Example 2 (46.6 g, 0.09 mol) and PPG 4000 (108 g, 0.03 mol) was added. While still under the purge of dry air, the reaction mixture was further stirred at 85° C. for another 10 hours to yield the final product mixture with an average structure (I) as a viscous liquid. The product was then available to be used in subsequent formulation without further purification. The structure (I) appears below:

(I)

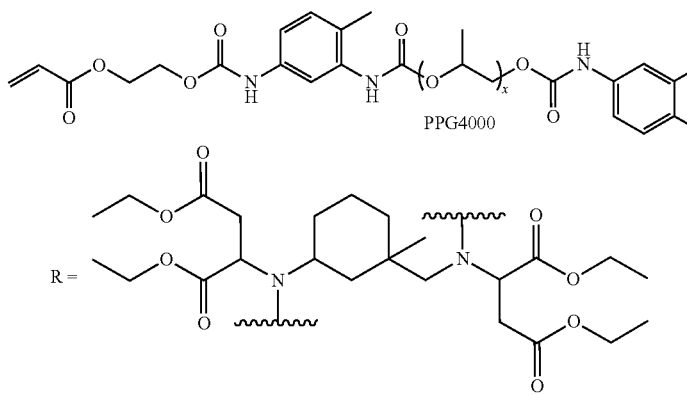

Example 11: Synthesis of Oligomer OE-09

To create Oligomer OE-09, a mixture of NH-IPDA of Example 2 (50.4 g, 0.10 mol) and BHT (0.50 g, 1000 ppm) was placed in a four-necked flask (1000 ml) and then purged with dry air. The resulting mixture was then stirred at 20-25° C. for 10 mins before the addition of TESPI (24.2 g, 0.10 mol) dropwise. After the addition, PPG 4000 (379.3 g, 0.10 mol) was added to the flask and the resulting mixture was stirred at 20-25° C. for 15 mins before the addition of TDI (34.1 g, 0.20 mol). The resulting mixture was stirred at 20-25° C. for 1 hour. Then Coscat 83 (0.20 g, 400 ppm) was added and the resulting mixture was stirred at 60° C. for 1-2 hours. Then HEA (11.4 g, 0.10 mol) was added and the mixture was further stirred at 60° C. for 1-2 hours to yield the final product mixture with an average structure (J) as a viscous liquid. The product was then available to be used in subsequent formulation without further purification. The structure (J) appears below:

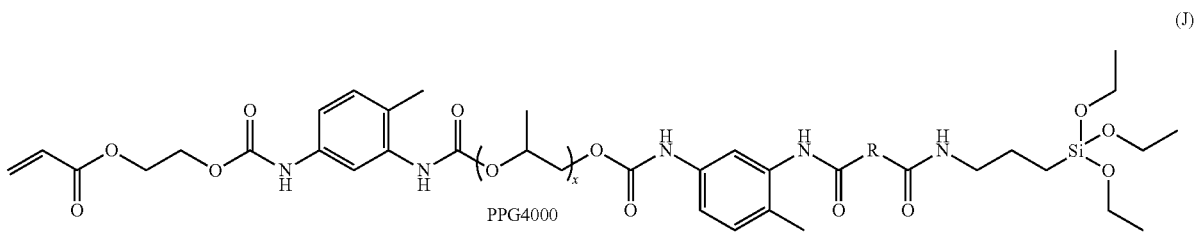

(J)

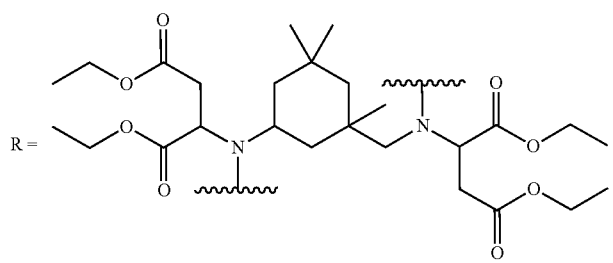

Example 12: Synthesis of Oligomer OE-10

To create Oligomer OE-10, Oligomer OE-05 (200 g) was placed in a four-necked flask (500 ml) and then purged with a gaseous mixture consisting of air and nitrogen in a 3:1 ratio by volume. The resulting mixture was then heated to 70-80° C. before the addition of acrylic acid (2 g, 1%). The resulting mixture was then stirred at 85° C. for 8 hours to yield the final product mixture with an average structure (K) as a viscous liquid. The product was then available to be used in subsequent formulation without further purification. The structure (K) appears below:

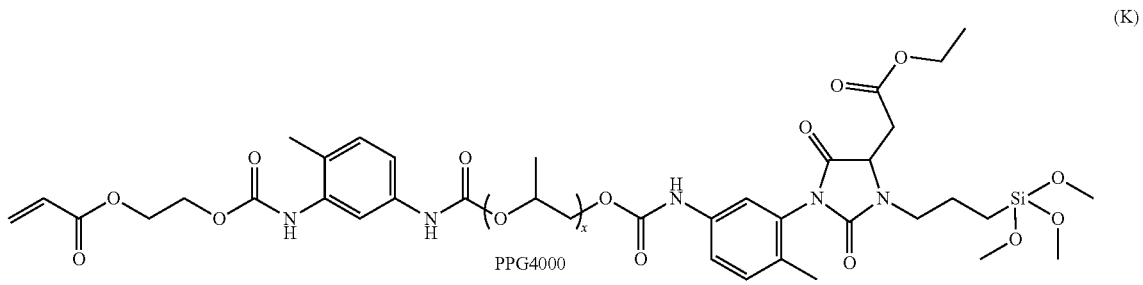

(K)

Example 13: Synthesis of Oligomer OE-11

To create Oligomer OE-11, Oligomer OE-06 (200 g) was placed in a four-necked flask (500 ml) and then purged with a gaseous mixture consisting of air and nitrogen in a 3:1 ratio by volume. The resulting mixture was then heated to 70-80° C. before the addition of acrylic acid (2 g, 1%). The resulting mixture was then stirred at 85° C. for 8 hours to yield the final product mixture with an average structure (L) as a viscous liquid. The product was then available to be used in subsequent formulation without further purification. The structure (L) appears below:

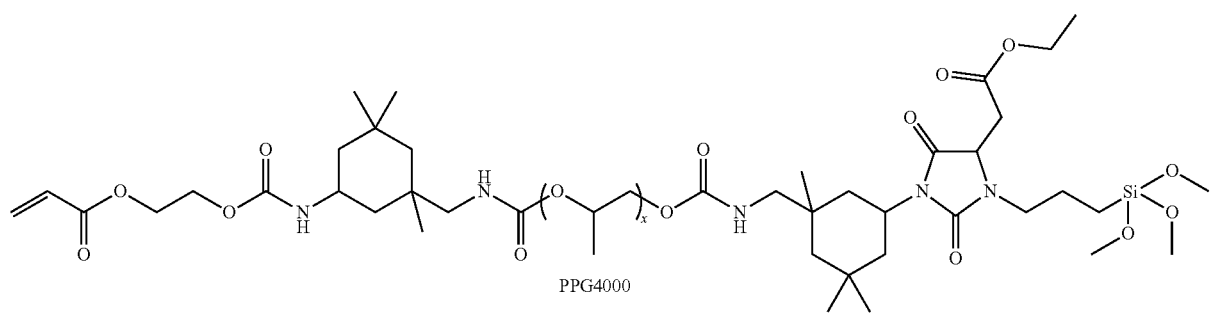

(L)

Example 14: Synthesis of Oligomer OE-12

To create Oligomer OE-12, Oligomer OE-07 (200 g) was placed in a four-necked flask (500 ml) and then purged with a gaseous mixture consisting of air and nitrogen in a 3:1 ratio by volume. The resulting mixture was then heated to 70-80° C. before the addition of acrylic acid (2 g, 1%). The resulting mixture was then stirred at 85° C. for 8 hours to yield the final product mixture with an average structure (M) as a viscous liquid. The product was then available to be used in subsequent formulation without further purification. The structure (M) appears below:

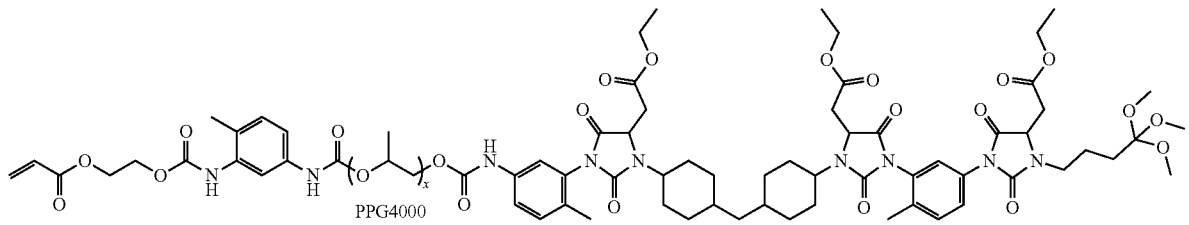

(M)

Example 15: Synthesis of Oligomer OE-13

To create Oligomer OE-13, Oligomer OE-09 (235 g) was placed in a four-necked flask (1000 ml) and then purged with dry air. The resulting mixture was then heated to 70-80° C. before the addition of acrylic acid (2.3 g, 1%). The resulting mixture was then stirred at 85° C. for 3 hours to yield the final product mixture with an average structure (N) as a viscous liquid. The product was then available to be used in subsequent formulation without further purification. The structure (N) appears below:

(N)

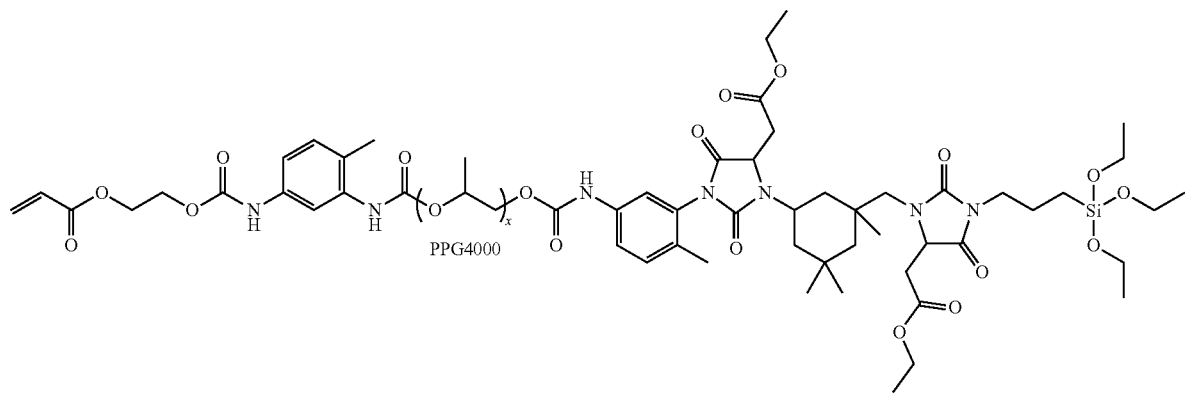

Example 16: Synthesis of Oligomer OE-14

To create Oligomer OE-14, a mixture of PPG 4000 (180.9 g, 0.04 mol), BHT (0.20 g, 1000 ppm), and HEA (7.50 g, 0.06 mol) were placed in a four-necked flask (1000 ml) and purged with dry air. The resulting mixture was then stirred at 20-25° C. for 15 mins. TDI (11.3 g, 0.06 mol) was then added and the resulting mixture was stirred at 60° C. for 6 to 8 hours. DBTDL (0.13 g, 640 ppm) was then added and the reaction mixture was further stirred at 60° C. for another 1 to 2 hours to yield the final product mixture (O) as a viscous liquid. The product was then available to be used in subsequent formulation without further purification. The product mixture (O) appears below:

(O)

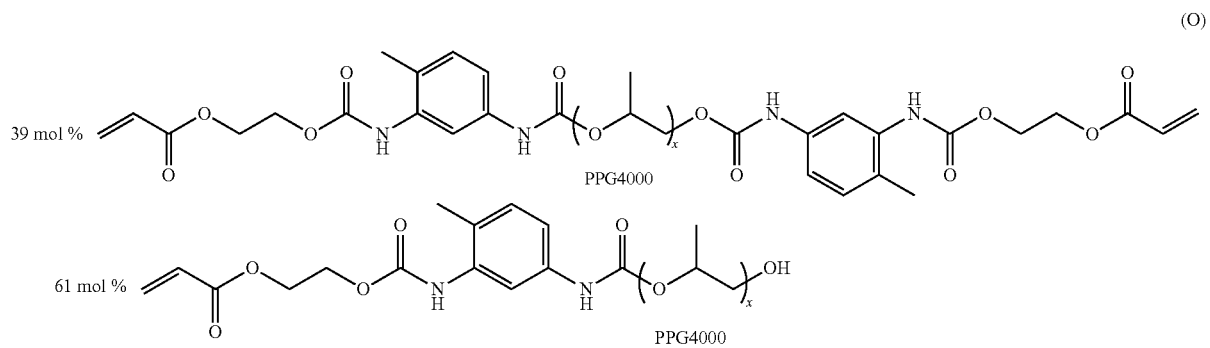

Example 17: Synthesis of Oligomer OE-15

To create Oligomer OE-15, a mixture of PPG 4000 (258.9 g, 0.06 mol), BHT (0.25 g, 840 ppm), HEA (10.9 g, 0.09 mol), and the aspartic silane precursor of Example 1 (8.96 g, 0.03 mol) was placed in a four-necked flask (1000 ml) and purged with dry air. The resulting mixture was then stirred at 20-25° C. for 15 mins. TDI (20.8 g, 0.12 mol) was then added and the resulting mixture was stirred at 60° C. for 4-6 hours. DBTDL (0.22 g, 720 ppm) was then added and the reaction mixture was further stirred at 60° C. for another 1 to 2 hours to yield the final product mixture (P) as a viscous liquid. The product was then available to be used in subsequent formulation without further purification. The product mixture (P) appears below:

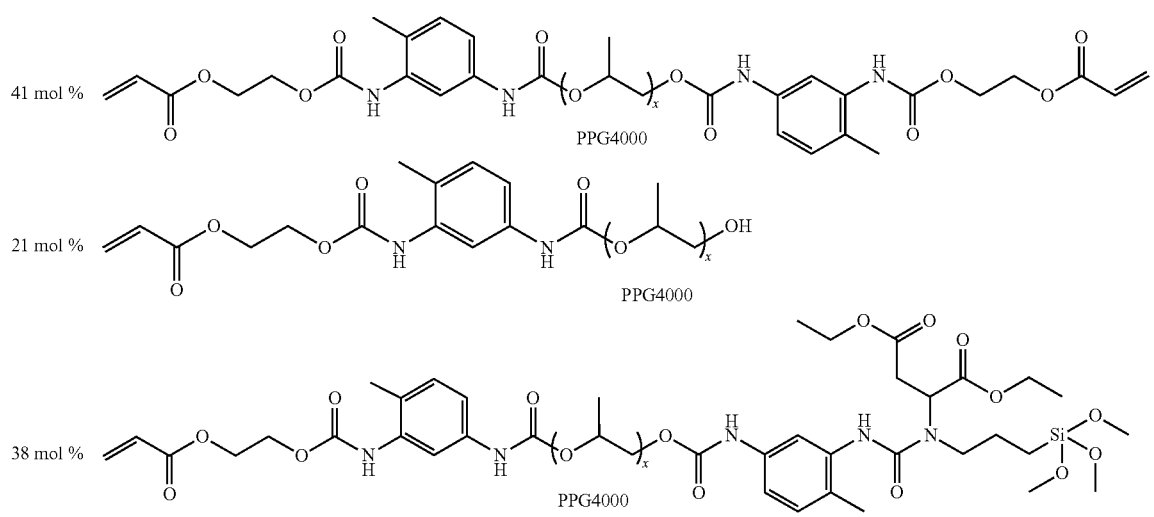

(P)

Example 18: Synthesis of Oligomer OE-16

To create Oligomer OE-16, a mixture of PPG 4000 (431.5 g, 0.11 mol), BHT (0.44 g, 400 ppm), HEA (19.8 g, 0.17 mol), and the aspartic silane precursor of Example 1 (11.6 g, 0.04 mol) was placed in a four-necked flask (1000 ml) and purged with dry air. The resulting mixture was then stirred at 20-25° C. for 15 mins. TDI (36.5 g, 0.21 mol) was then added and the resulting mixture was stirred at 60° C. for 4 to 8 hours. Coscat 83 (0.37 g, 100 ppm) was then added and the reaction mixture was further stirred at 60° C. for another 1-2 hours to yield the final product mixture (Q) as a viscous liquid. The product was then available to be used in subsequent formulation without further purification. The product mixture (Q) appears below:

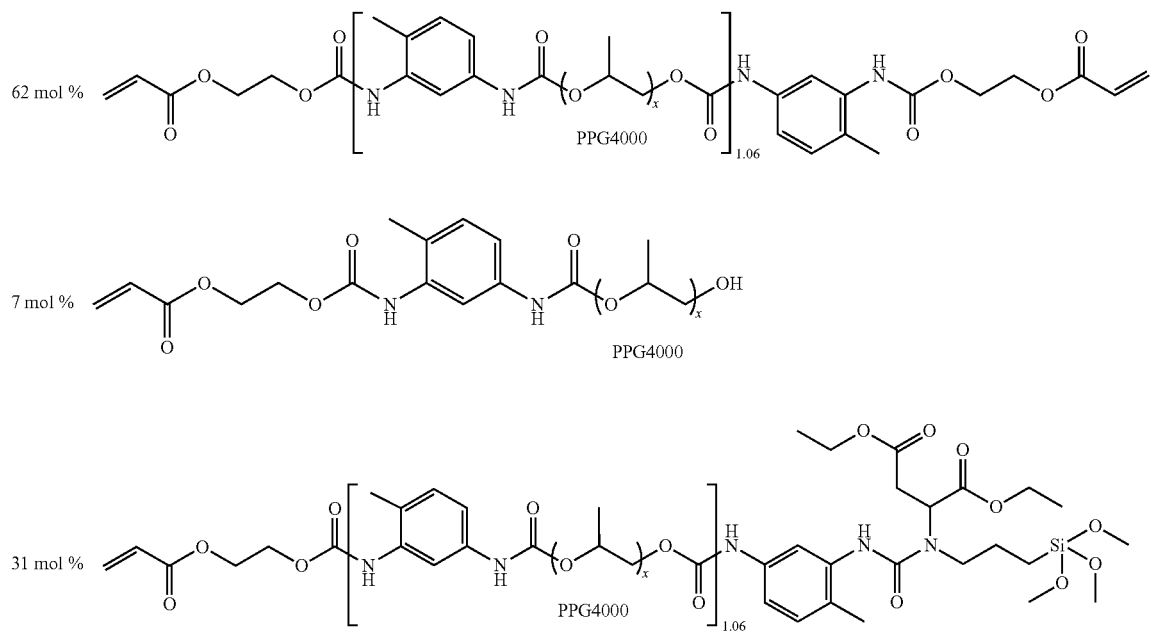

(Q)

Example 19: Synthesis of Oligomer OE-17

To create Oligomer OE-17, a mixture of PPG 4000 (437.0 g, 0.12 g), BHT (0.47 g, 400 ppm), HEA (16.9 g, 0.15 mol), and the aspartic silane precursor of Example 1 (12.5 g, 0.04 mol) was placed in a four-necked flask (1000 ml) and purged with dry air. The resulting mixture was then stirred at 20-25° C. for 15 mins. TDI (32.9 g, 0.19 mol) was then added and the resulting mixture was stirred at 60° C. for 4 to 8 hours. Coscat 83 (0.40 g, 100 ppm) was then added and the reaction mixture was further stirred at 60° C. for another 1 to 2 hours to yield the final product mixture (R) as a viscous liquid. The product was then available to be used in subsequent formulation without further purification. The product mixture (R) appears below:

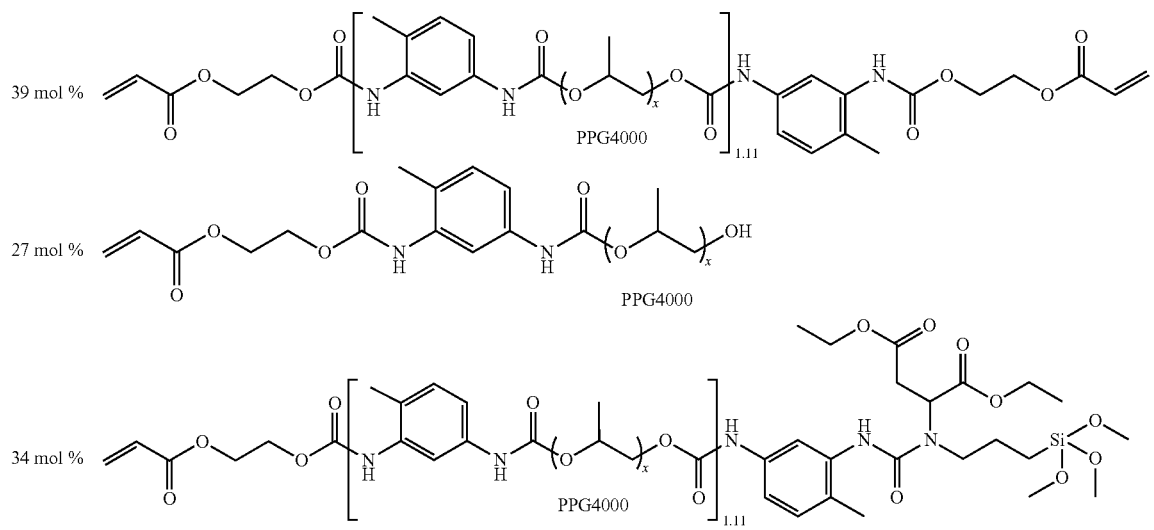

Oligomer OE-17 had a Mn of 11891 g/mol, a Mw of 17966 g/mol, a Mz of 26872 g/mol, and a polydispersity index (PDI) of 1.5 in which Mn, Mw and Mz were measured according to the procedure described in this specification.

Example 20: Synthesis of Oligomer OE-18

To create Oligomer OE-18, Oligomer OE-15 (185 g) was placed in a four-necked flask (1000 ml) and then purged with dry air. The resulting mixture was then heated to 70-80° C. before the addition of acrylic acid (1.8 g, 1%). The resulting mixture was then stirred at 85° C. for 3 hours to yield the final product mixture (S) as a viscous liquid. The product was then available to be used in subsequent formulation without further purification. The product mixture (S) appears below:

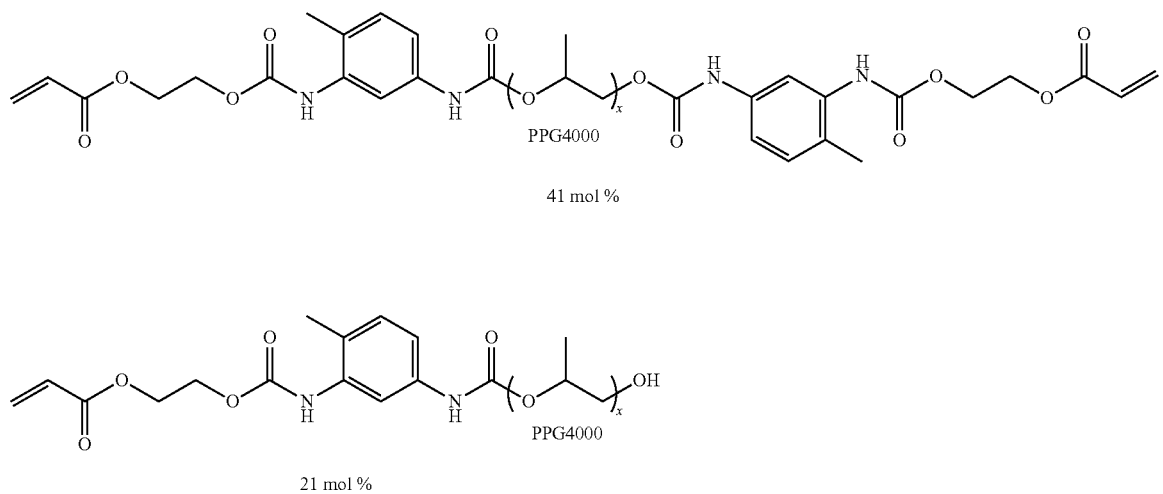

-continued

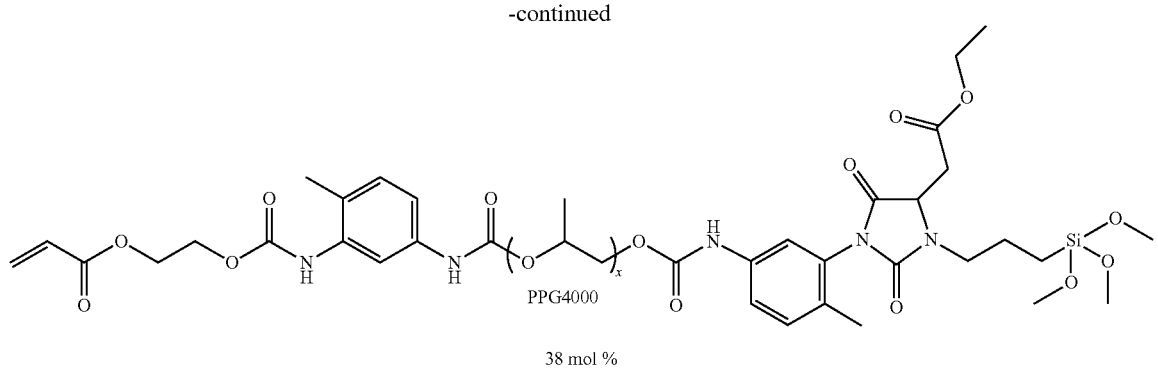

38 mol %

All compositions and test results are included in following Tables. Synthesized oligomers are presented as Oligomers OE-01 to OE-18. Formulated oligomer mixtures were obtained by mixing of multiple synthesized oligomers and are presented as oligomer mixtures OME-01 to OME-33. UV curable formulations that contain oligomers are presented in Formulation Examples FE-01 to FE-46.

Tables 3A and 3B show synthesized oligomer raw material compositions, and include non-aspartate-non-hydantoin urethane acrylate Oligomers OE-01 to OE-04, aspartate silane Oligomers OE-05 to OE-09, and hydantoin silane Oligomers OE-10 to OE-13. Table 3C shows one pot mixture oligomer synthesis raw material compositions, and non-aspartate urethane acrylate Oligomer OE-14, aspartate silane Oligomers OE-15 to OE-17, and hydantoin silane oligomer OE-18. Table 4A-4F show oligomer mixtures OME-1 to OME-33, which were formulated using the oligomers from Tables 3A, 3B and 3C. Tables 5A-5F show raw material compositions for oligomer mixtures OME-1 to OME-33 as a result of adding raw materials from each oligomer component used for making oligomer mixture OME-1 to OME-33. Tables 6A-6K show UV curable formulations FE-01 to FE-46, which were formulated using oligomer mixtures OME-01 to OME-33.

TABLE 3B

Oligomer OE-10 to OE-13 raw material compositions in equivalents

| Name/Moles | OE-10 | OE-11 | OE-12 | OE-13 |
|---|---|---|---|---|
| HEA | 1 | 1 | 1 | 1 |
| PPG 4000 | 1 | 1 | 1 | 1 |
| TDI | 2 | 0 | 3 | 2 |
| IPDI | 0 | 2 | 0 | — |
| NH-1423LF | 0 | 0 | 1 | — |
| NH-IPDA of Example 2 | — | — | — | 1 |
| Aspartic silane precursor of Example 1 | 1 | 1 | 1 | — |
| TESPI | — | — | — | 1 |

TABLE 3C

One-pot Oligomer OE-14 to OE-18 raw material compositions in equivalents

| Name/Moles | OE-14 | OE-15 | OE-16 | OE-17 | OE-18 |
|---|---|---|---|---|---|
| HEA | 2 | 2 | 2 | 2 | 2 |
| PPG 4000 | 1.44 | 1.42 | 1.30 | 1.55 | 1.42 |
| TDI | 2 | 2.54 | 2.45 | 2.60 | 2.54 |
| Aspartic silane precursor of Example 1 | — | 0.54 | 0.39 | 0.49 | 0.54 |

TABLE 3A

Oligomer OE-01 to OE-09 raw material compositions in equivalents

| Name | Moles | | | | | | | | |
|---|---|---|---|---|---|---|---|---|---|
| | OE-01 | OE-02 | OE-03 | OE-04 | OE-05 | OE-06 | OE-07 | OE-08 | OE-09 |
| HEA | 2 | 1 | — | — | 1 | 1 | 1 | 1 | 1 |
| HEMA | — | — | 2 | — | — | — | — | — | — |
| BVE | — | — | — | 2 | — | — | — | — | — |
| PPG 4000 | 1 | 1 | 1 | 1 | 1 | 1 | 1 | 1 | 1 |
| TDI | 2 | 1 | 2 | 2 | 2 | — | 3 | 3 | 2 |
| IPDI | — | — | — | — | — | 2 | — | — | — |
| NH-1423LF | — | — | — | — | — | — | 1 | — | — |
| NH-IPDA of Example 2 | — | — | — | — | — | — | — | 1 | 1 |
| Aspartic silane precursor of Example 1 | — | — | — | — | 1 | 1 | 1 | 1 | — |
| TESPI | — | — | — | — | — | — | — | — | 1 |

TABLE 4A

Oligomer mixtures OME-01 to OME-08 (amounts in weight %)

| | OME-01 | OME-02 | OME-03 | OME-04 | OME-05 | OME-06 | OME-07 | OME-08 |
|---|---|---|---|---|---|---|---|---|
| OE-01 | 40 | 40 | 40 | 40 | 100 | 75 | 50 | 25 |
| OE-02 | 60 | 40 | 20 | 0 | 0 | 0 | 0 | 0 |
| OE-05 | 0 | 20 | 40 | 60 | 0 | 25 | 50 | 75 |

TABLE 4B

Oligomer mixtures OME-09 to OME-15 (amounts in weight %)

| | OME-09 | OME-010 | OME-011 | OME-012 | OME-013 | OME-014 | OME-015 |
|---|---|---|---|---|---|---|---|
| OE-01 | 40 | 40 | 40 | 40 | 50 | 50 | 50 |
| OE-02 | 20 | 20 | 20 | 20 | — | — | — |
| OE-06 | 40 | — | — | — | 50 | — | — |
| OE-07 | — | 40 | — | — | — | 50 | — |
| OE-08 | — | — | 40 | — | — | — | 50 |
| OE-09 | — | — | — | 40 | — | — | — |

TABLE 4C

Oligomer mixtures OME-16 to OME-20 (amounts in weight %)

| | OME-16 | OME-17 | OME-18 | OME-19 | OME-20 |
|---|---|---|---|---|---|
| OE-14 | 100 | — | — | — | — |
| OE-15 | — | 100 | — | — | — |
| OE-16 | — | — | 100 | — | — |
| OE-17 | — | — | — | 100 | — |
| OE-18 | — | — | — | — | 100 |

TABLE 4D

Oligomer mixtures OME-21 to OME-24 (amounts in weight %)

| | OME-21 | OME-22 | OME-23 | OME-24 |
|---|---|---|---|---|
| OE-02 | 60 | 20 | 60 | 20 |
| OE-03 | 40 | 40 | — | — |
| OE-04 | — | — | 40 | 40 |
| OE-05 | — | 40 | — | 40 |

TABLE 4E

Oligomer mixtures OME-25 to OME-31 (amounts in weight %)

| | OME-25 | OME-26 | OME-27 | OME-28 | OME-29 | OME-30 | OME-31 |
|---|---|---|---|---|---|---|---|
| OE-01 | 40 | 40 | 40 | 40 | 50 | 50 | 50 |
| OE-02 | 20 | 20 | 20 | 20 | — | — | — |
| OE-10 | 40 | — | — | — | 50 | — | — |
| OE-11 | — | 40 | — | — | — | 50 | — |
| OE-12 | — | — | 40 | — | — | — | 50 |
| OE-13 | — | — | — | 40 | — | — | — |

TABLE 4F

Oligomer mixtures OME-32 to OME-33

(amounts in weight %)

| | OME-32 | OME-33 |
|---|---|---|
| OE-02 | 20 | 20 |
| OE-03 | 40 | — |
| OE-04 | — | 40 |
| OE-10 | 40 | 40 |

TABLE 5A

Oligomer mixtures OME-01 to OME-08 raw material compositions in equivalents

| | OME-01 | OME-02 | OME-03 | OME-04 | OME-05 | OME-06 | OME-07 | OME-08 |
|---|---|---|---|---|---|---|---|---|
| HEA | 2 | 2 | 2 | 2 | 2 | 2 | 2 | 2 |
| PPG 4000 | 1.44 | 1.43 | 1.42 | 1.41 | 1 | 1.13 | 1.32 | 1.59 |
| TDI | 2 | 2.27 | 2.54 | 2.83 | 2 | 2.27 | 2.64 | 3.17 |
| Aspartic silane precursor of Example 1 | 0 | 0.27 | 0.54 | 0.83 | 0 | 0.27 | 0.64 | 1.17 |

TABLE 5B

Oligomer mixtures OME-09 to OME-15 raw material compositions in equivalents

| | OME-09 | OME-10 | OME-11 | OME-12 | OME-13 | OME-14 | OME-15 |
|---|---|---|---|---|---|---|---|
| HEA | 2 | 2 | 2 | 2 | 2 | 2 | 2 |
| PPG 4000 | 1.42 | 1.40 | 1.40 | 1.41 | 1.31 | 1.29 | 1.29 |
| NH-1423LF | — | 0.49 | — | — | — | 0.58 | — |

TABLE 5B-continued

Oligomer mixtures OME-09 to OME-15 raw material compositions in equivalents

|  | OME-09 | OME-10 | OME-11 | OME-12 | OME-13 | OME-14 | OME-15 |
|---|---|---|---|---|---|---|---|
| NH-IPDA of Example 2 | — | — | 0.48 | 0.51 | — | — | 0.56 |
| TDI | 1.47 | 2.98 | 2.99 | 2.52 | 1.36 | 3.16 | 3.16 |
| IPDI | 1.07 | — | — | — | 1.27 | — | — |
| Aspartic silane precursor of Example 1 | 0.54 | 0.49 | 0.49 | — | 0.64 | 0.58 | 0.59 |
| TESPI | — | — | — | 0.51 | — | — | — |

TABLE 5C

Oligomer mixtures OME-16 to OME-20 raw material compositions in equivalents

|  | OE-16 | OE-17 | OE-18 | OE-19 | OE-20 |
|---|---|---|---|---|---|
| HEA | 2 | 2 | 2 | 2 | 2 |
| PPG 4000 | 1.44 | 1.42 | 1.30 | 1.55 | 1.42 |
| TDI | 2 | 2.54 | 2.45 | 2.60 | 2.54 |
| Aspartic silane precursor of Example 1 | 0 | 0.54 | 0.39 | 0.49 | 0.54 |

TABLE 5D

Oligomer mixture OME-21 to OME-24 raw material compositions in equivalents

|  | OME-21 | OME-22 | OME-23 | OME-24 |
|---|---|---|---|---|
| HEA | 0.89 | 0.86 | 0.89 | 0.85 |
| HEMA | 1.11 | 1.14 | | |
| BVE | | | 1.11 | 1.15 |
| PPG 4000 | 1.45 | 1.43 | 1.44 | 1.43 |
| TDI | 2 | 2.55 | 2 | 2.55 |
| Aspartic silane precursor of Example 1 | 0 | 0.55 | 0 | 0.55 |

TABLE 5E

Oligomer mixture OME-25 to OME-31 raw material compositions in equivalents

|  | OME-25 | OME-26 | OME-27 | OME-28 | OME-29 | OME-30 | OME-31 |
|---|---|---|---|---|---|---|---|
| HEA | 2 | 2 | 2 | 2 | 2 | 2 | 2 |
| PPG 4000 | 1.42 | 1.42 | 1.40 | 1.41 | 1.32 | 1.31 | 1.29 |
| NH-1423LF | — | — | 0.49 | — | — | — | 0.58 |
| NH-IPDA of Example 2 | — | — | — | 0.51 | — | — | — |
| TDI | 2.54 | 1.47 | 2.97 | 2.52 | 2.64 | 1.36 | 3.15 |
| IPDI | — | 1.07 | — | — | — | 1.27 | — |
| Aspartic silane precursor of Example 1 | 0.54 | 0.53 | 0.49 | — | 0.64 | 0.63 | 0.58 |
| TESPI | — | — | — | 0.51 | — | — | — |

TABLE 5F

Oligomer mixture OME-32 to OME-33 raw material compositions in equivalents

|  | OME-32 | OME-33 |
|---|---|---|
| HEA | 0.85 | 0.85 |
| HEMA | 1.15 | — |
| BVE | — | 1.15 |
| PPG 4000 | 1.43 | 1.42 |
| TDI | 2.54 | 2.54 |
| Aspartic silane precursor of Example 1 | 0.54 | 0.54 |

Formulation Examples FE-01 to FE-46

Each of the formulations FE-01 to FE-46 described in Tables 6A-6K (amounts are in parts by weight unless otherwise indicated) was prepared by mixing a 100 g sample in a 100 ml mixing cup suitable for use with a Speed-Mixer™. Specifically, the oligomer and monomer components, not including the inventive ethylenically unsaturated compound, were mixed in addition to the other components as specified in Tables 6A-6K below. Upon addition to the cup, the cup was closed and mixed in a SpeedMixer™ DAC150FVZ at 3000 RPM for 3 minutes. After this, the mixing operation was stopped, and the resulting mixture was transferred to a suitable receptacle and then heated to 60° C. in an oven and maintained at this temperature for about 6 hours to ensure complete dissolution of all components. The sample was then removed from the oven and mixed again for three additional minutes in the SpeedMixer again via the same method, after which the inventive ethylenically unsaturated compound was added, resulting in 100 g total. Finally, the mixture was mixed again for an additional 3 minutes in the SpeedMixer again via the same method.

These formulations were next characterized according to their respective total silane content and total urea+urethane content per the methodology described below. Then, all formulations were tested according to the methods described below to determine their peel strength, elongation percentage, film modulus, toughness, tensile strength, and viscosity. Unless otherwise shown, values for total silane content are rounded to one decimal place and values for the urea+ urethane content are rounded to the nearest whole number. Film modulus, toughness, and tensile strength values, meanwhile, have been rounded to two decimal places. Viscosity is presented to the nearest one centipoise unit. Finally, elongation percentage values are presented as rounded to the nearest 1%. Values for each of these measured characteristics are reported in Tables 6A-6K below.

The "Total Silane" for a given composition was determined by first calculating the amount of moles of silane groups (in which "silane groups" refers to groups of the structure $Si(X)_3$, in which X represents an alkoxy group or an organic group that is inert towards isocyanate groups at temperatures of 100° C. or less, with the proviso that at least one X represents an alkoxy group) in each silane containing component (Y) in accordance with the following expression:

$$Y = \frac{N*Wt}{MW}*1000$$

where Wt=the amount by weight of the respective component Y relative to 100 g of the total associated composition; N=the number of silane groups present in one molecule of component Y; and MW is the theoretical molecular mass of component Y (in g/mol). The total silane content is reported in units of mmol/100 g. The theoretical molecular mass values for the reactants used in creating the compounds and oligomers (including the silane containing compounds and oligomers) of the formulations herein are reported in Tables 6A-6K.

Then, the value for total silane for the entire composition was calculated by adding up the values of moles of silane groups for each silane-containing component according to the following expression:

$$\sum_{i=1}^{n} Y_i = Y_1 + Y_2 + Y_3 + \ldots + Y_n$$

The values for total silane herein are reported in units of mmol/100 g. The values for total silane may be optionally expresses in units of mol/100 g by dividing the summed value by 1000, although unless specifically noted, the values herein are not reported in this fashion. F or clarity, where "equivalents" or "milliequivalents" is specified herein, unless otherwise noted, the value is to be interpreted in reference to 100 g of the composition with which it is associated. Total silane values for each formulation are presented in Table 6A-6K below.

It should be noted that if the complete recipe of a composition is not known ex ante, the equivalents of silane moieties may be determined analytically via any suitable method as will be appreciated by the skilled artisan to which this invention applies, such as via size exclusion chromatography (SEC), infrared spectroscopy, HPLC, MALDI-TOF mass spectrometry, or nuclear magnetic resonance (NMR) methods.

Values for the urea+urethane content were determined via the same method as that prescribed for "Total Silane" above, except for the fact that instead of assessing silane groups or silane containing components, total isocyanate groups were counted.

Viscosity was measured using Anton Paar Rheolab QC. The instrument was set up for the Z3 and Z4 system, both of which were used. Samples for using the Z3 system were weighed out in the amount of 14.7 g±0.2 g and loaded into a disposable aluminum cup, while those for the Z4 system had a mass of 3.5 g±0.2 g. The sample in the cup was examined and if upon visual inspection it was determined to contain bubbles, the sample and cup were either subjected to centrifugation or allowed to sit long enough so that the bubbles would escape from the bulk of the liquid. Bubbles appearing at the top surface of the liquid were considered to be acceptable. Next, the bob was gently loaded into the liquid in the measuring cup, after which the cup and bob were installed in the instrument. Viscosities were run at 25° C.±0.1° C. and 55° C.±0.1° C. with a five-minute equilibration period to ensure the temperature was constant and at a shear rate of 50 sec$^{-1}$. Ten readings at each temperature were recorded and the reported results represent the average viscosity values often different readings. The values were recorded as expressed in millipascal seconds (mPa s) and a shear rate of 50 s$^{-1}$ unless otherwise specified.

To create films such that various physical properties could be tested, each sample was cured under a constant flow of nitrogen gas with a 1 J/cm$^2$ UV-dose of Conveyor Fusion Unit Model DRS-10/12 QN, 600 W UV-lamp system having as lamps 1600M radiator (600 W/inch which equals 240 W/cm, and thus, in total 600 W) fitted with R500 reflector, one with a H bulb and one with a D bulb UV lamp, of which the D-bulb was used to cure the samples. The UV-dose was then measured with an International Light IL390 radiometer. Then, individual test strips having a width of approximately 1.27 cm (0.5 inches±$\frac{1}{32}$") and a length of approximately 12.7 cm (5 inches±$\frac{1}{8}$") were then cut from the film. The exact thickness of each specimen was measured with a calibrated micrometer.

The method for determining film modulus as used herein is adapted from EP2089333B1, paragraphs [0132]-[0133] and [0135]. The tensile properties (tensile strength, percent elongation at break, and segment modulus) were determined with an MTS Criterion™ Model 43.104 with respect to test strips of a cured film of each sample having a 3-mil thickness as prepared per the "Film Sample Preparation" procedure described above. Due to these relatively soft coatings (e.g., those with a modulus of less than about 10 MPa), the coating was drawn down and cured on a glass plate and the individual specimens cut from the glass plate with a scalpel after applying a thin layer of talc. A 0.9 kg (2-lb) load cell was used in an Instron 4442 Tensile Tester, and the modulus was calculated at 2.5% elongation with a least-squares fit of the stress-strain plot. Cured films were conditioned at 23.0° C.±0.1° C. and 50.0%±0.5% relative humidity for 16 to 24 hours prior to testing. For testing specimens, the gage length was 5.1 cm (2-inches), and the crosshead speed was 25.4 mm/min. All testing was performed at a temperature of 23.0° C.±0.1° C. and a relative humidity of 50.0%±0.5%. All measurements were determined from the average of at least six test specimens. Values for tensile strength were determined as the highest stress born by the sample before break. Values for toughness were determined as the total area under the stress-strain curve.

Adhesive properties were determined with an Instron Tensile Tester Model 4442 using test strips of a cured film of each sample having a 3-mil thickness as prepared per the "Film Sample Preparation" procedure described above.

Cured films were then conditioned for a minimum of 7 days at 23.0° C.±2.0° C. and 50%±5% RH. When peel strength results were too high and untestable after 7 days, new samples were prepared and conditioned for 24 hours at 23.0° C.±2.0° C. and 50%±5% RH. Test samples were then cut using a scalpel and 1.00" wide steel bar, placing a 6" cut on either side of the bar with a ¼" gap between cut specimens. To minimize the effects of minor sample defects, sample specimens are cut parallel to the direction in which the drawdown of the cured film was prepared. A thin layer of talc was applied using a cotton-tipped applicator to the first and third strips on each drawdown to reduce blocking during the adhesion test. The Instron Tensile Tester Model 4442 was setup with a 2lb load cell, 20 psi pneumatic grips, and 10.00"/min crosshead speed for testing. A clip attached to braided nylon string was run through a pulley with the nylon string clamped into the upper jaw of the Instron testing instrument. The first strip was peeled back from the glass plate about one inch and place horizontally on the table with the peeled-back end of the specimen facing away from the pulley. The binder clip was attached to the peeled-back end of the specimen and allowed to lay flat on the sample. The plate was pulled to put tension on the braided nylon string until the load on the Instron reads positive, at which point the software method was started and continued until the average force value became relatively constant. The test is terminated by clicking on the stop button in the software or loosening the tension on the string. Reported peel strength values are the average of the plateau force for eight samples run.

As can be seen, compositions according to various aspects of the present invention tend to possess properties which would make them especially suitable for use in optical fiber coating applications, and in particular as primary coatings for adhering to optical fibers given their desirable peel strength, viscosity, tensile strength, elongation, modulus, and toughness.

In many of the formulations studied and compared in formulation examples, inventive oligomers were used to replace oligomers being compared with. The oligomers being replaced comprised multifunctional acrylates and monofunctional acrylates. In all examples adhesion improvement was the property of interest in this application as observed in surprisingly high level of peel strength. However, other property changes due to formulation changes, such as mechanical property change would be different depending on which oligomers and how much are replaced.

Specifically, Table 6A shows a ladder study where oligomer OE-02 of OME-01 was replaced with inventive oligomer OE-05 sequentially at wt % levels of 0, 15, 30 and 45 in the formulation. With increasing oligomer OE-05 and subsequently increasing silane content at sequential levels of 0, 3.2, 6.4 and 9.6 mmol/100 g, the peel strength was seen to increase significantly up to a surprisingly high level of 4.6 times in the ladder range being studied. Both OE-02 and OE-05 are acrylate monofunctional oligomers. Such oligomer replacement didn't change much of the mechanical properties of the coating.

TABLE 6A

Ladder study replacing OE-02 of OME-01 with Oligomer OE-05

| Formulation | FE-01* | FE-02 | FE-03 | FE-04 |
|---|---|---|---|---|
| OME-01 | 75 | — | — | — |
| OME-02 | — | 75 | — | — |
| OME-03 | — | — | 75 | — |

TABLE 6A-continued

Ladder study replacing OE-02 of OME-01 with Oligomer OE-05

| Formulation | FE-01* | FE-02 | FE-03 | FE-04 |
|---|---|---|---|---|
| OME-04 | — | — | — | 75 |
| PEA | 22.5 | 22.5 | 22.5 | 22.5 |
| ANTIOXIDANT 1520 | 0.5 | 0.5 | 0.5 | 0.5 |
| TPO | 2 | 2 | 2 | 2 |
| Formulation Total (%) | 100 | 100 | 100 | 100 |
| OE-05 (wt % in formulation) | 0 | 15 | 30 | 45 |
| OE-02 (wt % after replaced by OE-05) | 45 | 30 | 15 | 0 |
| Silane] (mmol/100 g formulation) | 0 | 3.2 | 6.4 | 9.6 |
| [Urea + urethane content] (mmol/100 g formulation) | 48 | 54 | 60 | 65 |
| Viscosity @ 25° C. (mPa * s) | 2363 | 2962 | 3421 | 3738 |
| Peel Strength (gf/in) | 25 | 88 | 92 | 116 |
| Elongation (at break) (%) | 90 | 83 | 102 | 89 |
| Film Modulus (Tensile) (MPa) | 0.76 | 0.77 | 0.84 | 0.88 |
| Toughness (N * mm/m3) | 0.22 | 0.19 | 0.29 | 0.23 |
| Tensile Strength (MPa) | 0.42 | 0.39 | 0.50 | 0.44 |

*Formulation FE-01 is a comparative example.

Table 6B shows a ladder study where oligomer OE-01 of oligomer mixture OME-05 was replaced with oligomer OE-05 sequentially at wt % level of 0, 15, 30 and 45 in the formulation. OE-01 is a diacrylate functional oligomer and OE-05 is mono-acrylate functional. With increasing content of oligomer OE-05 and the resulting increasing silane content at sequential level of 0, 3.2, 6.4 and 9.6 mmol/100 g, the content of monofunctional acrylate also increased. The peel strength significantly increased to a surprising high level of up to 6.4 times in the studied ladder range. This oligomer replacement also resulted in more physical property changes than what was observed in the coatings of Table 6A, such as decreased modulus, increased elongation and decreased tensile strength. Such changes in properties often contain a mix of favored change in performance, in this case the modulus and elongation, and unfavored change, in this case the tensile strength, and can be used as tools for balancing product properties.

TABLE 6B

Ladder study replacing OE-01 of OME-05 with inventive oligomer OE-05

| Formulation | FE-05* | FE-06 | FE-07 | FE-08 |
|---|---|---|---|---|
| OME-05 | 60 | | | |
| OME-06 | | 60 | | |
| OME-07 | | | 60 | |
| OME-08 | | | | 60 |
| PEA | 37.5 | 37.5 | 37.5 | 37.5 |
| ANTIOXIDANT 1520 | 0.5 | 0.5 | 0.5 | 0.5 |
| TPO | 2 | 2 | 2 | 2 |
| Formulation Total (%) | 100 | 100 | 100 | 100 |
| OE-05 (wt % in formulation) | 0 | 15 | 30 | 45 |
| OE-01 (wt % after replaced by OE-05) | 60 | 45 | 30 | 15 |
| [Silane] (mmol/100 g formulation) | 0 | 3.2 | 6.4 | 9.6 |
| [Urea + urethane content] (mmol/100 g formulation) | 54 | 53 | 52 | 52 |
| Viscosity @, 25° C. (mPa * s) | 2136 | 1378 | 1294 | 1351 |
| Peel Strength (gf/in) | 41 | 143 | 205 | 262 |
| Elongation (at break) (%) | 66 | 105 | 119 | 137 |
| Film Modulus (Tensile) (MPa) | 1.97 | 1.37 | 0.87 | 0.48 |
| Toughness (N * mm/m3) | 0.30 | 0.47 | 0.38 | 0.26 |
| Tensile Strength (MPa) | 0.78 | 0.76 | 0.55 | 0.33 |

*Formulation FE-05 is a comparative example.

In addition to OE-05 from Table 6A and 6B, adhesion improvement was also demonstrated for a variety of inventive oligomers OE-06, 07, 08 and 09 as is shown in Table 6C, by replacing oligomer OE-02 with the respective inventive oligomer to maintain similar mechanical properties. Inventive oligomers synthesized with either TDI or IPDI, represented by formulations FE-03 and FE-09 respectively, both produced coatings exhibiting improved the peel strength over the control formulation FE-01. Different polyaspartics were also used in the synthesis of inventive oligomers with the aspartic silane precursor of Example 1, represented by formulations FE-10 and FE-11, both producing coatings exhibiting improved adhesion over the control FE-01. The aspartic moiety can also be placed on the inside of the urea linking the adhesion promoter as shown in formulation FE-12. Not only does FE-12 have the aspartic moiety on the inside of urea, it also contains ethoxysilane adhesion promoter rather than methoxysilane of the previous inventive oligomers. Even moving the aspartic moiety to the inside of the urea and using ethoxysilane, formulation FE-12 also produced a coating exhibiting a significant improvement in adhesion.

TABLE 6C

Inventive oligomer screening, replacing OE-02 of OME-01 control with OE-05, OE-06, OE-07, OE-08, OE-09

| Formulation | FE-01* | FE-03 | FE-09 | FE-10 | FE-11 | FE-12 |
|---|---|---|---|---|---|---|
| OME-01 | 75 | — | — | — | — | — |
| OME-03 | — | 75 | — | — | — | — |
| OME-09 | — | — | 75 | — | — | — |
| OME-10 | — | — | — | 75 | — | — |
| OME-11 | — | — | — | — | 75 | — |
| OME-12 | — | — | — | — | — | 75 |
| PEA | 22.5 | 22.5 | 22.5 | 22.5 | 22.5 | 22.5 |
| ANTIOXIDANT 1520 | 0.5 | 0.5 | 0.5 | 0.5 | 0.5 | 0.5 |
| TPO | 2 | 2 | 2 | 2 | 2 | 2 |
| Formulation Total (%) | 100 | 100 | 100 | 100 | 100 | 100 |
| Screened Oligomer | Control | OE-05 | OE-06 | OE-07 | OE-08 | OE-09 |
| OE-02 (wt % being replaced by screened oligomer) | 0 | 30 | 30 | 30 | 30 | 30 |
| OE-02 (wt % after replacement) | 45 | 15 | 15 | 15 | 15 | 15 |
| [Silane] (mmol/100 g formulation) | 0 | 6.4 | 6.3 | 5.5 | 5.6 | 5.9 |
| [Urea + urethane] (mmol/100 g formulation) | 48 | 60 | 59 | 67 | 68 | 58 |
| Viscosity @ 25° C. (mPa * s) | 2363 | 3421 | 4654 | 4867 | 5036 | 5330 |
| Peel Strength (gf/in) | 25 | 92 | 104 | 151 | 201 | 231 |
| Elongation (at break) (%) | 90 | 102 | 82 | 113 | 85 | 61 |
| Film Modulus (Tensile) (MPa) | 0.76 | 0.84 | 0.76 | 0.82 | 0.76 | 0.63 |
| Toughness (N * mm/m3) | 0.22 | 0.29 | 0.18 | 0.35 | 0.19 | 0.09 |
| Tensile Strength (MPa) | 0.42 | 0.50 | 0.38 | 0.54 | 0.38 | 0.25 |

*Formulation FE-01 is a comparative example.

Likewise, Table 6D shows screening of new inventive oligomers where oligomer OE-01 was replaced with the respective inventive oligomer. Similar to Table 6C, inventive oligomers synthesized using TDI or IPDI were investigated, formulations FE-07 and FE-13 respectively, and different polyaspartics, formulations FE-14 and FE-15 respectively. In all cases shown here the peel strength can be seen to significantly improve while significantly reducing the modulus compared to the control FE-05

TABLE 6D

Inventive oligomer screening, replacing oligomer OE-01 of OME-05 control with OE-05, OE-06, OE-07, OE-08

| Formulations | FE-05* | FE-07 | FE-13 | FE-14 | FE-15 |
|---|---|---|---|---|---|
| OME-05 | 60 | — | — | — | — |
| OME-07 | — | 60 | — | — | — |
| OME-13 | — | — | 60 | — | — |
| OME-14 | — | — | — | 60 | — |
| OME-15 | — | — | — | — | 60 |
| PEA | 37.5 | 37.5 | 37.5 | 37.5 | 37.5 |
| ANTIOXIDANT 1520 | 0.5 | 0.5 | 0.5 | 0.5 | 0.5 |
| TPO | 2 | 2 | 2 | 2 | 2 |
| Formulation Total (%) | 100 | 100 | 100 | 100 | 100 |
| Screened Oligomer | Control | OE-05 | OE-06 | OE-07 | OE-08 |
| OE-01 (wt % being replaced by screened oligomer) | 0 | 30 | 30 | 30 | 30 |
| OE-01 (wt % after replacement) | 60 | 30 | 30 | 30 | 30 |
| [Silane] (mmol/100 g formulation) | 0 | 6.4 | 6.3 | 5.5 | 5.6 |
| [All Urea + rethane] (mmol/100 g formulation) | 54 | 52 | 52 | 60 | 60 |
| Viscosity @ 25° C. (mPa * s) | 2136 | 1294 | 1849 | 1910 | 1980 |
| Peel Strength (gf/in) | 41 | 205 | 247 | 250 | 304 |
| Elongation (at break) (%) | 66 | 119 | 99 | 153 | 103 |
| Film Modulus (Tensile) (MPa) | 1.97 | 0.87 | 0.84 | 0.90 | 0.85 |
| Toughness (N * mm/m3) | 0.30 | 0.38 | 0.27 | 0.58 | 0.27 |
| Tensile Strength (MPa) | 0.78 | 0.55 | 0.46 | 0.68 | 0.44 |

*Formulation FE-05 is a comparative example.

In addition to preparing the oligomer mixtures and formulations containing the inventive oligomer by mixing individual oligomers, it is possible to synthesize the mixture of oligomers containing the inventive oligomer together in one-pot. Formulations containing a mixture of oligomers containing the inventive oligomer following a one-pot synthesis method are shown in Table 6E. Formulation FE-16 made via a one-pot synthesis method did not contain any aspartic silane precursor and can be compared to the control FE-01. Formulation FE-17 is the one-pot equivalent of formulation FE-03, with the one-pot synthesis FE-17 exhibiting greater peel strength than when the individual oligomers were mixed FE-03. Formulations FE-18 to FE-20 are also inventive oligomers synthesized via one-pot synthesis method demonstrating additional diluents that may be used. Converting the one-pot oligomer mixture OME-17 to the hydantoin form OME-20 in FE-21 further increased the peel strength compared to the non-hydantoin formulation FE-17, as well as outperforming the mixture of inventive hydantoin oligomers as well in FE-38. For the examples shown here, synthesizing the inventive oligomer in one-pot method not only increased the peel strength over the control without the inventive oligomer but also over the mixture of individual inventive oligomers. In all cases shown here, the one-pot oligomer mixture formulations improved adhesion relative to the control formulation FE-16.

TABLE 6E

Inventive oligomer formulations synthesized via one-pot synthesis method

| Formulation | FE-16* | FE-17 | FE-18 | FE-19 | FE-20 | FE-21 |
|---|---|---|---|---|---|---|
| OME-16 | 75 | — | — | — | — | — |
| OME-17 | — | 75 | — | — | — | — |
| OME-18 | — | — | 88.3 | — | — | — |
| OME-19 | — | — | — | 83.2 | 80.0 | — |
| OME-20 | — | — | — | — | — | 75 |
| PEA | 22.5 | 22.5 | 4.2 | 10.0 | 17.0 | 22.5 |
| TMPTA(3EO) | — | — | 4.7 | 4.6 | — | — |
| TMPTA | — | — | — | — | 2.0 | — |
| TETRAETHOXY SILANE | — | — | 0.50 | 0.50 | — | — |
| ANTIOXIDANT 1520 | 0.5 | 0.5 | 0.30 | 0.30 | 0.25 | 0.5 |
| Isooctyl 3-mercaptopropionate | — | — | 0.62 | — | — | — |
| TPO | 2.0 | 2.0 | 1.5 | 1.5 | 0.75 | 2.0 |
| Formulation Total (%) | 100 | 100 | 100 | 100 | 100 | 100 |
| [Silane] (mmol/100 g formulation) | 0 | 6.4 | 5.8 | 5.9 | 5.7 | 6.3 |
| [Urea + urethane] (mmol/100 g formulation) | 49 | 60 | 74 | 63 | 60 | 60 |
| Viscosity @, 25° C. (mPa * s) | 2553 | 5039 | 25171 | 15749 | 12300 | 5172 |
| Peel Strength (gf/in) | 33 | 134 | 118 | 325 | 243 | 185 |
| Elongation (at break) (%) | 104 | 98 | 87 | 77 | 87 | 82 |
| Film Modulus (Tensile) (MPa) | 0.29 | 0.46 | 1.08 | 0.99 | 1.0 | 0.47 |
| Toughness (N * mm/m3) | 0.11 | 0.14 | 0.26 | 0.21 | 0.26 | 0.11 |
| Tensile Strength (MPa) | 0.18 | 0.23 | 0.53 | 0.49 | 0.53 | 0.22 |

*Formulation FE-16 is a comparative example.

There are many reactive endgroups that could be used in the oligomer mixture synthesis, demonstrated in Table 6F where the endgroups were changed from HEA to HEMA and BVE in formulations FE-22 to FE-23 and FE-24 to FE-25 respectively. Despite the oligomer mixtures and formulations containing different reactive endgroups, the peel strength still increased with the addition of the inventive oligomer OE-05 from formulation FE-22 to FE-23 and formulation FE-24 to FE-25.

TABLE 6F

Formulations containing mixtures with different functionalities

| Formulation | FE-22* | FE-23 | FE-24* | FE-25 |
|---|---|---|---|---|
| OME-21 | 75 | — | — | — |
| OME-22 | — | 75 | — | — |
| OME-23 | — | — | 75 | — |
| OME-24 | — | — | — | 75 |
| PEA | 22.5 | 22.5 | 22.5 | 22.5 |
| ANTIOXIDANT 1520 | 0.5 | 0.5 | 0.5 | 0.5 |
| TPO | 2 | 2 | 2 | 2 |
| Formulation Total (%) | 100 | 100 | 100 | 100 |
| OE-05 (wt % in formulation) | 0 | 30 | 0 | 30 |
| OE-02 (wt % after replaced by OE-05) | 45 | 15 | 45 | 15 |
| [Silane] (mmol/100 g formulation) | 0 | 6.4 | 0 | 6.4 |
| [Urea + urethane] (mmol/100 g formulation) | 48 | 59 | 48 | 60 |
| Viscosity @, 25° C. (mPa * s) | 2110 | 3760 | 2370 | 4290 |
| Peel Strength (gf/in) | 29 | 125 | 69 | 165 |
| Elongation (at break) (%) | 90 | 109 | 72 | 77 |
| Film Modulus (Tensile) (MPa) | 0.49 | 0.58 | 0.37 | 0.53 |
| Toughness (N * mm/m3) | 0.15 | 0.23 | 0.07 | 0.11 |
| Tensile Strength (MPa) | 0.28 | 0.37 | 0.16 | 0.23 |

*Formulations FE-22 and FE-24 are comparative examples.

In addition, different diluents may be used in the formulations. Table 6G illustrates changes in the diluent from PEA to EOEOEA, ENPA, and IBOA. Formulations FE-26, FE-28, and FE-30 act as the EOEOEA, ENPA, and IBOA controls respectively without the inventive oligomer. With the replacement of oligomer OE-02 by oligomer OE-05 in formulations FE-27, FE-29, and FE-31, all formulations produced coatings with increased adhesion relative to their respective controls.

TABLE 6G

Different diluents in formulation, replacing oligomer OE-02 of OME-01 with inventive oligomer OE-05 in formulation

| Formulations | FE-26* | FE-27 | FE-28* | FE-29 | FE-30* | FE-31 |
|---|---|---|---|---|---|---|
| OME-01 | 75 | — | 75 | — | 75 | — |
| OME-03 | — | 75 | — | 75 | — | 75 |
| EOEOEA | 22.5 | 22.5 | — | — | — | — |
| ENPA | — | — | 22.5 | 22.5 | — | — |
| IBOA | — | — | — | — | 22.5 | 22.5 |
| ANTIOXIDANT 1520 | 0.5 | 0.5 | 0.5 | 0.5 | 0.5 | 0.5 |
| PHOTOINITIATOR TPO | 2 | 2 | 2 | 2 | 2 | 2 |
| Formulation Total (%) | 100 | 100 | 100 | 100 | 100 | 100 |
| OE-05 (wt % in formulation) | 0 | 30 | 0 | 30 | 0 | 30 |
| OE-02 (wt % after replaced by OE-05) | 45 | 15 | 45 | 15 | 45 | 15 |
| [Silane] (mmol/100 g formulation) | 0.0 | 6.4 | 0.0 | 6.4 | 0.0 | 6.4 |
| [Urea + urethane] (mmol/100 g formulation) | 48 | 60 | 48 | 60 | 48 | 60 |
| Viscosity @ 25° C. (mPa * s) | 1026 | 3691 | 4191 | 11371 | 2339 | 6955 |
| Peel Strength (gf/in) | 12 | 32 | 11 | 33 | 48 | 131 |
| Elongation (at break) (%) | 60 | 55 | 76 | 58 | 58 | 74 |
| Film Modulus (Tensile) (MPa) | 0.66 | 0.81 | 0.74 | 1.07 | 0.60 | 0.79 |
| Toughness (N * mm/m3) | 0.10 | 0.10 | 0.17 | 0.14 | 0.09 | 0.16 |
| Tensile Strength (MPa) | 0.28 | 0.30 | 0.39 | 0.41 | 0.25 | 0.37 |

*Formulations FE-26, FE-28, and FE-30 are comparative examples.

Table 6H illustrates the use of EOEOEA, ENPA, and IBOA instead of PEA similar to Table 6G, however oligomer OE-01 is replaced by inventive oligomer OE-05. In all cases shown here, the peel strength of coatings produced from formulations FE-33, FE-35, and FE-37 increased relative to the respective controls, formulations FE-32, FE-24, and FE-36 respectively.

TABLE 6H

Different diluents in formulation, replacing OE-01 with inventive oligomer OE-05

| Formulation | FE-32* | FE-33 | FE-34* | FE-35 | FE-36* | FE-37 |
|---|---|---|---|---|---|---|
| OME-05 | 60 | — | 60 | — | 60 | — |
| OME-07 | — | 60 | — | 60 | — | 60 |
| EOEOEA | 37.5 | 37.5 | — | — | — | — |
| ENPA | — | — | 37.5 | 37.5 | — | — |
| IBOA | — | — | — | — | 37.5 | 37.5 |
| ANTIOXIDANT 1520 | 0.5 | 0.5 | 0.5 | 0.5 | 0.5 | 0.5 |
| TPO | 2 | 2 | 2 | 2 | 2 | 2 |
| Formulation Total (%) | 100 | 100 | 100 | 100 | 100 | 100 |
| OE-05 (wt % in formulation) | 0 | 30 | 0 | 30 | 0 | 30 |
| OE-01 (wt % after replaced by OE-05) | 60 | 30 | 60 | 30 | 60 | 30 |
| [Silane] (mmol/100 g formulation) | 0 | 6.4 | 0 | 6.4 | 0 | 6.4 |
| [Urea + urethane] (mmol/100 g formulation) | 54 | 52 | 54 | 52 | 54 | 52 |
| Viscosity @, 25° C. (mPa * s) | 438 | 740 | 3756 | 6773 | 1520 | 3013 |
| Peel Strength (gf/in) | 6 | 37 | 7 | 31 | 309 | 552 |
| Elongation (at break) (%) | 50 | 70 | 54 | 52 | 115 | 158 |
| Film Modulus (Tensile) (MPa) | 1.60 | 0.74 | 1.82 | 0.96 | 1.74 | 0.93 |
| Toughness (N * mm/m3) | 0.16 | 0.14 | 0.21 | 0.10 | 0.66 | 0.61 |
| Tensile Strength (MPa) | 0.53 | 0.33 | 0.67 | 0.35 | 0.99 | 0.70 |

*Formulations FE-32, FE-34, and FE-36 are comparative examples.

Table 6I illustrates hydantoin inventive oligomer screening in which oligomer OE-02 was replaced with the respective inventive hydantoin oligomer to maintain similar mechanical properties. Inventive hydantoin oligomers synthesized either TDI or IPDI, represented by formulations FE-38 and FE-39 respectively, both produced coatings with improved peel strength relative to control FE-01. Inventive hydantoin oligomers with different polyaspartics, represented by formulations FE-40 and FE-41, both produced coatings with improved peel strength over the control FE-01. Formulation FE-41 represents an inventive hydantoin oligomer using an aspartic moiety on the inside of the urea to form the hydantoin and ethoxysilane adhesion promoter, which also produced a coating exhibiting increased adhesion.

TABLE 6I

Hydantoin inventive oligomer screening, replacing oligomer
OE-02 of OME-01 with OE-10, OE-11, OE-12, OE-13

| Formulation | FE-01* | FE-38 | FE-39 | FE-40 | FE-41 |
|---|---|---|---|---|---|
| OME-01 | 75 | — | — | — | — |
| OME-25 | — | 75 | — | — | — |
| OME-26 | — | — | 75 | — | — |
| OME-27 | — | — | — | 75 | — |
| OME-28 | — | — | — | — | 75 |
| PEA | 22.5 | 22.5 | 22.5 | 22.5 | 22.5 |
| ANTIOXIDANT 1520 | 0.5 | 0.5 | 0.5 | 0.5 | 0.5 |
| TPO (photoinitiator) | 2 | 2 | 2 | 2 | 2 |
| Formulation Total (%) | 100 | 100 | 100 | 100 | 100 |
| Screened Hydantoin Oligomer | Control | OE-10 | OE-11 | OE-12 | OE-13 |
| OE-02 (wt % being replaced by screened oligomer) | 0 | 30 | 30 | 30 | 30 |
| OE-02 (wt % after replacement) | 45 | 15 | 15 | 15 | 15 |
| [Silane] (mmol/100 g formulation) | 0 | 6.3 | 6.2 | 5.5 | 5.8 |
| [Urea + urethane] (mmol/100 g formulation) | 48 | 59 | 59 | 67 | 57 |
| Viscosity @, 25° C. (mPa * s) | | | | | |
| Peel Strength (gf/in) | 2363 | 4010 | 4944 | 4949 | 5040 |
| Elongation (at break) (%) | 25 | 104 | 152 | 154 | 194 |
| Film Modulus (Tensile) (MPa) | 90 | 77 | 76 | 115 | 63 |
| Toughness (N * mm/m3) | 0.76 | 0.91 | 0.89 | 0.82 | 0.64 |
| Tensile Strength (MPa) | 0.22 | 0.20 | 0.19 | 0.35 | 0.10 |
| Tensile Strength (MPa) | 0.42 | 0.43 | 0.42 | 0.54 | 0.26 |

*Formulation FE-01 is a comparative example.

Likewise, Table 6I shows screening of inventive hydantoin oligomers where oligomer OE-01 was replaced with the respective inventive hydantoin oligomer. Similar to Table 6I, inventive hydantoin oligomers synthesized using TDI or IPDI were investigated, formulations FE-42 and FE-43 respectively, and polyaspartic containing formulation FE-44. In all cases shown here the peel strength can be seen to significantly improve while significantly reducing the modulus compared to the control FE-05.

TABLE 6J

Hydantoin inventive oligomer screening, replacing oligomer
OE-01 of OME-05 with OE-10, OE-11, OE-12

| Formulation | FE-05* | FE-42 | FE-43 | FE-44 |
|---|---|---|---|---|
| OME-05 | 60 | — | — | — |
| OME-29 | — | 60 | — | — |
| OME-30 | — | — | 60 | — |
| OME-31 | — | — | — | 60 |
| PEA | 37.5 | 37.5 | 37.5 | 37.5 |
| ANTIOXIDANT 1520 | 0.5 | 0.5 | 0.5 | 0.5 |
| TPO (photoinitiator) | 2 | 2 | 2 | 2 |
| Formulation Total (%) | 100 | 100 | 100 | 100 |
| Screened Hydantoin Oligomer | Control | OE-10 | OE-11 | OE-12 |
| OE-01 (wt % being replaced by screened oligomer) | 0 | 30 | 30 | 30 |
| OE-01 (wt % after replacement) | 60 | 30 | 30 | 30 |
| [Silane] (mmol/100 g formulation) | 0 | 6.3 | 6.2 | 5.5 |
| [Urea + urethane] (mmol/100 g formulation) | 54 | 52 | 52 | 60 |
| Viscosity @, 25° C. (mPa * s) | 2136 | 1707 | 1823 | 1944 |
| Peel Strength (gf/in) | 41 | 240 | 274 | 300 |
| Elongation (at break) (%) | 66 | 88 | 89 | 126 |
| Film Modulus (Tensile) (MPa) | 1.97 | 0.97 | 0.94 | 0.92 |
| Toughness (N * mm/m3) | 0.30 | 0.24 | 0.24 | 0.42 |
| Tensile Strength (MPa) | 0.78 | 0.47 | 0.44 | 0.59 |

*Formulation FE-05 is a comparative example.

Inventive hydantoin oligomers with different end group functionality in the oligomer mixture were also investigated, as illustrated by Table 6K. Replacing oligomer OE-2 with hydantoin oligomer OE-10 in an oligomer mixture containing HEMA and BVE endgroups, formulations FE-45 and FE-46 respectively, produced coatings with increased adhesion relative to the controls FE-22 and FE-24 respectively.

TABLE 6K

Hydantoin inventive oligomers
with different endgroups, replacing OE-02 with OE-10

| Formulation | FE-22* | FE-45 | FE-24* | FE-46 |
|---|---|---|---|---|
| OME-21 | 75 | — | — | — |
| OME-32 | — | 75 | — | — |
| OME-23 | — | — | 75 | — |
| OME-33 | — | — | — | 75 |
| PEA | 22.5 | 22.5 | 22.5 | 22.5 |
| ANTIOXIDANT 1520 | 0.5 | 0.5 | 0.5 | 0.5 |
| TPO | 2 | 2 | 2 | 2 |
| Formulation Total (%) | 100 | 100 | 100 | 100 |
| OE-10 (wt % in formulation) | 0 | 30 | 0 | 30 |
| OE-02 (wt % after replacement) | 45 | 15 | 45 | 15 |
| [Silane] (mmol/100 g formulation) | 0 | 6.3 | 0 | 6.3 |
| [Urea + urethane] (mmol/100 g formulation) | 48 | 59 | 48 | 60 |
| Viscosity @ 25° C. (mPa * s) | 2110 | 4270 | 2370 | 5040 |
| Peel Strength (gf/in) | 29 | 128 | 69 | 174 |
| Elongation (at break) (%) | 90 | 92 | 72 | 105 |
| Film Modulus (Tensile) (MPa) | 0.49 | 0.61 | 0.37 | 0.52 |
| Toughness (N * mm/m3) | 0.15 | 0.18 | 0.07 | 0.18 |
| Tensile Strength (MPa) | 0.28 | 0.33 | 0.16 | 0.30 |

*Formulation FE-22 is a comparative example.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A composition comprising:
   (I) an ethylenically unsaturated oligomer comprising:
      (a) a moiety of the structure (1):

$$—Y^1—Si(X)_3 \tag{1}$$

(b1) a moiety of the structure (2):

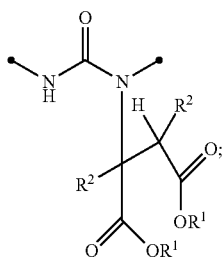

(2)

or
(b2) a moiety of the structure (3):

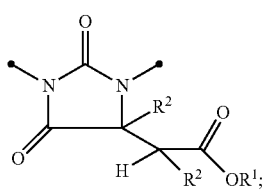

(3)

or
(b3) a combination of a moiety of the structure (2) and a moiety of the structure (3); and
(c) a moiety of the structure (3a):

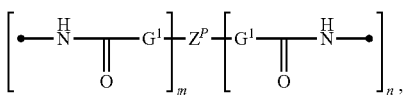

(3a)

in which (i) $Y^1$ represents a linear or branched linking group comprising 1 or more carbon atoms, (ii) each X, which may be the same or different, represents an alkoxy group or an organic group that is inert towards isocyanate groups at temperatures of 100° C. or less, with the proviso that at least one X represents an alkoxy group, (iii) each $R^1$, which may be the same or different, represents an organic group that is inert to isocyanate groups at temperatures of 100° C. or less; (iv) each $R^2$, which may be the same or different, represents hydrogen or an organic group that is inert to isocyanate groups at temperatures of 100° C. or less; (v) each "—·" represents a linkage to another portion of the ethylenically unsaturated oligomer; (vi) each $G^1$ is O or S, (vii) m has a value of 1 to 5, (viii) n has a value of 1 to 5, and (ix) $Z^P$ represents an organic group that is inert towards isocyanate groups at temperatures of 100° C. or less; and (II) an ethylenically unsaturated oligomer different from ethylenically unsaturated oligomer (I),
wherein the sum of the amount of ethylenically unsaturated oligomer (I) and ethylenically unsaturated oligomer (II) is 1 to 99% by weight, based on the total weight of solids in the composition.

2. The composition of claim 1, wherein each $R^1$ and $R^2$ in structures (2) and (3), which may be the same or different, represents an alkyl group having 1 to 9 carbon atoms, each X in structure (1) represents an identical or different alkyl, acyloxy, or alkoxy group having 1 to 9 carbon atoms, with the proviso that at least one X represents an alkoxy group, and $Y^1$ in structure (1) comprises a linear or branched alkylene radical having 1 to 8 carbon atoms.

3. The composition of claim 1, wherein the ethylenically unsaturated oligomer (I) has a Mn of 800 to 35,000 g/mol.

4. The composition of claim 1, wherein the ethylenically unsaturated oligomer (I) comprises the structure (4):

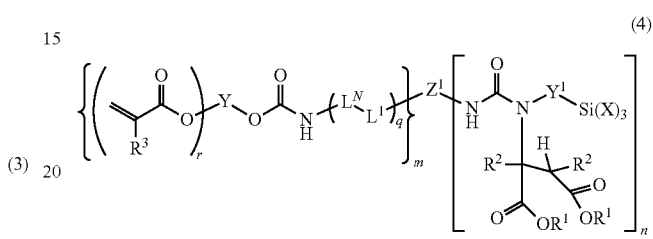

(4)

in which: (i) $L^N$ is represented by the structure:

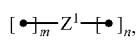

in which "———●" represents a linkage to another portion of the ethylenically unsaturated oligomer; (ii) $L^1$ is represented by the structure (4a):

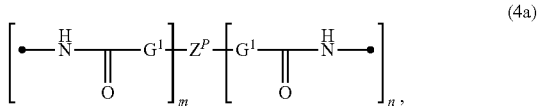

(4a)

in which $Z^P$ represents an organic group that is inert towards isocyanate groups at temperatures of 100° C. or less and $G^1$ is O or S each Y, which may be the same or different, represents a group comprising a branched or straight chain alkylene radical; (iii) each $Y^1$, which may be the same or different, represents a linear or branched linking group comprising 1 or more carbon atoms; (iv) each $R^1$, which may be the same or different, represents an organic group that is inert to isocyanate groups at temperatures of 100° C. or less; (v) each $R^2$, which may be the same or different, represents hydrogen or an organic group that is inert to isocyanate groups at temperatures of 100° C. or less; (vi) each $R^3$, which may be the same or different, represents H or $CH_3$; (vii) each X, which may be the same or different, represents an alkoxy group or an organic group that is inert towards isocyanate groups at temperatures of 100° C. or less, with the proviso that at least one X represents an alkoxy group; (viii) $Z^1$ represents an organic group that is inert towards isocyanate groups at temperatures of 100° C. or less; (ix) m has a value of 1 to 5; (x) n has a value of 1 to 5; (xi) q has a value of at least 1; and (xii) r is 1, 2 or 3.

5. The composition of claim 1, wherein the ethylenically unsaturated oligomer (I) comprises the structure (5):

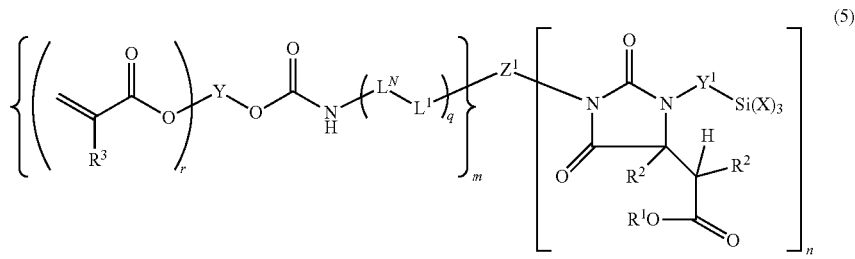

in which: (i) $L^N$ is represented by the structure:

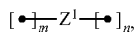

in which "———•" represents a linkage to another portion of the ethylenically unsaturated oligomer; (ii) $L^1$ is represented by the structure (4a):

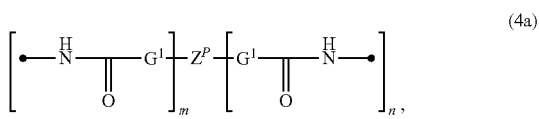

in which $Z^P$ represents an organic group that is inert towards isocyanate groups at temperatures of 100° C. or less, and $G^1$ is O or S each Y, which may be the same or different, represents a group comprising a branched or straight chain alkylene radical; (iii) each $Y^1$, which may be the same or different, represents a linear or branched linking group comprising 1 or more carbon atoms; (iv) each $R^1$, which may be the same or different, represents an organic group that is inert to isocyanate groups at temperatures of 100° C. or less; (v) each $R^2$, which may be the same or different, represents hydrogen or an organic group that is inert to isocyanate groups at temperatures of 100° C. or less; (vi) each $R^3$, which may be the same or different, represents H or $CH_3$; (vii) each X, which may be the same or different, represents an alkoxy group or an organic group that is inert towards isocyanate groups at temperatures of 100° C. or less, with the proviso that at least one X represents an alkoxy group; (viii) $Z^1$ represents an organic group that is inert towards isocyanate groups at temperatures of 100° C. or less; (ix) m has a value of 1 to 5; (x) n has a value of 1 to 5; (xi) q has a value of at least 1; and (xii) r is 1, 2 or 3.

6. The composition of claim 1, wherein the ethylenically unsaturated oligomer (I) comprises the structure (6):

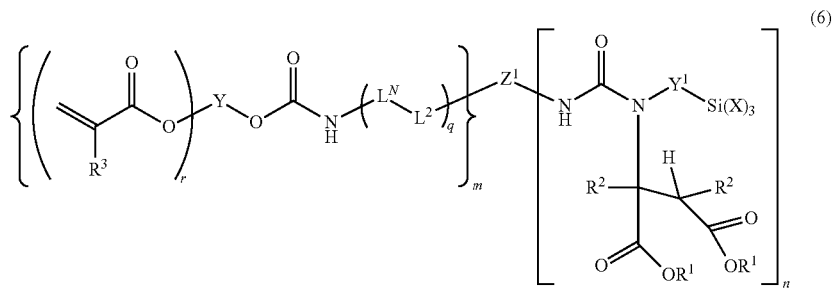

in which: (i) $L^N$ is represented by the structure:

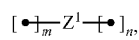

in which "———•" represents a linkage to another portion of the ethylenically unsaturated oligomer; (ii) $L^2$ is a mixture of $L^1$ and $L^B$ in which $L^1$ is represented by the structure (4a):

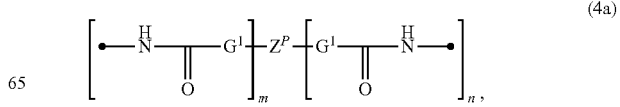

in which $Z^P$ represents an organic group that is inert towards isocyanate groups at temperatures of 100° C. or less, $G^1$ is O or S, and $L^B$ is represented by structure (6b):

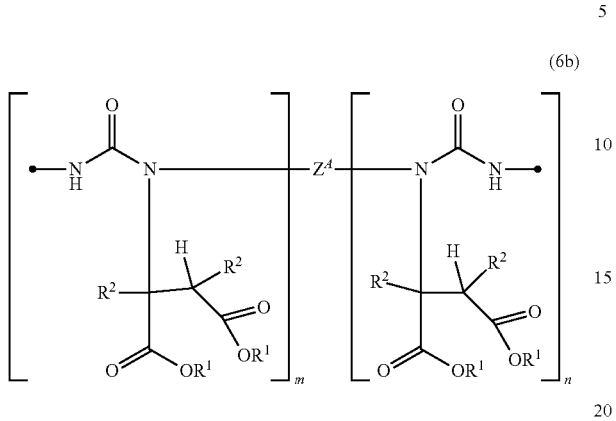

(6b)

in which $Z^A$ represents an organic group that is inert towards isocyanate groups at temperatures of 100° C. or less; (iii) each Y, which may be the same or different, represents a group comprising a branched or straight chain alkylene radical; (iv) each $Y^1$, which may be the same or different, represents a linear or branched linking group comprising 1 or more carbon atoms; (v) each $R^1$, which may be the same or different, represents an organic group that is inert to isocyanate groups at temperatures of 100° C. or less; (vi) each $R^2$, which may be the same or different, represents hydrogen or an organic group that is inert to isocyanate groups at temperatures of 100° C. or less; (vii) each $R^3$, which may be the same or different, represents H or $CH_3$; (viii) each X, which may be the same or different, represents an alkoxy group or an organic group that is inert towards isocyanate groups at temperatures of 100° C. or less, with the proviso that at least one X represents an alkoxy group; (ix) $Z^1$ represents an organic group that is inert towards isocyanate groups at temperatures of 100° C. or less; (x) m has a value of 1 to 5; (xi) n has a value of 1 to 5; (xii) q has a value of at least 1; and (xiii) r is 1, 2 or 3.

7. The composition of claim 1, wherein the ethylenically unsaturated oligomer (I) comprises the structure (7):

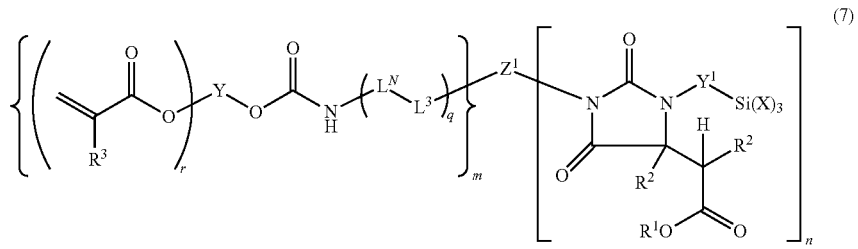

(7)

in which: (i) $L^N$ is represented by the structure:

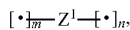

in which "———•" represents linkage to another portion of the ethylenically unsaturated oligomer; (ii)

and $L^3$ is a mixture of $L^1$ and $L^C$, in which $L^1$ is represented by the structure (4a):

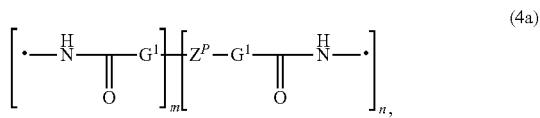

(4a)

in which $Z^P$ represents an organic group that is inert towards isocyanate groups at temperatures of 100° C. or less, and $G^1$ is O or S, and $L^C$ is represented by the structure (7b):

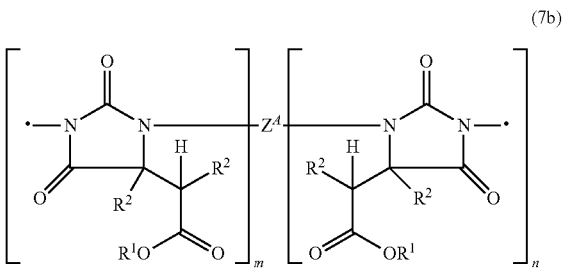

(7b)

in which $Z^A$ represents an organic group that is inert towards isocyanate groups at temperatures of 100° C. or less; (iii) each Y, which may be the same or different, represents a group comprising a branched or straight chain alkylene radical; (iv) each $Y^1$, which may be the same or different, represents a linear or branched linking group comprising 1 or more carbon atoms; (v) each $R^1$, which may be the same or different, represents an organic group that is inert to isocyanate groups at temperatures of 100° C. or less; (vi) each $R^2$, which may be the same or different, represents hydrogen or an organic group that is inert to isocyanate groups at temperatures of 100° C. or less; (vii) each $R^3$, which may be the same or different, represents H or $CH_3$; (viii) each X, which may be the same or different, represents an alkoxy group or an organic group that is inert towards isocyanate groups at temperatures of 100° C. or less, with the proviso that at least one X represents an alkoxy group; (ix) $Z^1$ represents an organic group that is inert towards isocyanate groups at temperatures of 100° C. or less; (x) m has a value of 1 to 5; (xi) n has a value of 1 to 5; (xii) q has a value of at least 1; and (xiii) r is 1, 2 or 3.

8. The composition of claim 1, wherein the ethylenically unsaturated oligomer (I) comprises the structure (8):

$$\{A^1\}_{\overline{m}} Z^A - [B^1]_n, \quad (8)$$

in which:
(1) $Z^A$ represents an organic group that is inert towards isocyanate groups at temperatures of 100° C. or less;
(2) $A^1$ is represented by the structure:

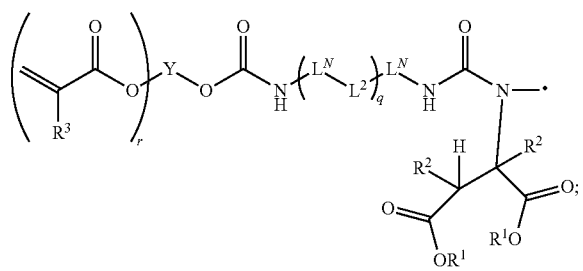

and
(3) $B^1$ is represented by the structure:

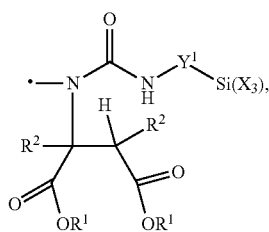

in which: (i) each "———●" represents a linkage to $Z^A$, (ii) $L^N$ is represented by the structure:

$$[\cdot]_{\overline{m}} Z^1 - [\cdot]_n,$$

in which "———●" represents a linkage to another portion of the ethylenically unsaturated oligomer; (iii) and $L^2$ is $L^1$ or a mixture of $L^1$ and $L^B$, which $L^1$ is represented by the structure (4a):

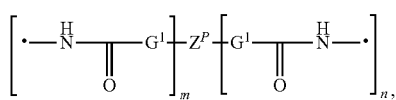

in which $Z^P$ represents an organic group that is inert towards isocyanate groups at temperatures of 100° C. or less, and $L^B$ is represented by structure (8b):

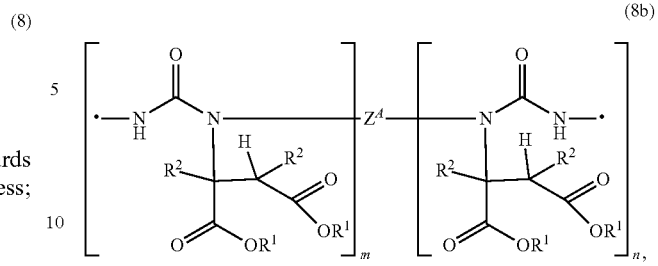

in which each "———●" represents a linkage to $L^N$ each Y, which may be the same or different, represents a group comprising a branched or straight chain alkylene radical; (iv) each $Y^1$, which may be the same or different, represents a linear or branched linking group comprising 1 or more carbon atoms; (v) each $R^1$, which may be the same or different, represents an organic group that is inert to isocyanate groups at temperatures of 100° C. or less; (vi) each $R^2$, which may be the same or different, represents hydrogen or an organic group that is inert to isocyanate groups at temperatures of 100° C. or less; (vii) each $R^3$, which may be the same or different, represents H or $CH_3$; (viii) each X, which may be the same or different, represents an alkoxy group or an organic group that is inert towards isocyanate groups at temperatures of 100° C. or less, with the proviso that at least one X represents an alkoxy group; (ix) $Z^1$ represents an organic group that is inert towards isocyanate groups at temperatures of 100° C. or less; (x) m has a value of 1 to 5; (xi) n has a value of 1 to 5; (xii) q has a value of at least 1; and (xiii) r is 1, 2 or 3.

9. The composition of claim 1, wherein the ethylenically unsaturated oligomer (I) comprises the structure (9):

$$\{A^2\}_{\overline{m}} Z^A - [B^2]_n, \quad (9)$$

in which:
(1) $Z^A$ represents an organic group that is inert towards isocyanate groups at temperatures of 100° C. or less;
(2) $A^z$ is:

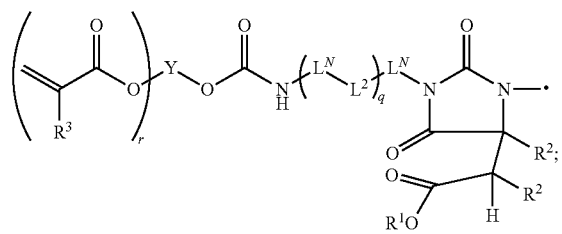

and (3) $B^2$ is represented by the structure:

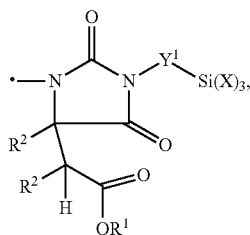

in which: (i) each "———●" represents a linkage to $Z^A$, (ii) $L^N$ is represented by the structure:

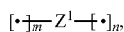

in which "———●" represents a linkage to another portion of the ethylenically unsaturated oligomer; (iii), $L^N$, each "———●" represents a linkage to $Z^A$, and $L^3$ is $L^1$, or a mixture of $L^1$ and $L^C$, in which $L^1$ is represented by the structure (4a):

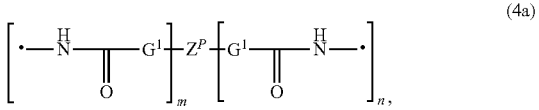

in which $Z^P$ represents an organic group that is inert towards isocyanate groups at temperatures of 100° C. or less, and $L^C$ is represented by structure (9a):

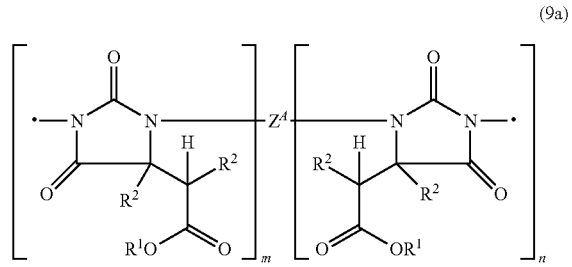

in which each "———●" represents a linkage to $L^N$ each Y, which may be the same or different, represents a group comprising a branched or straight chain alkylene radical; (iv) each $Y^1$, which may be the same or different, represents a linear or branched linking group comprising 1 or more carbon atoms; (v) each $R^1$, which may be the same or different, represents an organic group that is inert to isocyanate groups at temperatures of 100° C. or less; (vi) each $R^2$, which may be the same or different, represents hydrogen or an organic group that is inert to isocyanate groups at temperatures of 100° C. or less; (vii) each $R^3$, which may be the same or different, represents H or $CH_3$; (viii) each X, which may be the same or different, represents an alkoxy group or an organic group that is inert towards isocyanate groups at temperatures of 100° C. or less, with the proviso that at least one X represents an alkoxy group;

(ix) $Z^1$ represents an organic group that is inert towards isocyanate groups at temperatures of 100° C. or less; (x) m has a value of 1 to 5; (xi) n has a value of 1 to 5; (xii) q has a value of at least 1; and (xiii) r is 1, 2 or 3.

10. The composition of claim 1, wherein the sum of the amount of ethylenically unsaturated oligomer (I and ethylenically unsaturated oligomer (II) is 10 to 90% by weight, based on the total weight of solids in the composition.

11. The composition of claim 1, wherein ethylenically unsaturated oligomer (I) is present in an amount of 1 to 90% by weight, based on the total weight of ethylenically unsaturated oligomer (I) and ethylenically unsaturated oligomer (II) in the composition.

12. The composition of claim 11, wherein the ethylenically unsaturated oligomer (II) comprises a urethane (meth) acrylate oligomer comprising a reaction product of reactants comprising: (1) a polyol, (2) a polyisocyanate, and (3) a hydroxyl group-containing (meth)acrylate.

13. The composition of claim 12, wherein the polyol comprises a diol and the polyisocyanate comprises a diisocyanate.

14. The composition of claim 13, wherein the urethane (meth)acrylate oligomer is present in an amount of 30 to 80% by weight, based on the total weight of solids in the composition.

15. The composition of claim 14, further comprising:
(c) a reactive diluent compound comprising one or more ethylenically unsaturated groups, wherein the reactive diluent compound is present in an amount of 5 to 90% by weight, based on the total weight of solids in the composition.

16. The composition of claim 15, wherein the reactive diluent compound comprises an alkyl or hydroxyalkyl (meth)acrylate, isobornyl acrylate, ethoxylated nonyl-phenol acrylate, phenoxyethyl acrylate, diethylene-glycol-ethyl-hexyl acylate (DEGEHA), ethylene glycol diacrylate, propylene glycol diacrylate, neopentyl glycol diacrylate, hexamethylene glycol diacrylate, bisphenol A diacrylate, 4,4'-bis(2-acryloyloxyethoxy)diphenylpropane, trimethylolpropane triacrylate, ethoxylated trimethylolpropane triacrylate, pentaerythritol triacrylate and tetraacrylate, acrylonitrile, acrylamide, methacrylamide, an N-substituted (meth) acrylamide, a vinyl ester, styrene, an alkylstyrene, a halostyrene, a N-vinylpyrrolidone, a N-vinyl caprolactam, a vinyl chloride, a vinylidene chloride, or a mixture of any two or more thereof.

17. The composition of claim 15, further comprising:
(d) a photoinitiator.

18. A cured coating formed from the composition of claim 17.

19. A substrate at least partially coated with the cured coating of claim 18, wherein the substrate comprises an optical fiber.

20. A coated optical fiber comprising:
(a) a glass core and a cladding layer in contact with and surrounding said glass core; and
(b) a coating portion at least partially coating the cladding layer, the coating portion comprising:
(i) a primary coating layer in contact with said cladding layer; and
(ii) a secondary coating layer in contact with and surrounding said primary coating layer, wherein the primary coating layer and/or the secondary coating layer is the cured coating of claim 18.

21. A method for coating an optical fiber comprising:
(a) providing a glass optical fiber;
(b) applying a primary coating composition onto a surface of the glass optical fiber;
(c) optionally, imparting a dose of ultraviolet light sufficient to at least partially cure said primary coating composition;
(d) applying a secondary coating composition to the primary coating composition; and
(e) exposing the secondary coating composition to at least one radiation source capable of emitting ultraviolet radiation to affect curing of said secondary coating composition and, optionally, said primary coating composition,
wherein the primary coating composition and/or the secondary coating composition comprises the composition of claim 1.

* * * * *